US012667137B2

(12) United States Patent
Park et al.

(10) Patent No.: US 12,667,137 B2
(45) Date of Patent: Jun. 30, 2026

(54) AEROSOL-GENERATING DEVICE

(71) Applicant: KT&G CORPORATION, Daejeon (KR)

(72) Inventors: Jueon Park, Seoul (KR); Minkyu Kim, Seoul (KR); Jongsub Lee, Sungnam-si (KR); Byungsung Cho, Gwangmyung-si (KR)

(73) Assignee: KT&G CORPORATION, Daejeon (KR)

( * ) Notice: Subject to any disclaimer, the term of this patent is extended or adjusted under 35 U.S.C. 154(b) by 428 days.

(21) Appl. No.: 18/288,892

(22) PCT Filed: May 19, 2022

(86) PCT No.: PCT/KR2022/007183

§ 371 (c)(1),
(2) Date: Oct. 30, 2023

(87) PCT Pub. No.: WO2022/245154

PCT Pub. Date: Nov. 24, 2022

(65) Prior Publication Data

US 2024/0196986 A1 Jun. 20, 2024

(30) Foreign Application Priority Data

May 21, 2021 (KR) ........................ 10-2021-0065341

(51) Int. Cl.
| | |
|---|---|
| *A24F 40/51* | (2020.01) |
| *A24F 40/10* | (2020.01) |
| *A24F 40/20* | (2020.01) |
| *A24F 40/30* | (2020.01) |
| *A24F 40/42* | (2020.01) |
| *A24F 40/44* | (2020.01) |

(Continued)

(52) U.S. Cl.
CPC .............. *A24F 40/51* (2020.01); *A24F 40/10* (2020.01); *A24F 40/20* (2020.01); *A24F 40/30* (2020.01);

(Continued)

(58) Field of Classification Search
None
See application file for complete search history.

(56) References Cited

U.S. PATENT DOCUMENTS

| | | | |
|---|---|---|---|
| 2020/0178608 | A1 | 6/2020 | Fernando et al. |
| 2020/0375251 | A1 | 12/2020 | Borges et al. |

(Continued)

FOREIGN PATENT DOCUMENTS

| | | |
|---|---|---|
| EP | 3818881 | 5/2021 |
| EP | 3818895 | 5/2021 |

(Continued)

OTHER PUBLICATIONS

PCT International Application No. PCT/KR2022/007183, International Search Report dated Sep. 6, 2022, 2 pages.

(Continued)

*Primary Examiner* — Philip Y Louie
*Assistant Examiner* — Madeleine P Delacruz
(74) *Attorney, Agent, or Firm* — LEE, HONG, DEGERMAN, KANG & WAIMEY

(57) ABSTRACT

An aerosol-generating device is disclosed. The aerosol-generating device of the disclosure includes a cartridge having therein an insertion space formed to be elongated, a body coupled to the cartridge, a plurality of sensors, and a controller. The plurality of sensors includes a capacitance sensor, disposed in the body so as to be adjacent to the insertion space in the cartridge coupled to the body, and a proximity sensor, including a sensor light source configured to radiate light and a photodiode configured to respond to light incident thereon. The controller determines whether a stick is inserted into the insertion space based on a signal received from at least one of the plurality of sensors. When a stick is inserted into the insertion space, the controller determines whether the stick inserted into the insertion space (Continued)

is a used stick based on the level of a signal received from the capacitance sensor.

13 Claims, 31 Drawing Sheets

(51) Int. Cl.

| | |
|---|---|
| *A24F 40/46* | (2020.01) |
| *A24F 40/50* | (2020.01) |
| *A24F 40/53* | (2020.01) |
| *A24F 40/57* | (2020.01) |
| *G01V 11/00* | (2006.01) |

(52) U.S. Cl.
CPC .............. *A24F 40/42* (2020.01); *A24F 40/53* (2020.01); *A24F 40/57* (2020.01); *G01V 11/00* (2013.01)

(56) References Cited

U.S. PATENT DOCUMENTS

| | | |
|---|---|---|
| 2020/0397050 A1 | 12/2020 | Zuber et al. |
| 2021/0100288 A1 | 4/2021 | Borges et al. |
| 2022/0192262 A1* | 6/2022 | Mikayama .............. A24F 40/51 |
| 2023/0209662 A1* | 6/2023 | Reevell ................ H05B 1/0244 |
| | | 392/404 |
| 2024/0237715 A1* | 7/2024 | Bouchuiguir ........... A24F 40/46 |

FOREIGN PATENT DOCUMENTS

| | | |
|---|---|---|
| JP | H10-143625 | 5/1998 |
| KR | 20-2000-0007823 | 5/2000 |
| KR | 10-2019-0051745 | 5/2019 |
| KR | 10-2019-0123912 | 11/2019 |
| KR | 10-2020-0061233 | 6/2020 |
| KR | 10-2020-0089149 | 7/2020 |
| KR | 10-2021-0014012 | 2/2021 |
| WO | 2020249661 | 12/2020 |
| WO | 2021066442 | 4/2021 |

OTHER PUBLICATIONS

Korean Intellectual Property Office Application No. 10-2021-0065341, Notice of Allowance dated Mar. 11, 2024, 4 pages.
European Patent Office Application Serial No. 22805007.6, Search Report dated Mar. 18, 2025, 10 pages.

\* cited by examiner

【FIG. 1】
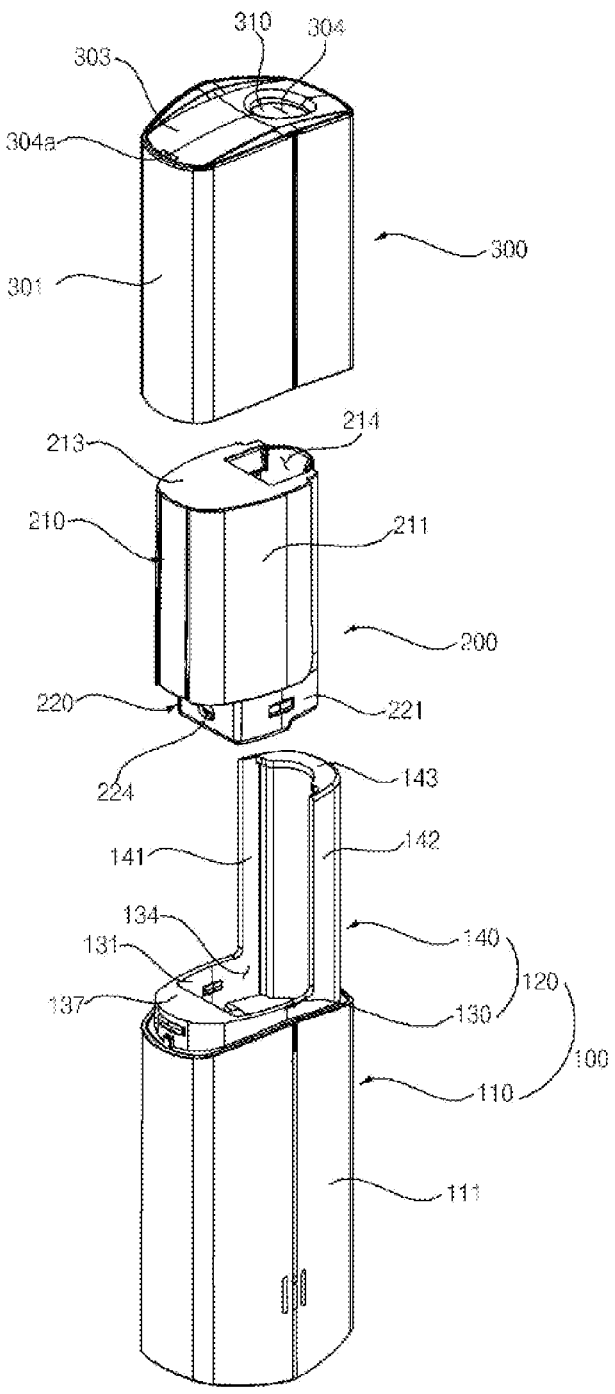

【FIG. 2】
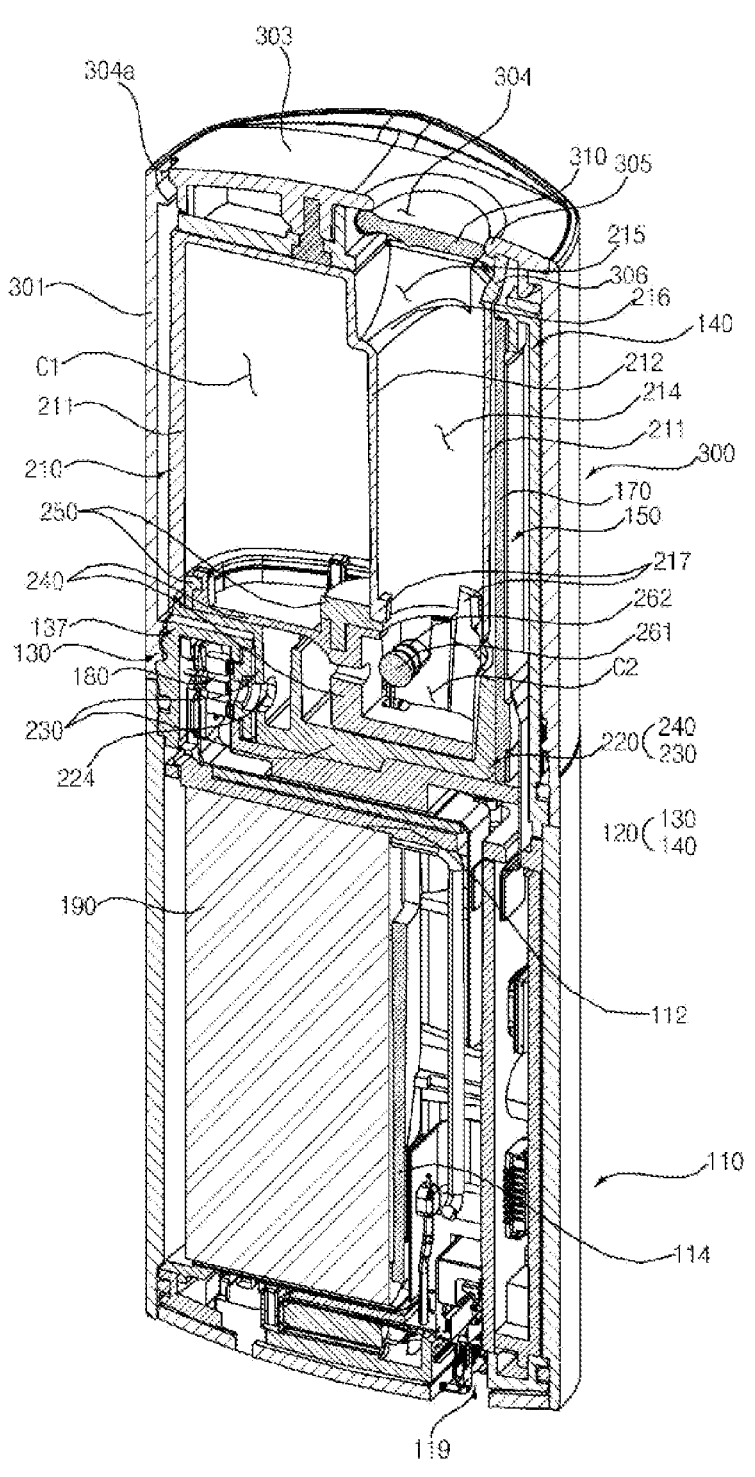

【FIG. 3】
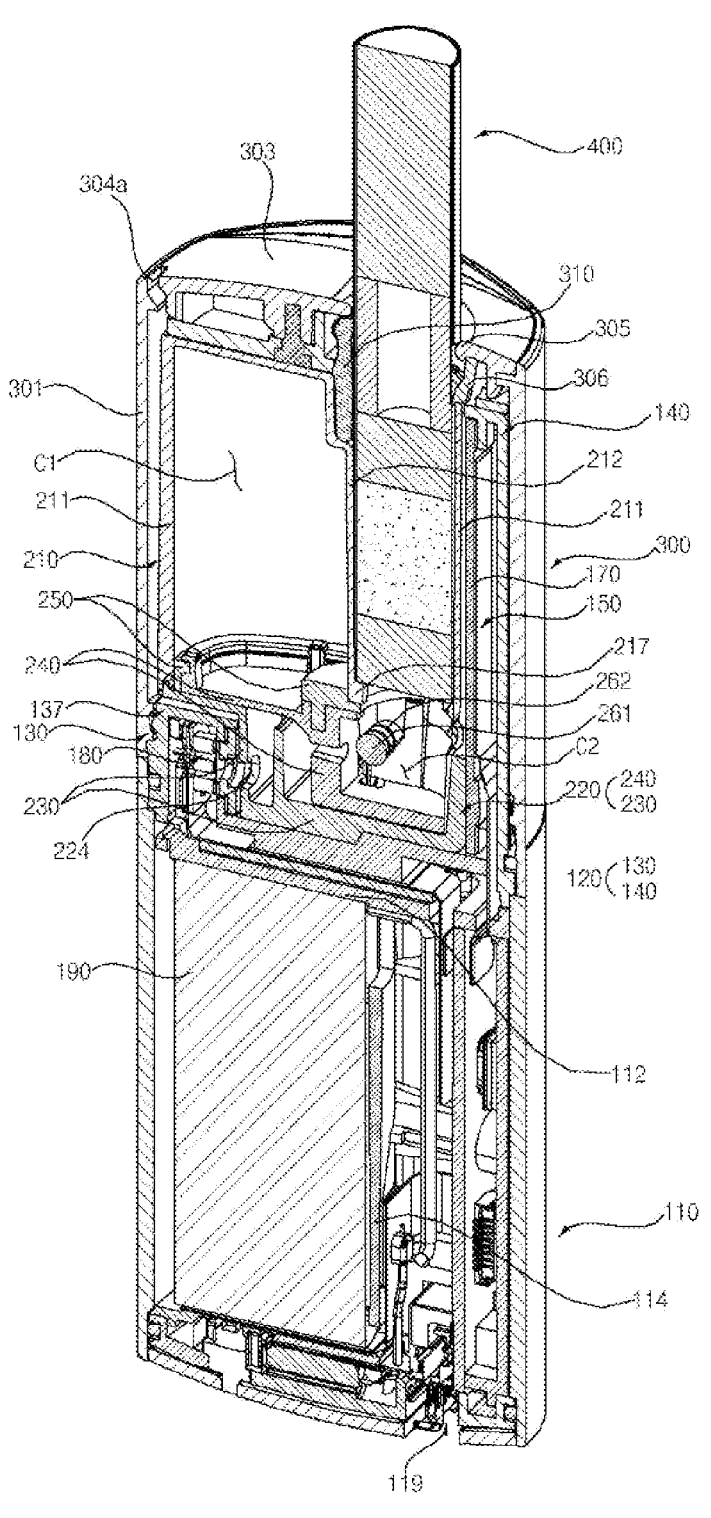

【FIG. 4】
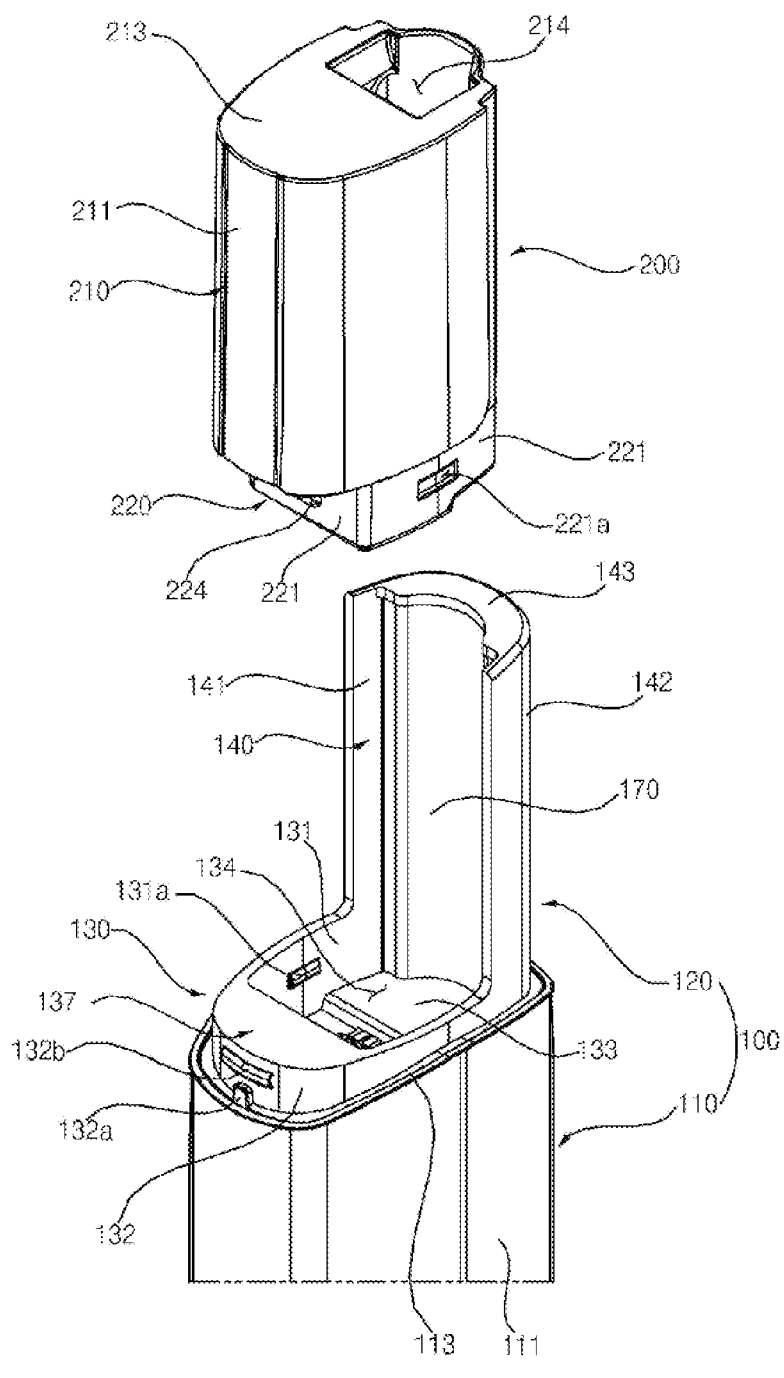

【FIG. 5】
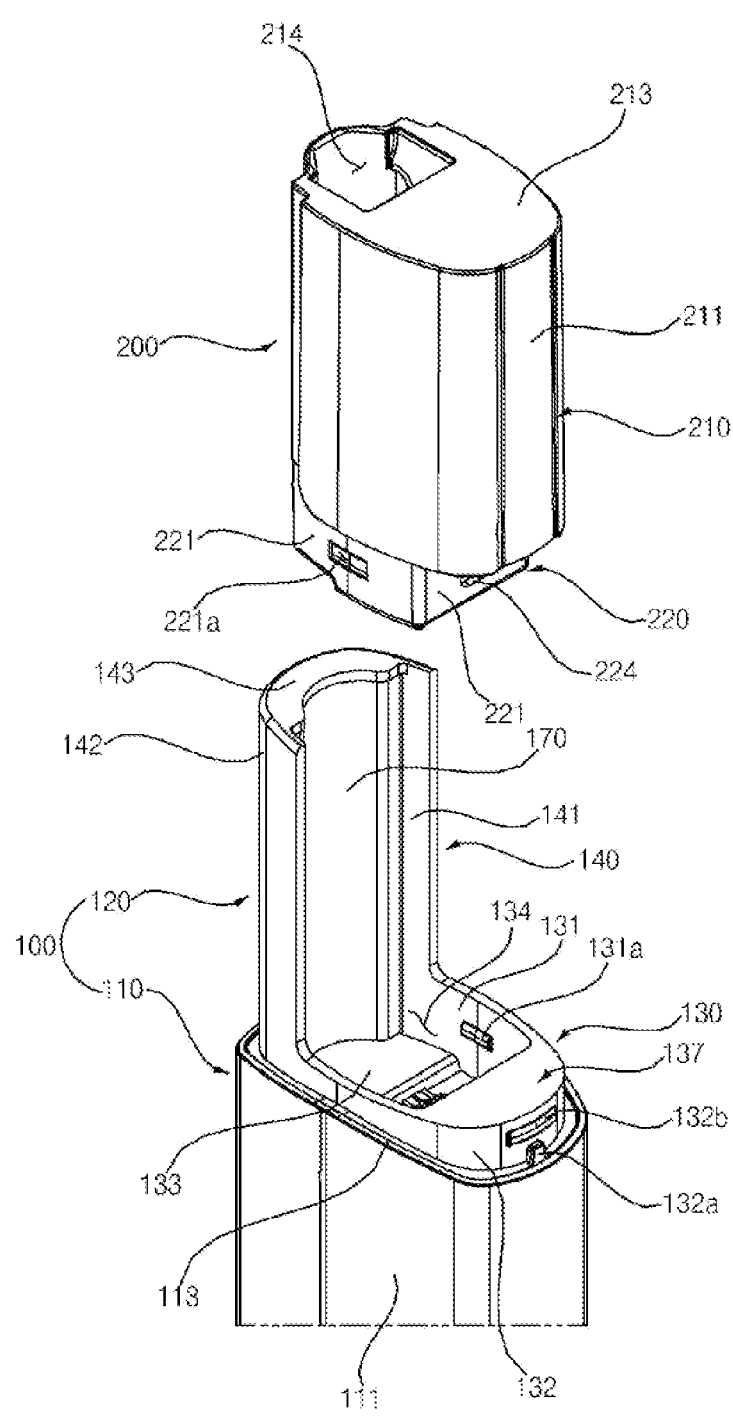

【FIG. 6】
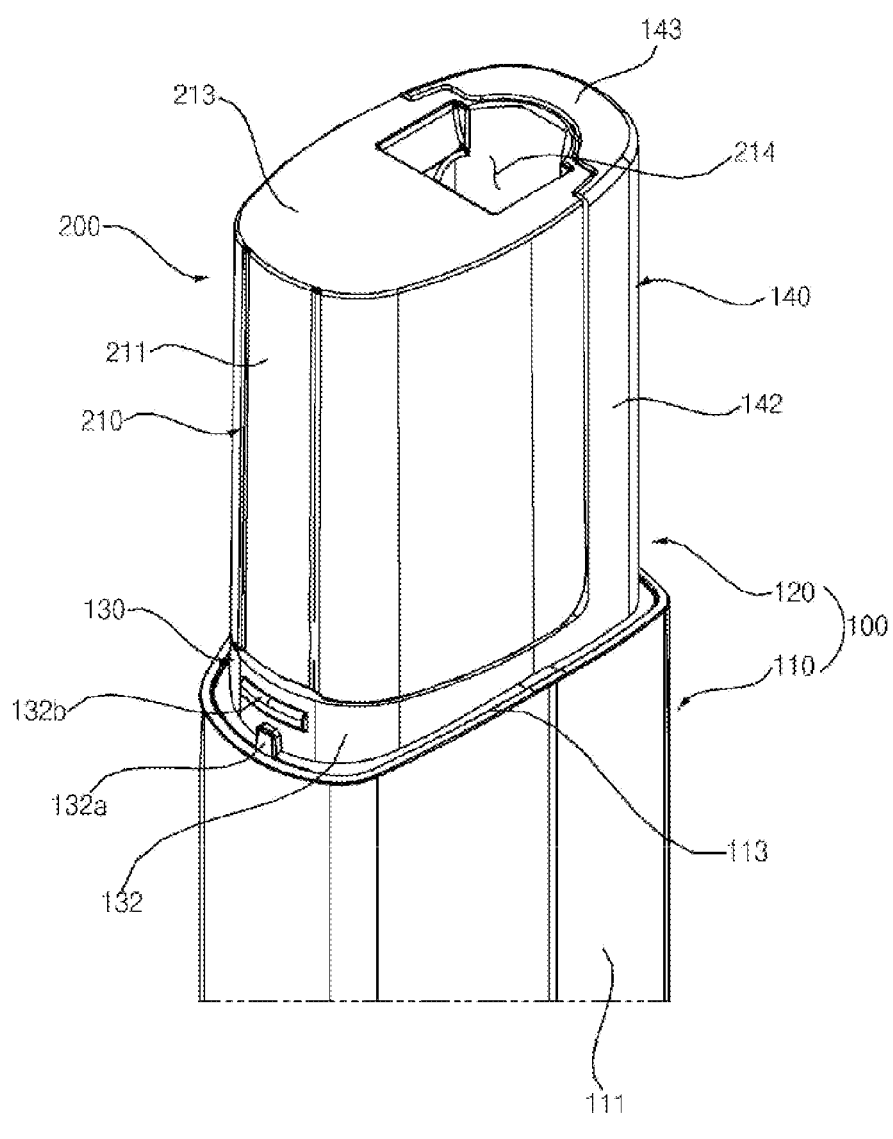

【FIG. 7】
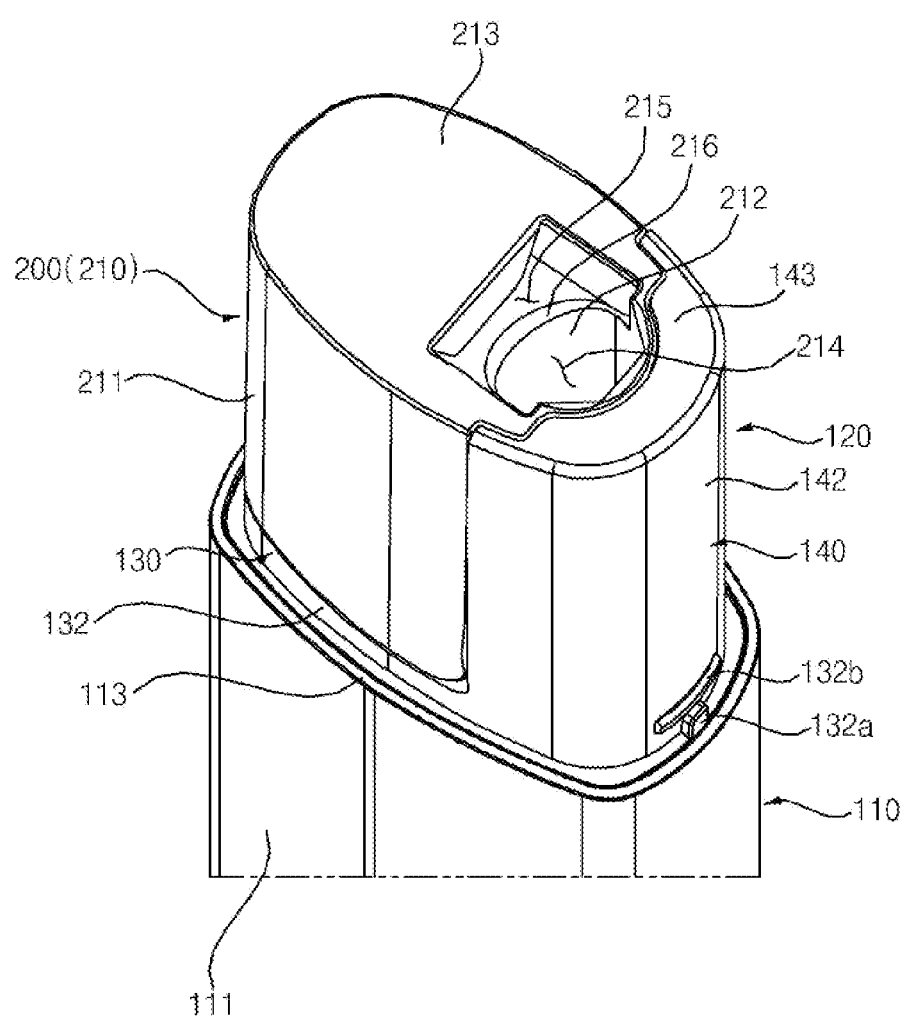

【FIG. 8】
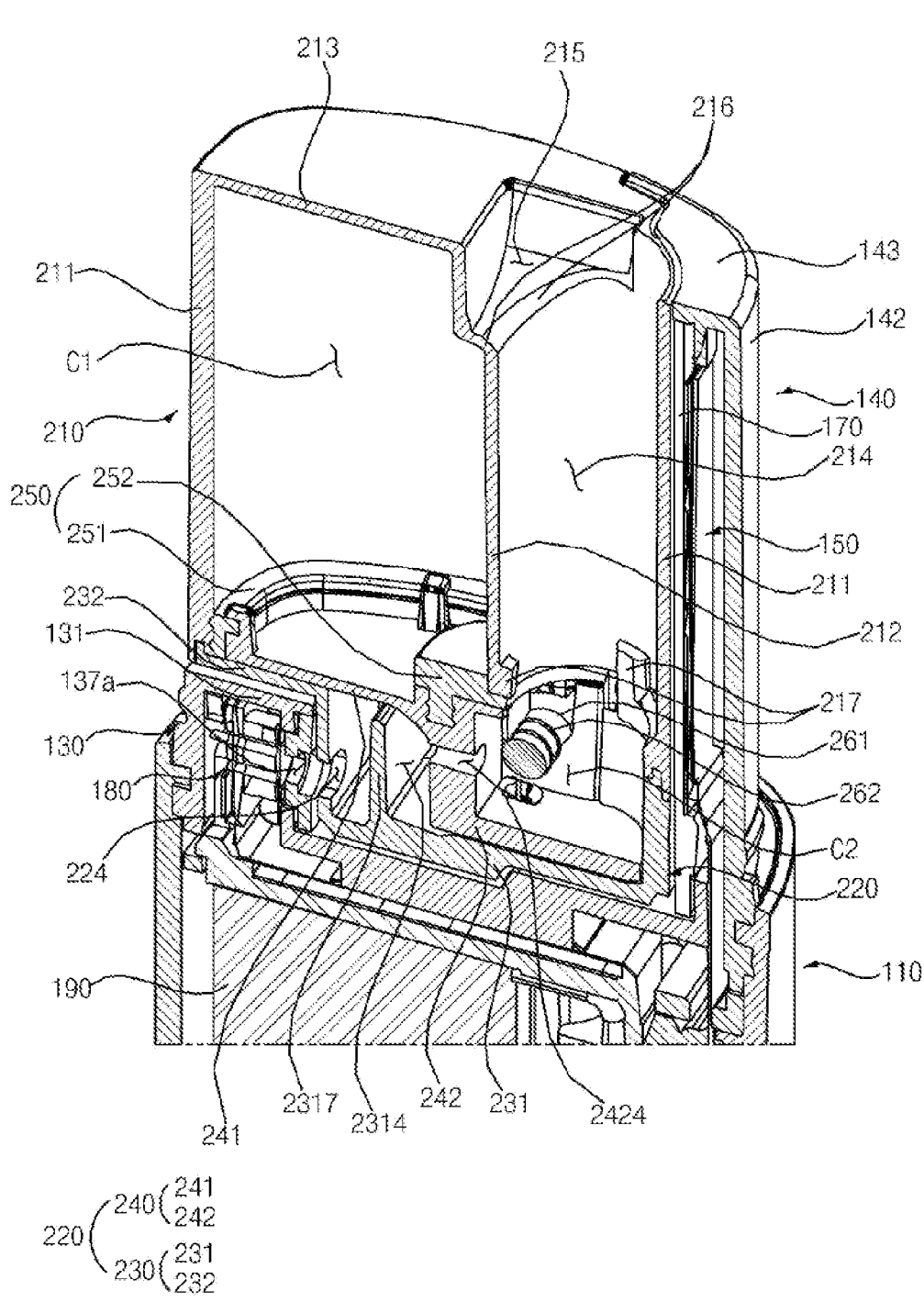

【FIG. 9】
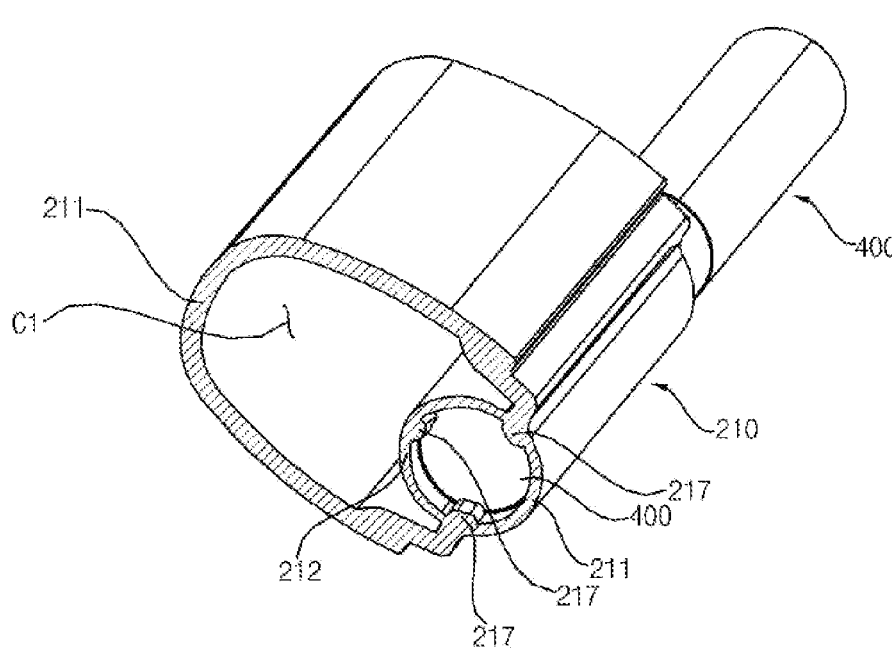

【FIG. 10】
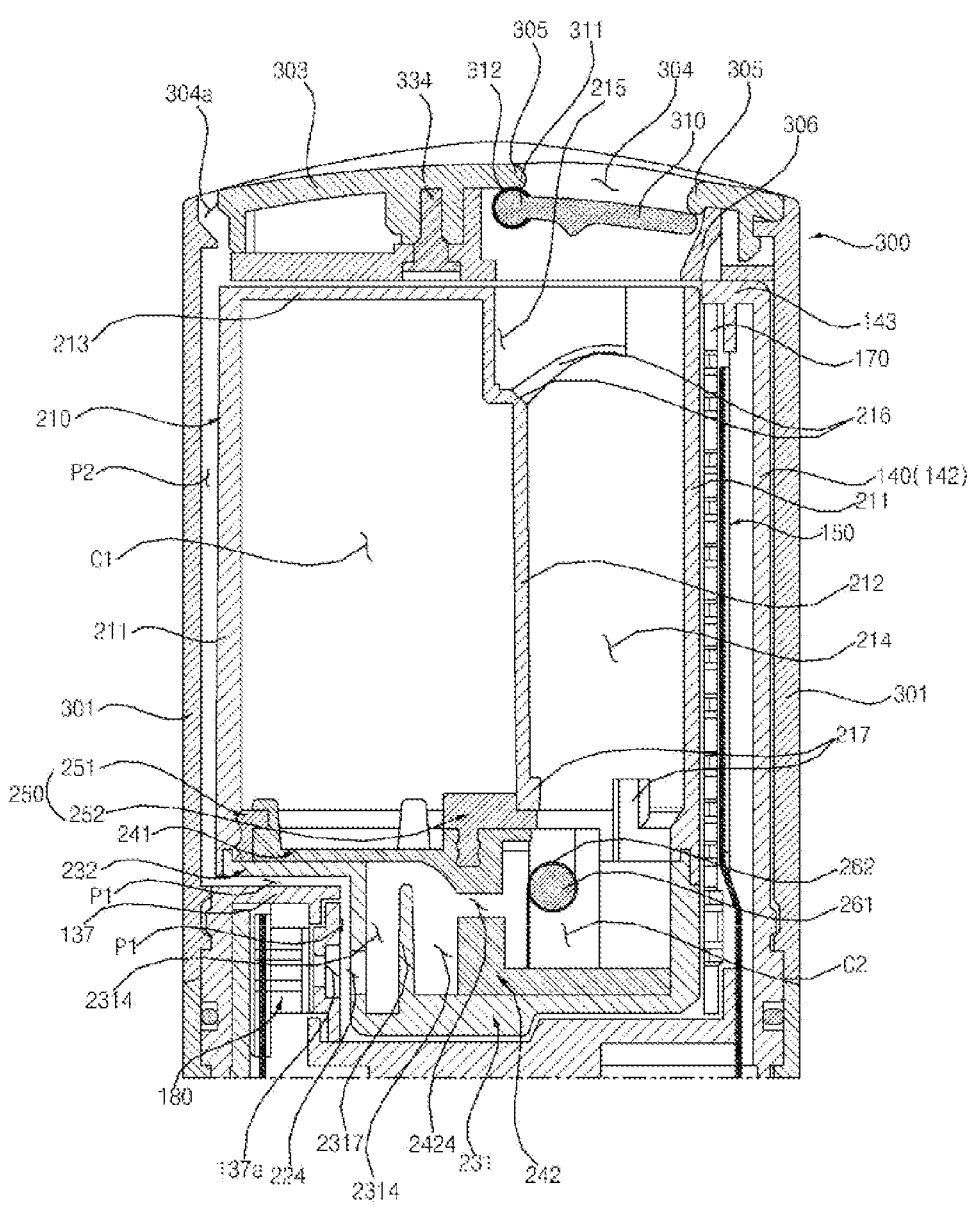

【FIG. 11】
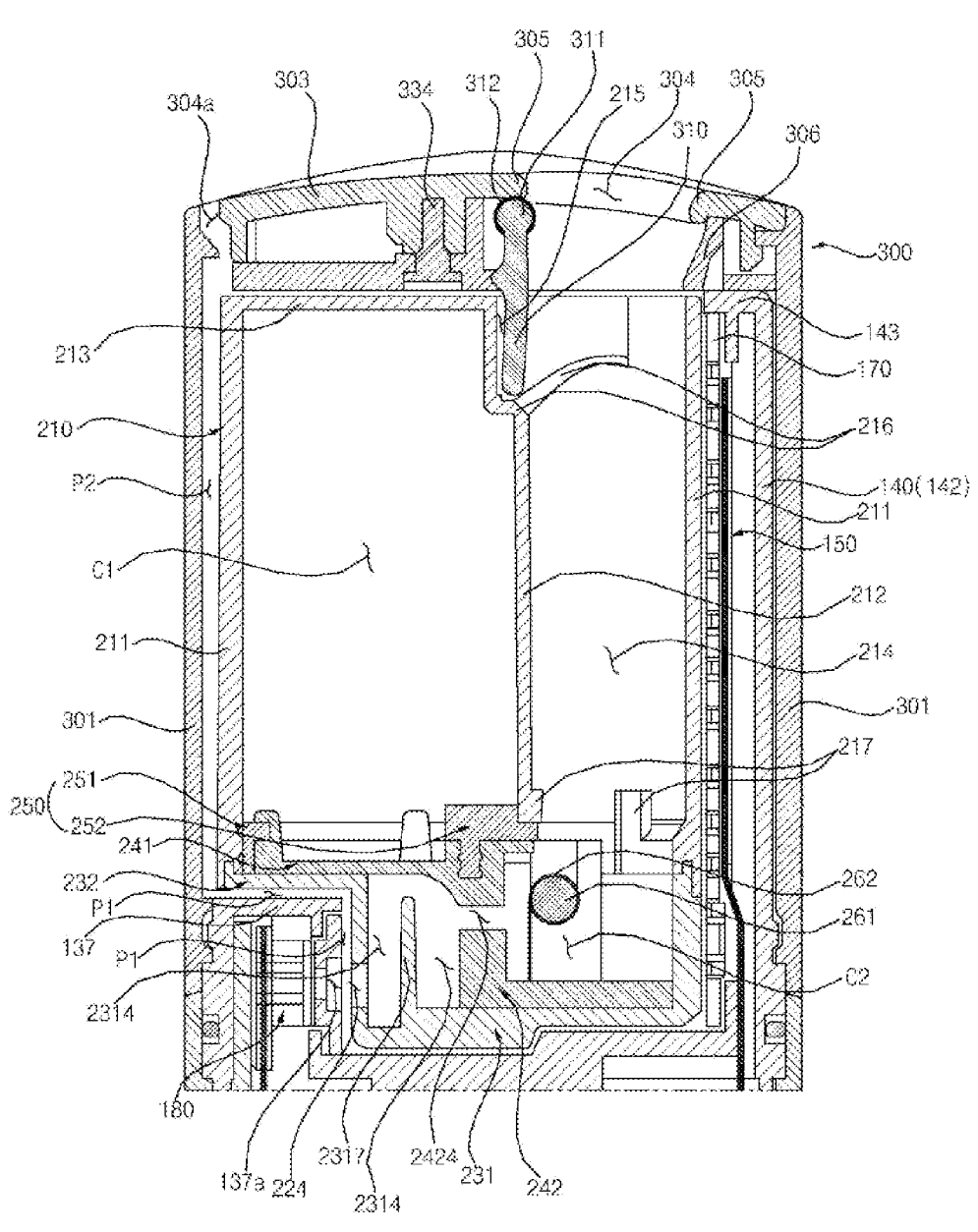

【FIG. 12】
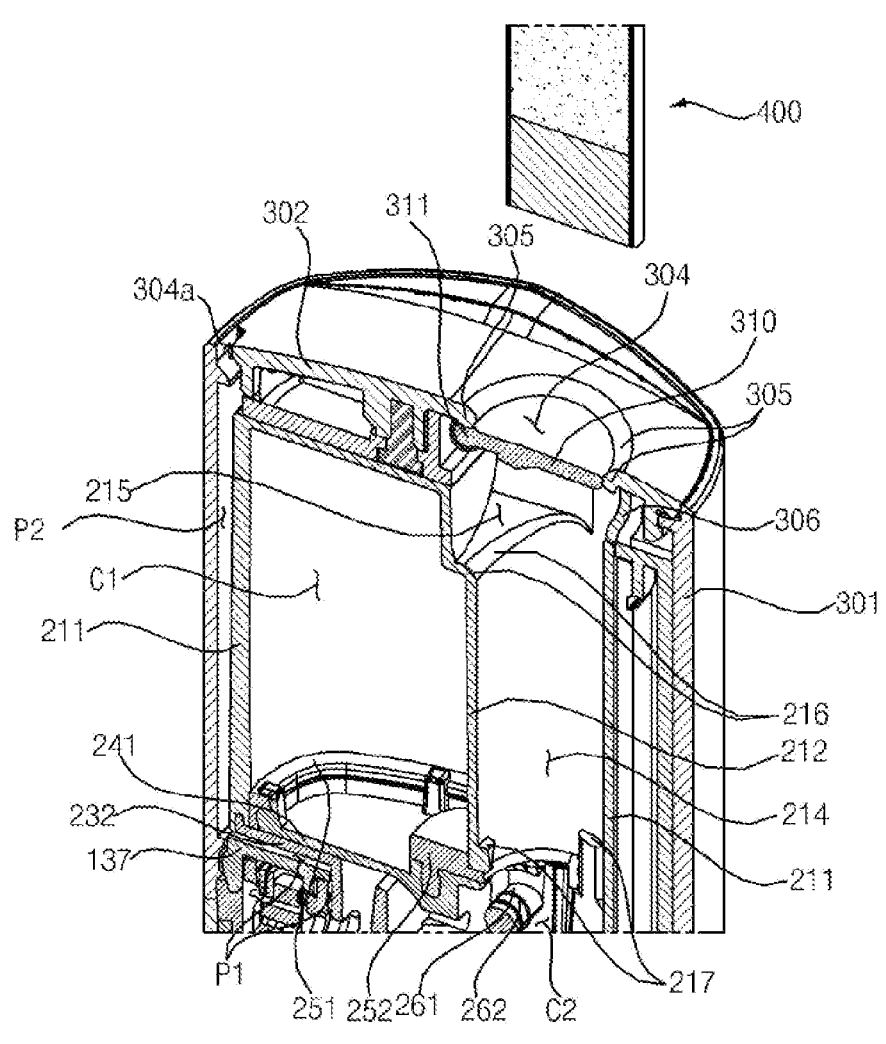

【FIG. 13】
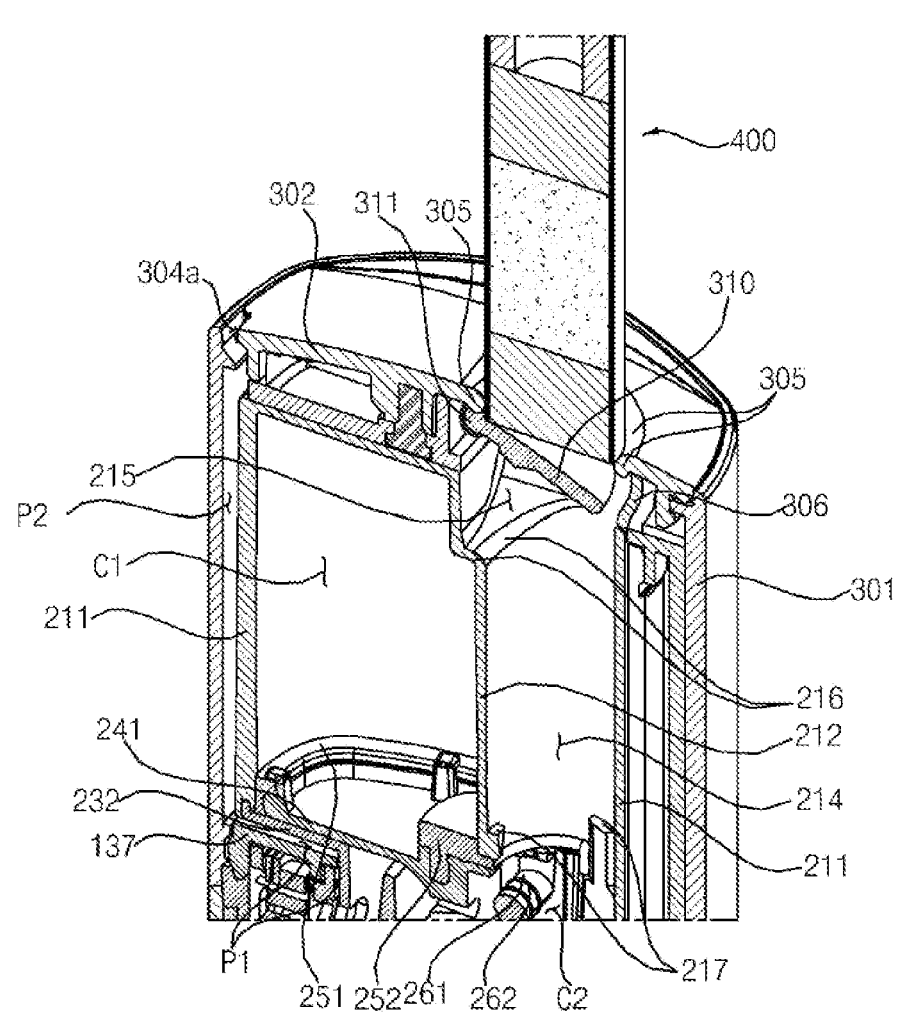

【FIG. 14】
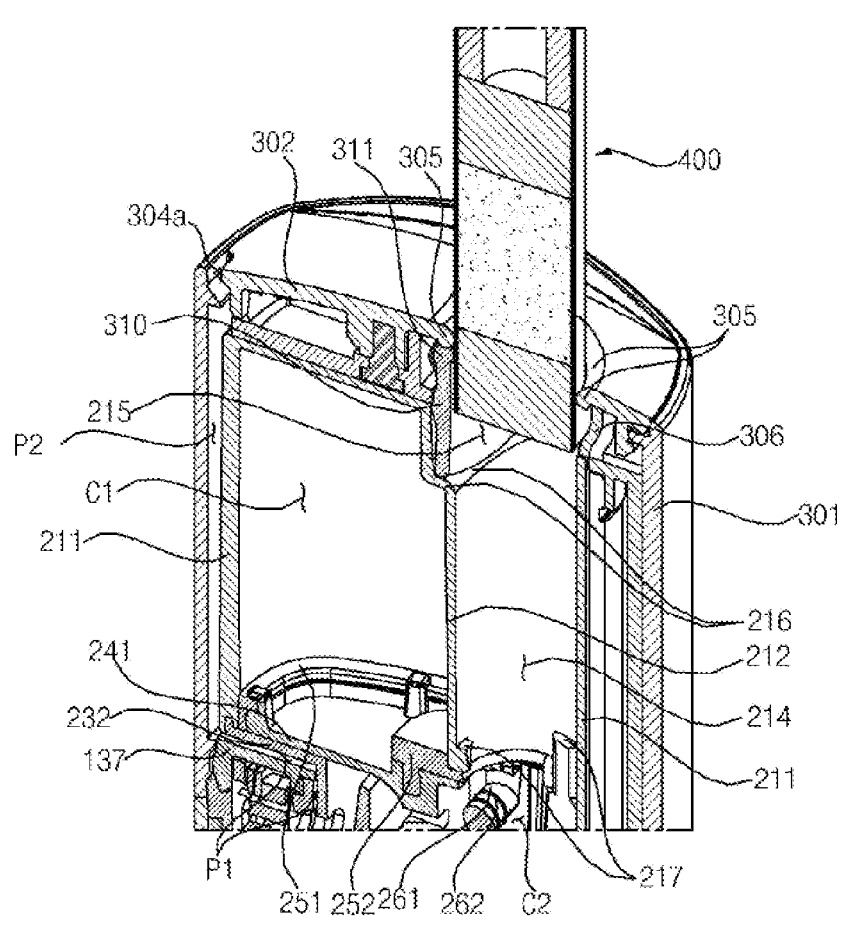

【FIG. 15】
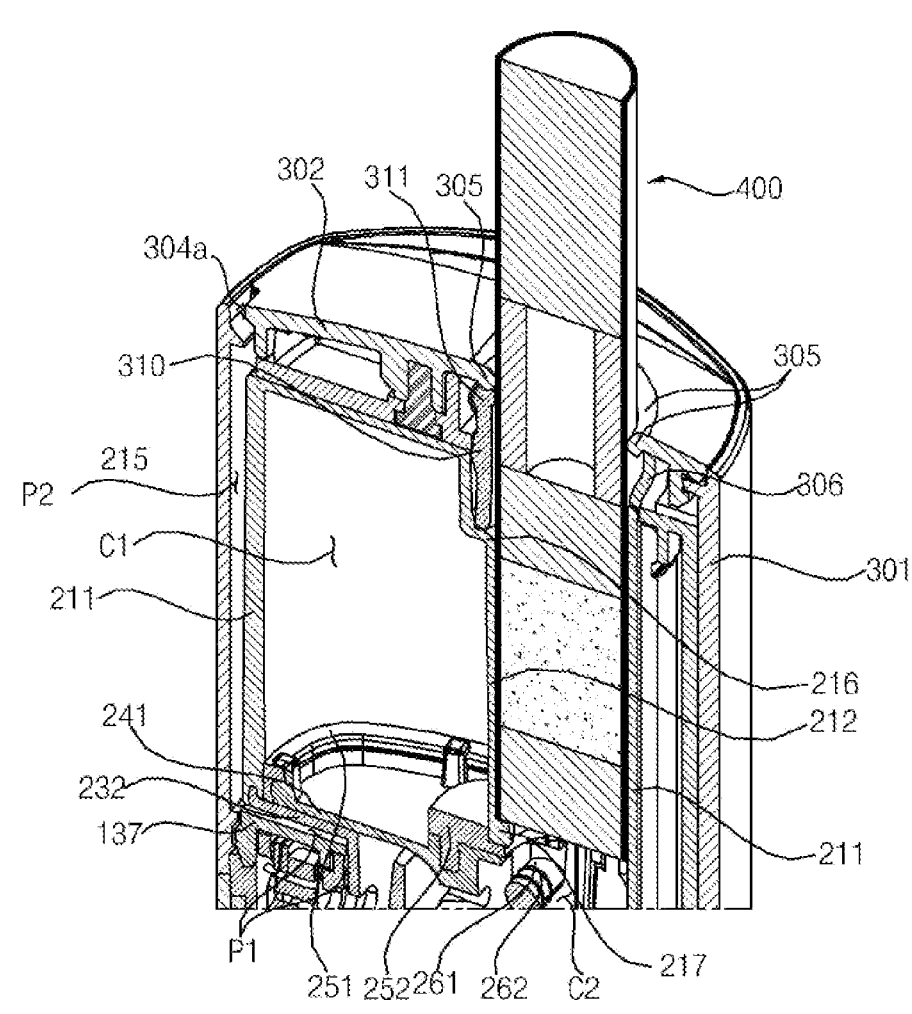

【FIG. 16】
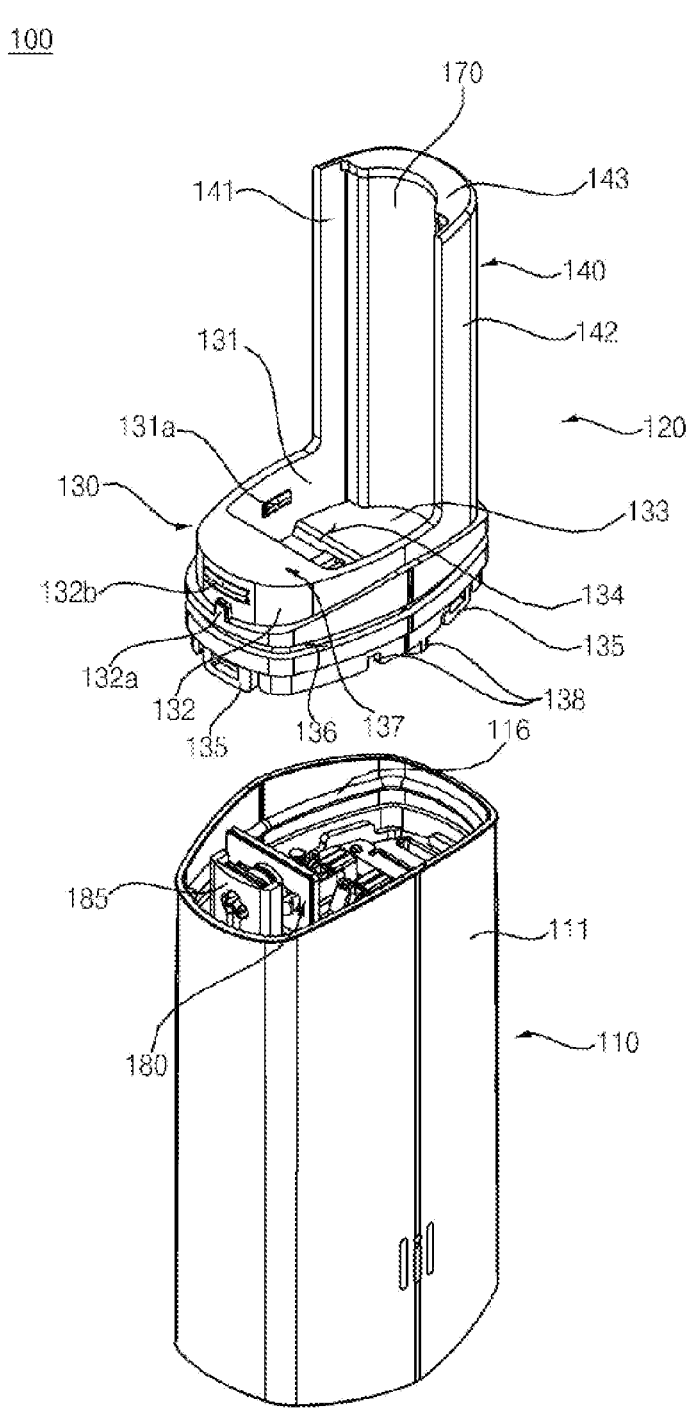

【FIG. 17】
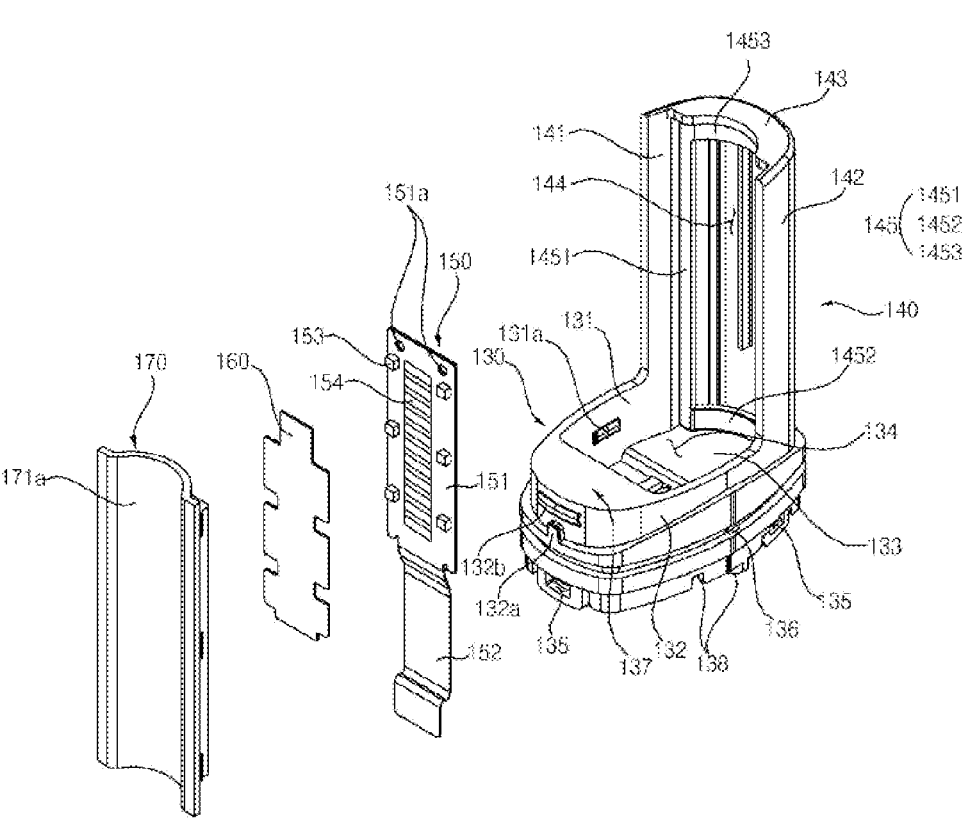

【FIG. 18】
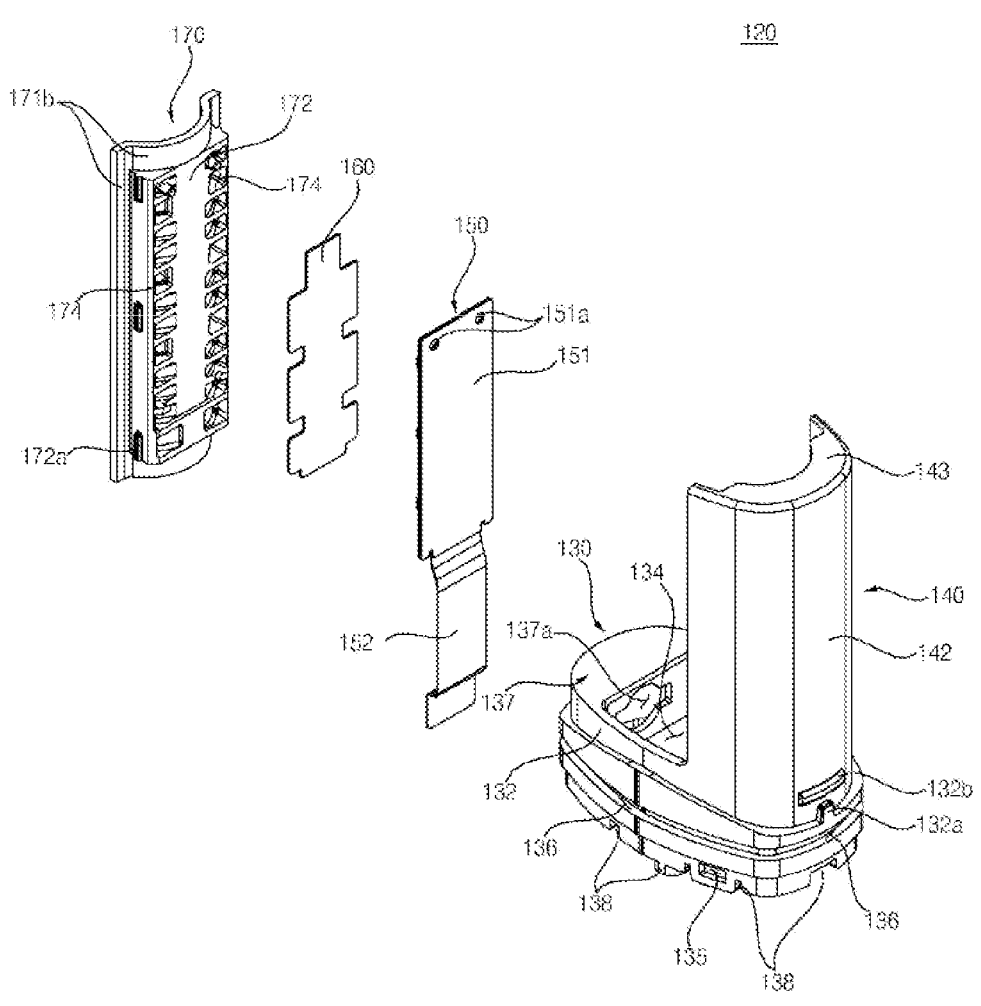

【FIG. 19】
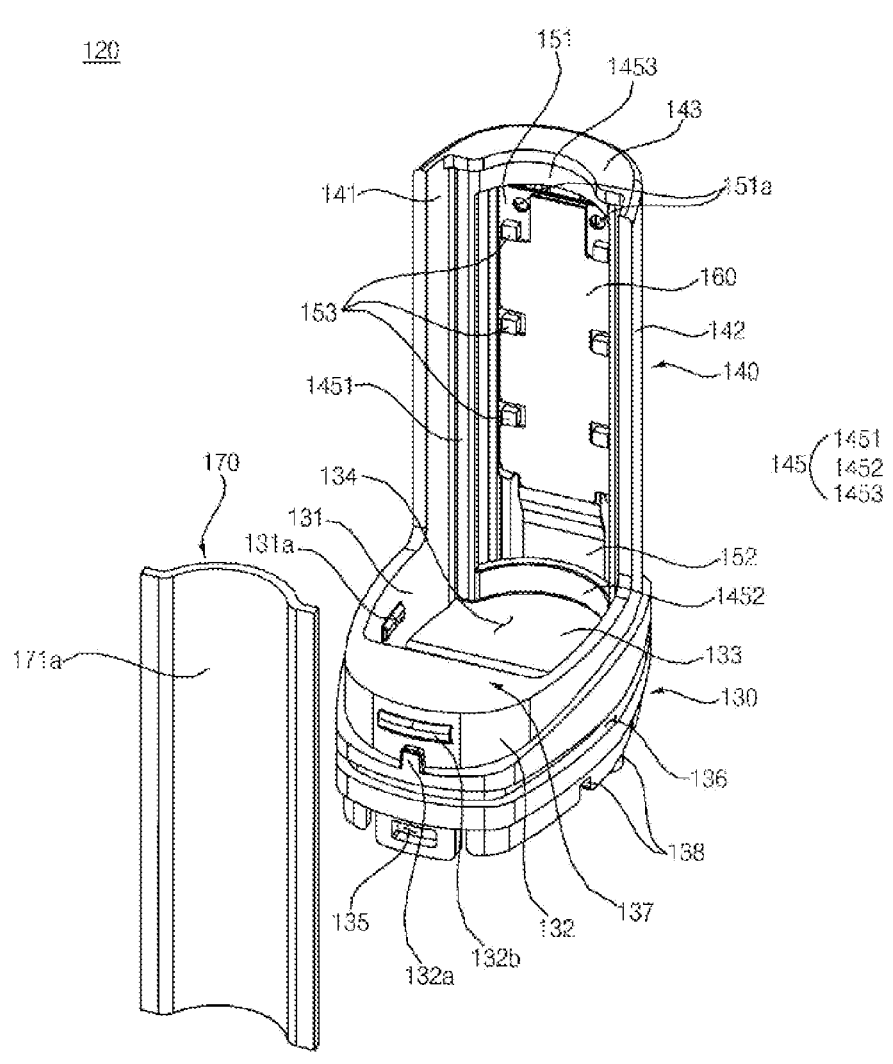

【FIG. 20】
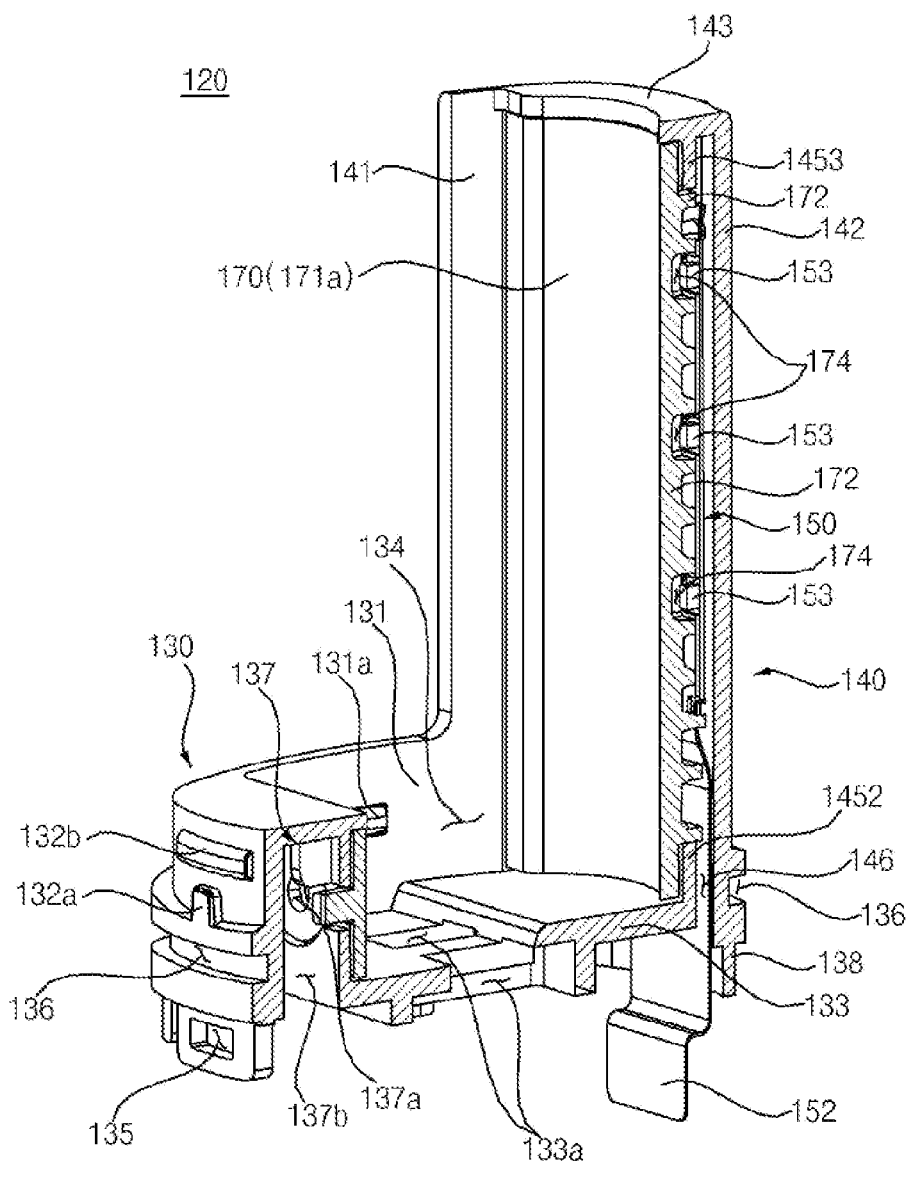

【FIG. 21】
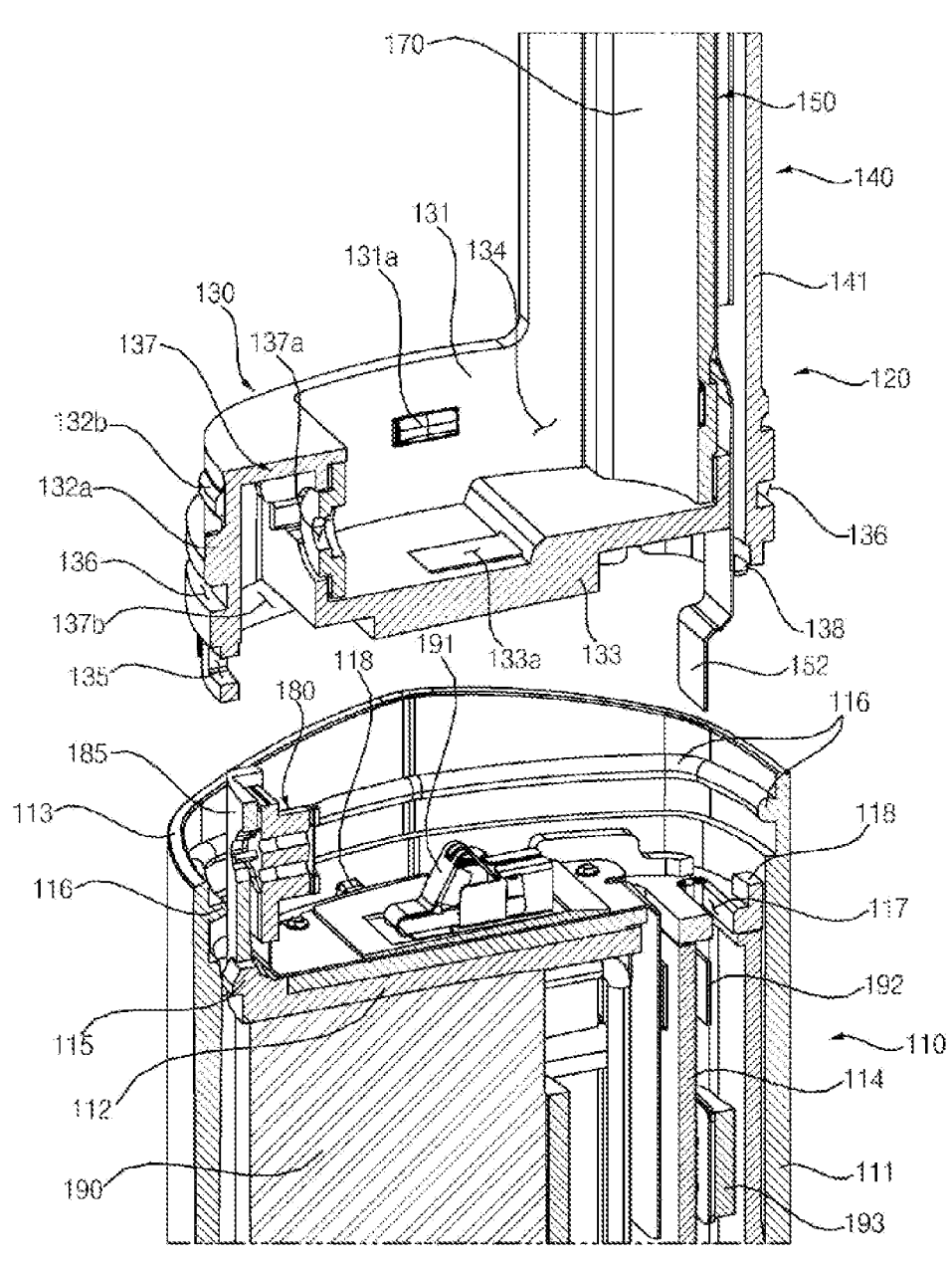

【FIG. 22】
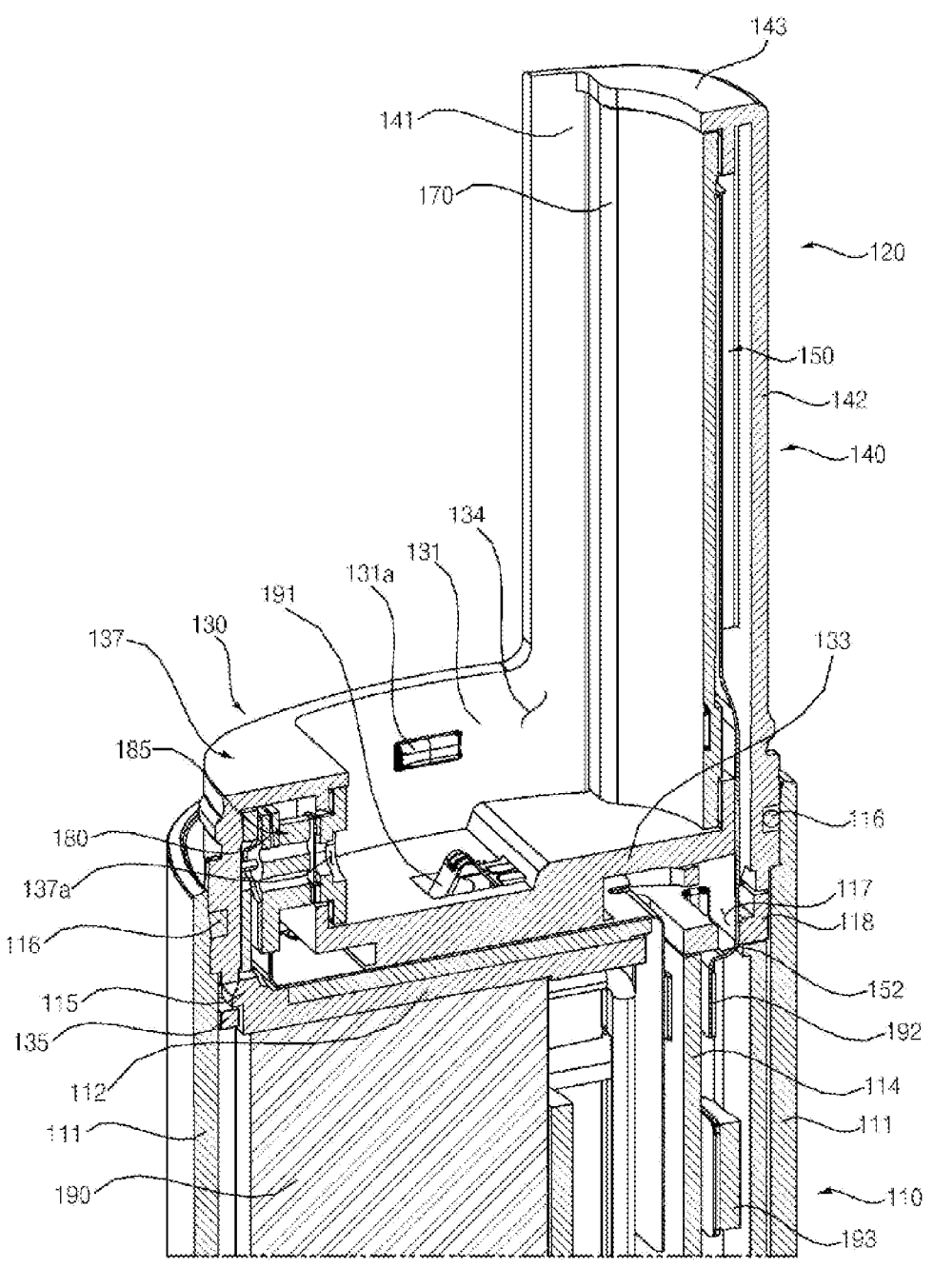

【FIG. 23】
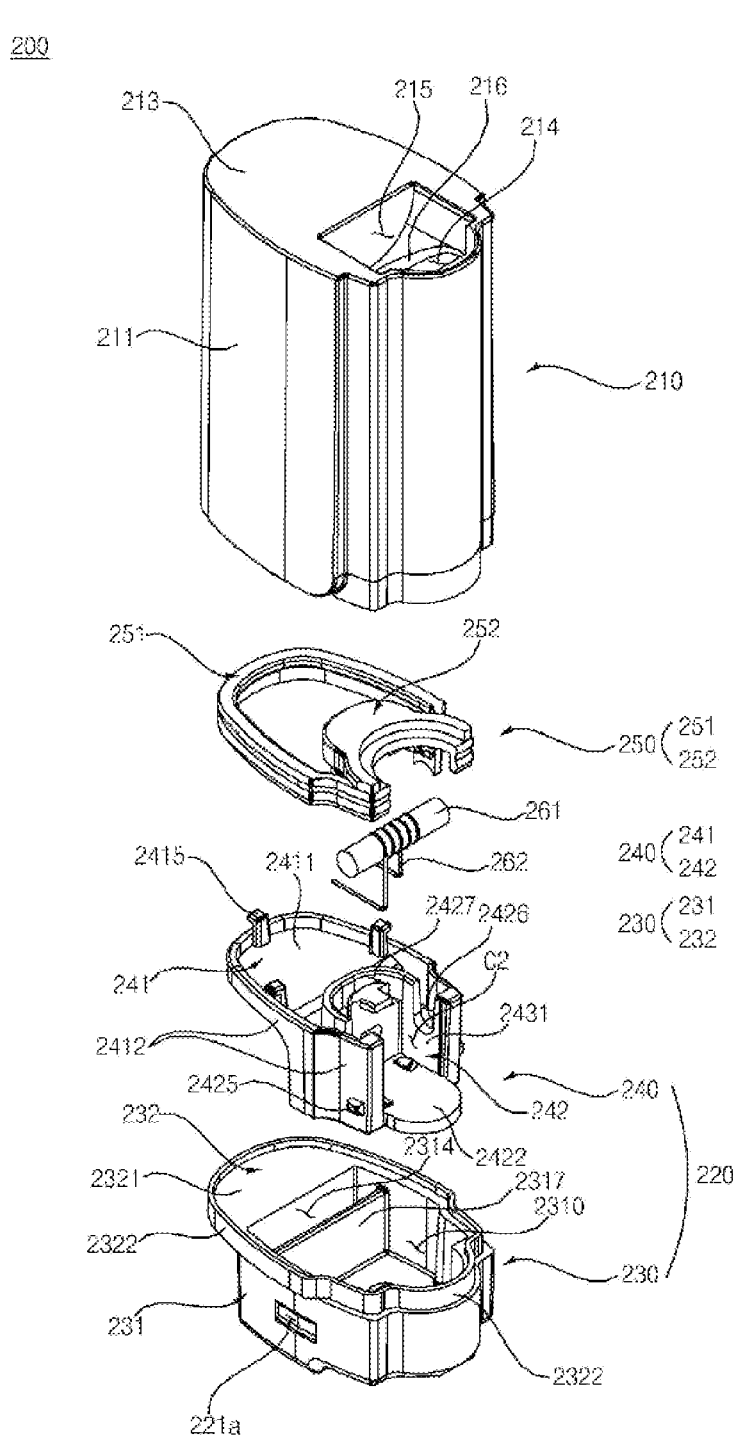

【FIG. 24】
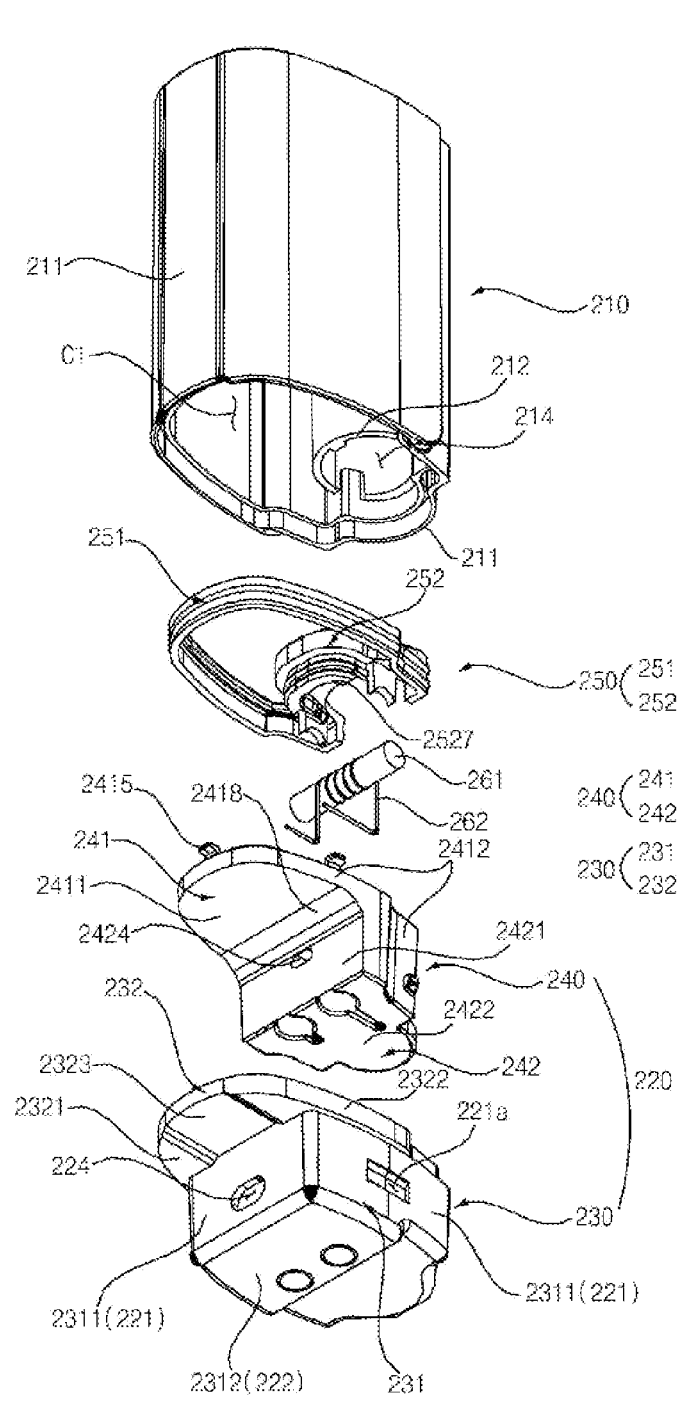

【FIG. 25】
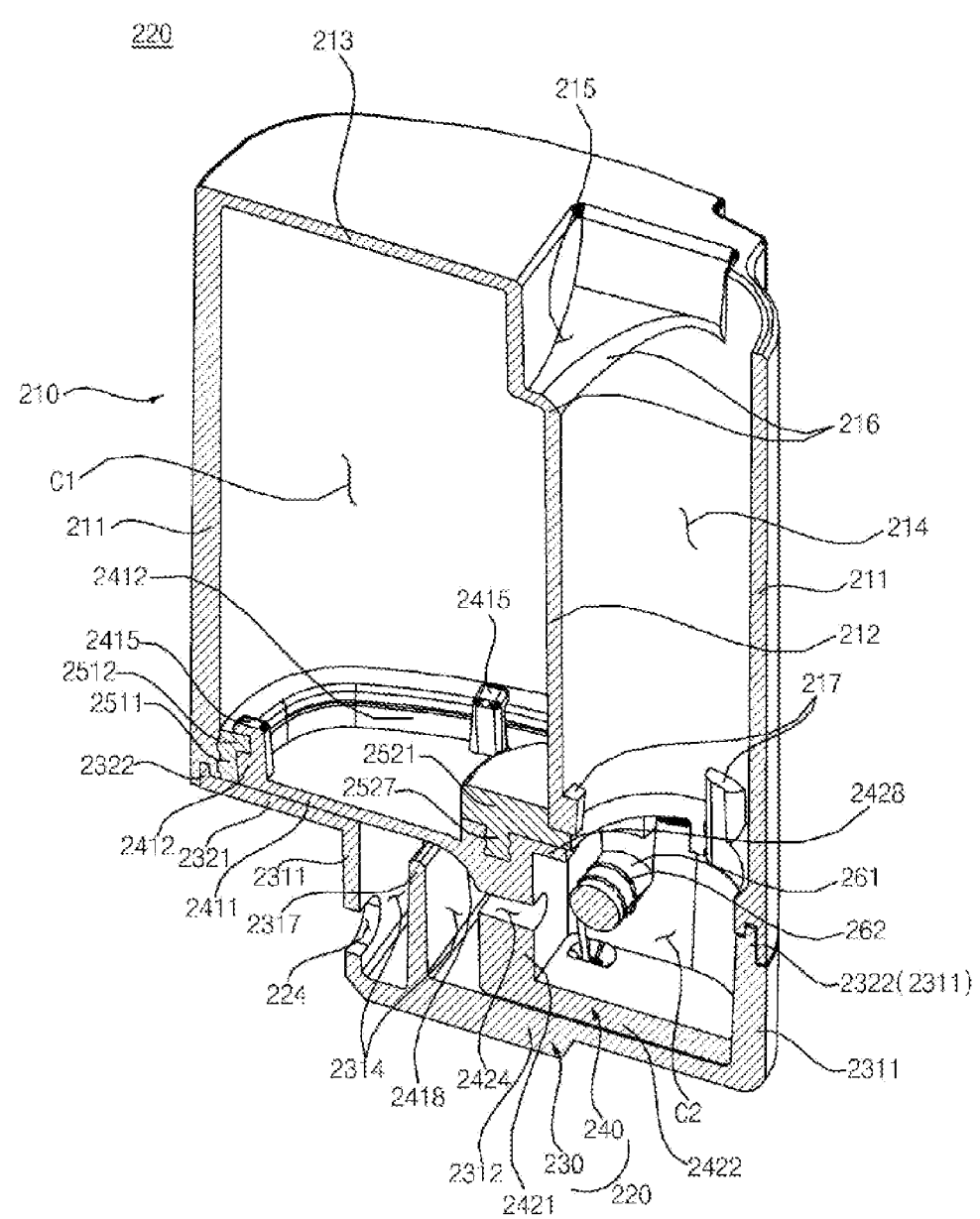

【FIG. 26】
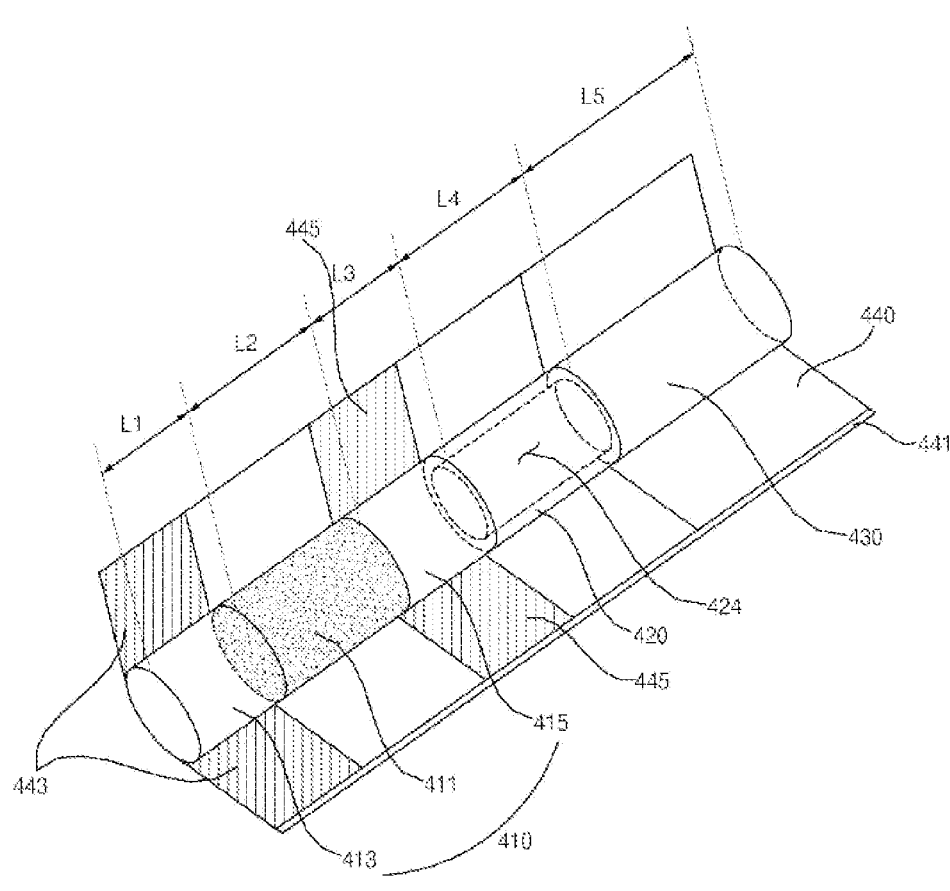

【FIG. 27】
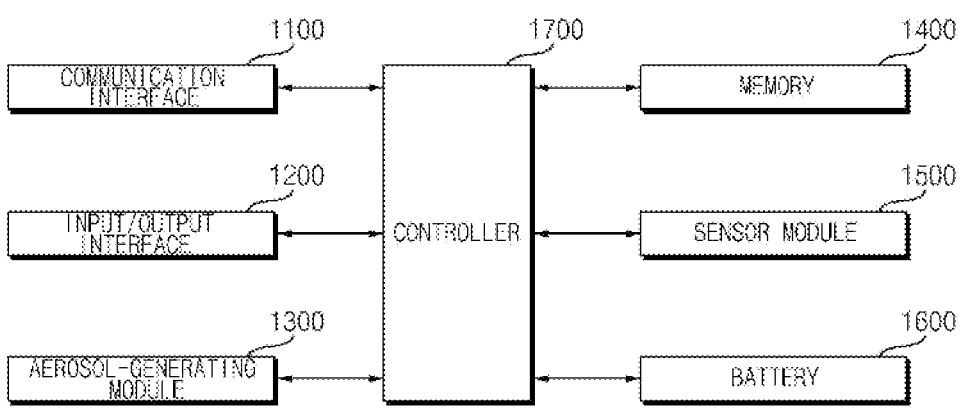

【FIG. 28】
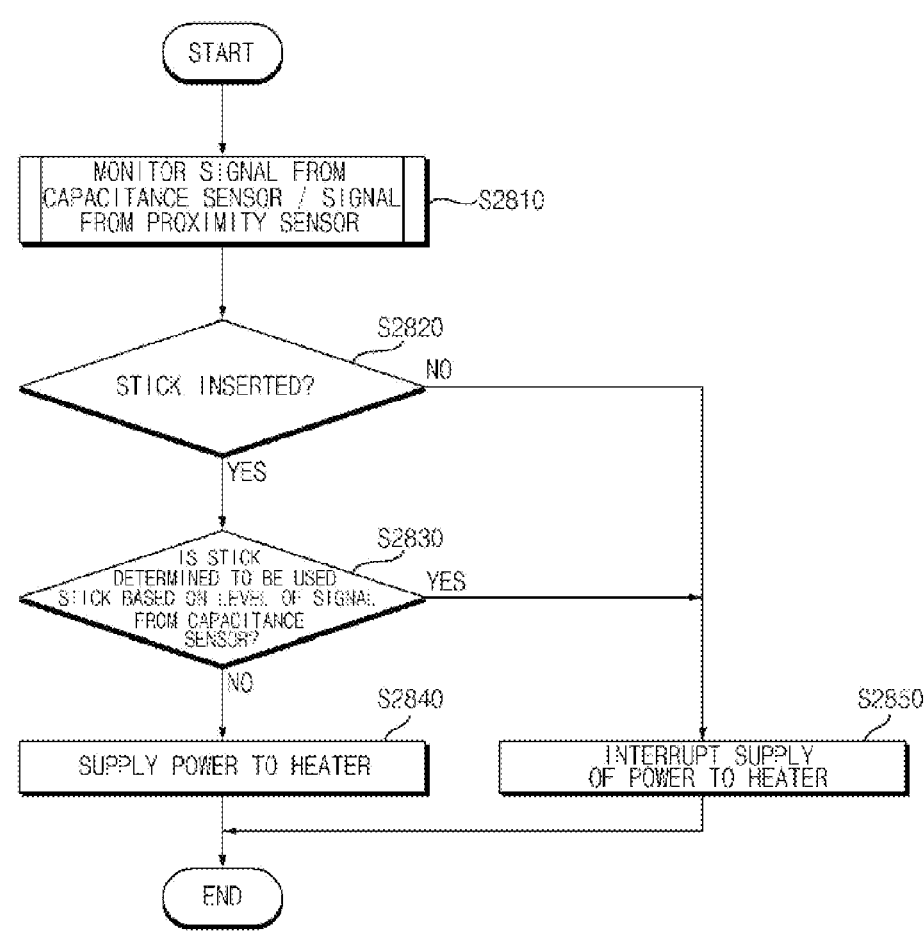

【FIG. 29】
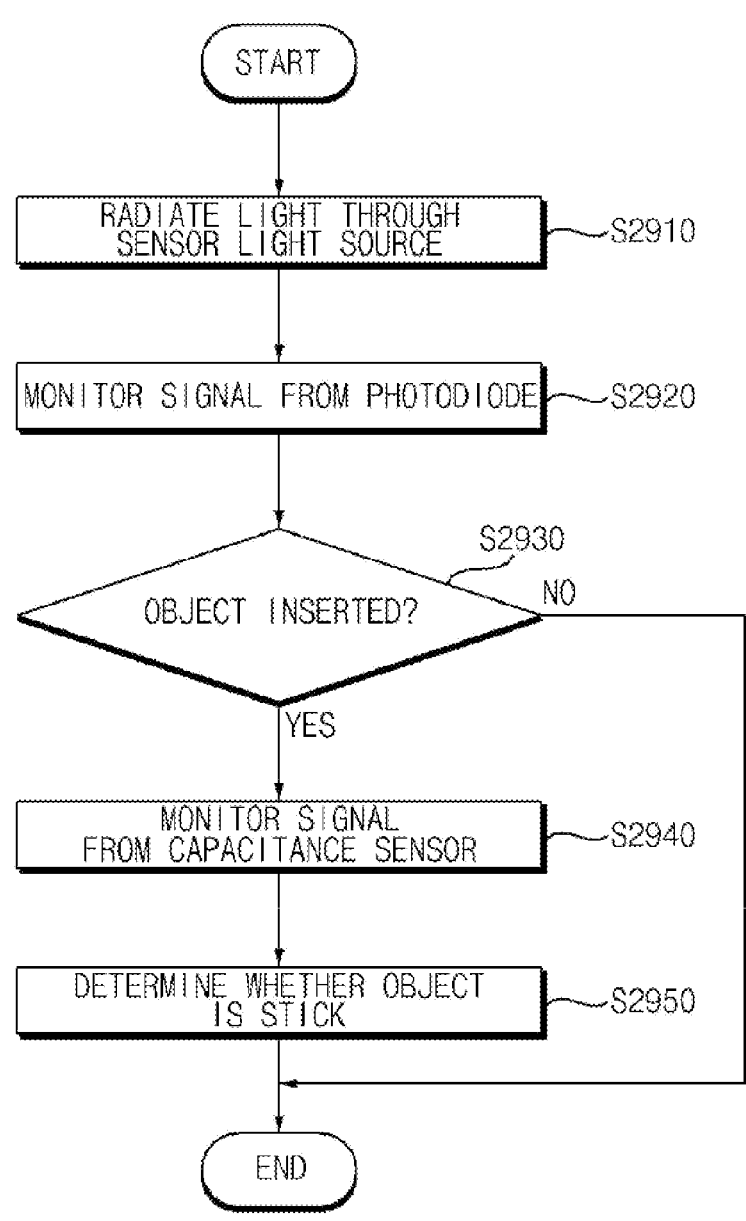

【FIG. 30】
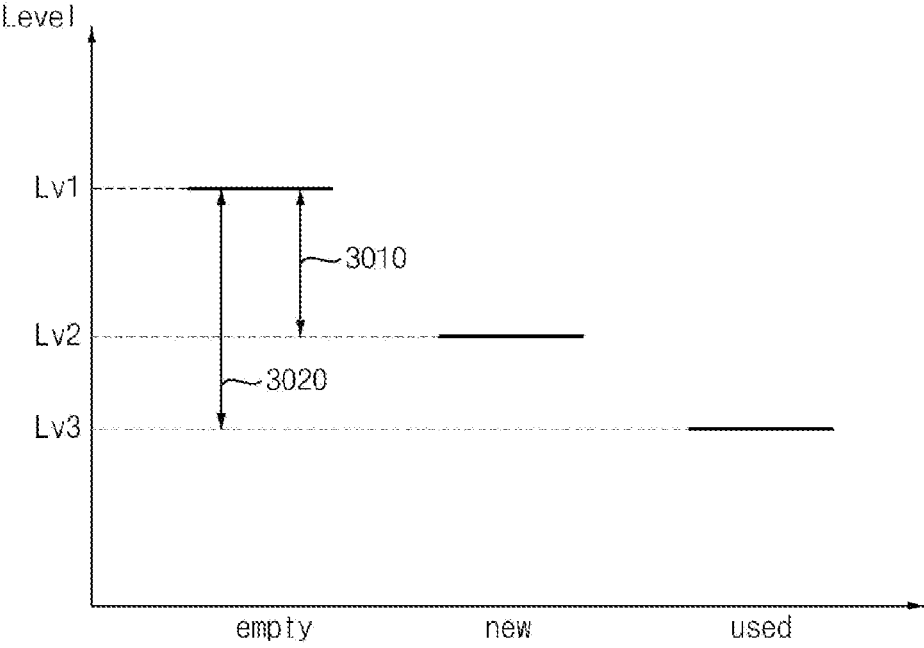
【FIG. 31】
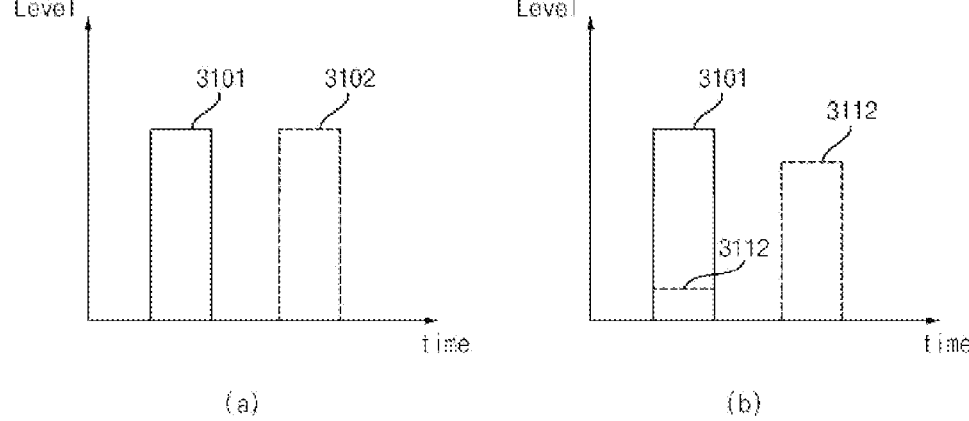

[Fig. 32]
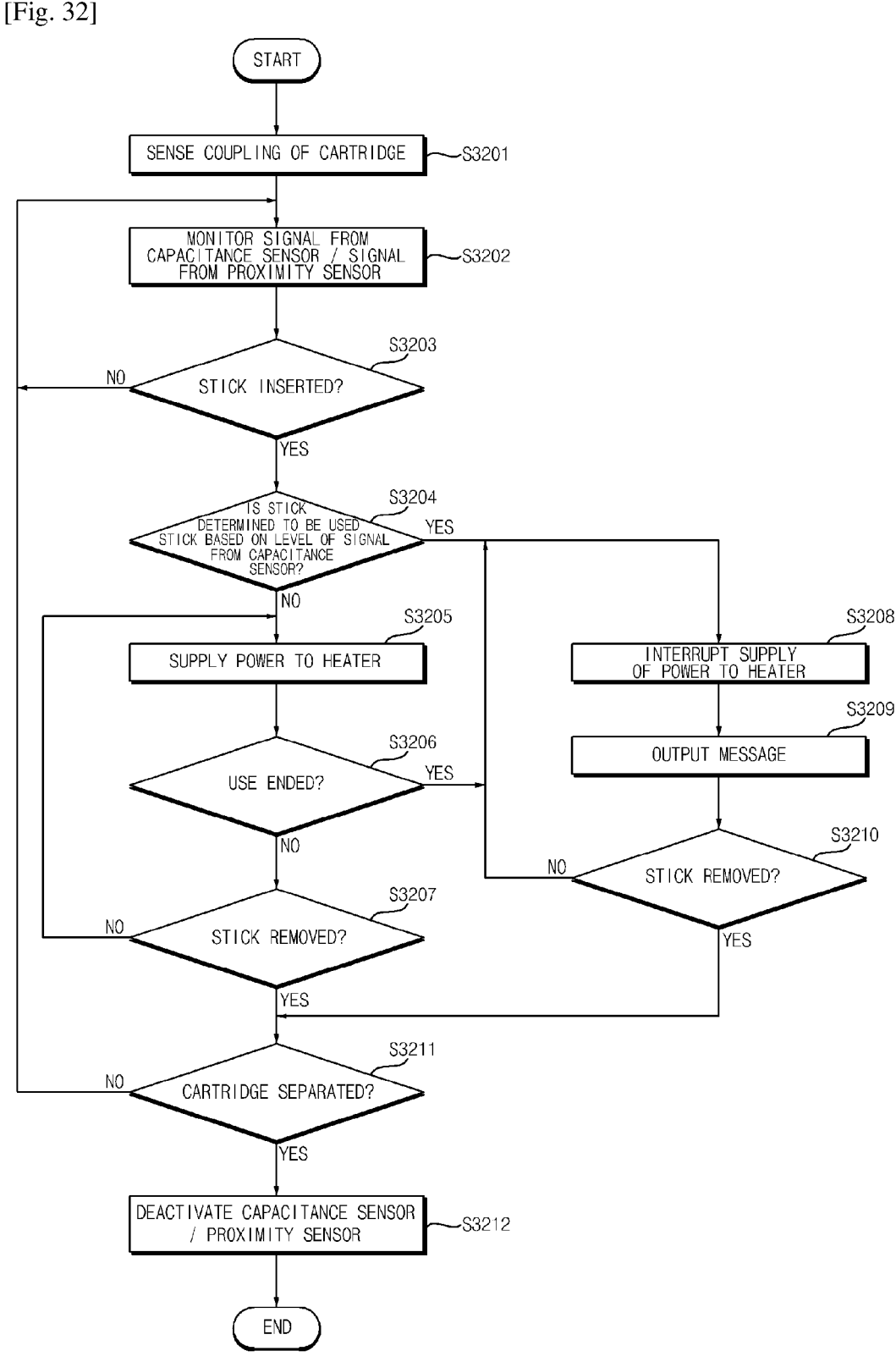

AEROSOL-GENERATING DEVICE

CROSS-REFERENCE TO RELATED APPLICATIONS

This application is the National Stage filing under 35 U.S.C. 371 of International Application No. PCT/KR2022/007183, filed on May 19, 2022, which claims the benefit of earlier filing date and right of priority to Korean Application No. 10-2021-0065341, filed on May 21, 2021, the contents of which are all hereby incorporated by reference herein their entirety.

TECHNICAL FIELD

The present disclosure relates to an aerosol-generating device.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various research on aerosol-generating devices has been conducted.

DISCLOSURE OF INVENTION

Technical Problem

It is an object of the present disclosure to solve the above and other problems.

It is another object of the present disclosure to provide an aerosol-generating device capable of improving gas flow efficiency and thus improving the efficiency of transfer of heat from an aerosol to a stick.

It is still another object of the present disclosure to provide an aerosol-generating device capable of determining at least one of whether a stick is inserted into a cartridge or whether an inserted stick is a used stick.

It is still another object of the present disclosure to provide an aerosol-generating device including sensors capable of more accurately determining information about a stick.

Solution to Problem

In accordance with an aspect of the present disclosure for accomplishing the above objects, there is provided an aerosol-generating device including a cartridge having therein an insertion space formed to be elongated, a body coupled to the cartridge, a plurality of sensors, and a controller. The plurality of sensors includes a capacitance sensor, disposed in the body so as to be adjacent to the insertion space in the cartridge coupled to the body, and a proximity sensor, including a sensor light source configured to radiate light and a photodiode configured to respond to light incident thereon. The controller determines whether a stick is inserted into the insertion space based on a signal received from at least one of the plurality of sensors. When a stick is inserted into the insertion space, the controller determines whether the stick inserted into the insertion space is a used stick based on the level of a signal received from the capacitance sensor.

Advantageous Effects of Invention

According to at least one of embodiments of the present disclosure, gas flow efficiency may be improved, and accordingly, the efficiency of transfer of heat from an aerosol to a stick may be improved.

According to at least one of embodiments of the present disclosure, it is possible to determine at least one of whether a stick is inserted into a cartridge or whether an inserted stick is a used stick.

According to at least one of embodiments of the present disclosure, sensors capable of more accurately determining information about a stick may be provided.

Additional applications of the present disclosure will become apparent from the following detailed description. However, because various changes and modifications will be clearly understood by those skilled in the art within the spirit and scope of the present disclosure, it should be understood that the detailed description and specific embodiments, such as preferred embodiments of the present disclosure, are merely given by way of example.

BRIEF DESCRIPTION OF DRAWINGS

The above and other objects, features, and other advantages of the present disclosure will be more clearly understood from the following detailed description taken in conjunction with the accompanying drawings, in which:

FIGS. 1 to 26 are views showing examples of an aerosol-generating device according to embodiments of the present disclosure;

FIG. 27 is a block diagram of an aerosol-generating device according to an embodiment of the present disclosure;

FIGS. 28 and 29 are flowcharts showing an operation method of the aerosol-generating device according to an embodiment of the present disclosure;

FIGS. 30 and 31 are views for explaining the operation of the aerosol-generating device; and FIG. 32 is a flowchart showing an operation method of the aerosol-generating device according to another embodiment of the present disclosure.

BEST MODE FOR CARRYING OUT THE INVENTION

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

Referring to FIG. 1, an aerosol-generating device may include at least one of a body 100, a cartridge 200, or a cap 300.

The body 100 may include at least one of a lower body 110 or an upper body 120. The lower body 110 may accommodate various components necessary for power supply or control, such as a battery or a controller. The lower body 110 may form the external appearance of the aerosol-generating device. The upper body 120 may be disposed on the lower body 110. The cartridge 200 may be coupled to the upper body 120. The body 100 may be referred to as a main body 100.

The upper body 120 may include at least one of a mount 130 or a column 140. The mount 130 may be disposed on the lower body 110. The mount 130 may provide a space 134 into which the lower portion of the cartridge 200 is inserted. The mount 130 may have an open upper side, and may define therein the space 134. The mount 130 may surround the lower portion of the cartridge 200 inserted into the space 134. The mount 130 may fix the cartridge 200. The mount 130 may support the lower portion of the cartridge 200.

The column 140 may be disposed on the lower body 110. The column 140 may have an elongated shape. The column 140 may extend upwards from one side of the mount 130. The column 140 may face one side wall of the cartridge 200. The column 140 may be disposed parallel to the cartridge 200. The column 140 may have a shape that covers the side wall of the cartridge 200. The column 140 may support the side wall of the cartridge 200.

A first chamber C1 may be formed in a portion of the inside of a first container 210, and an insertion space 214 may be formed in another portion of the inside of the first container 210. The insertion space 214 may be disposed adjacent to the column 140. The column 140 may be disposed adjacent to the other portion of the inside of the first container 210 in which the insertion space 214 is formed.

The cartridge 200 may be detachably coupled to the body 100. The cartridge 200 may provide space for storing liquid therein. The cartridge 200 may have the insertion space 214 formed therein. One end of the insertion space 214 may be open to form an opening. The insertion space 214 may be exposed to the outside through the opening. The opening may be defined as one end of the insertion space 214.

The cartridge 200 may include at least one of a first container 210 or a second container 220. The second container 220 may be coupled to the first container 210.

The first container 210 may be coupled to the upper side of the second container 220. The first container 210 may provide space for storing liquid therein. The first container 210 may have an open upper side, and may have formed therein the insertion space 214, which is elongated in the vertical direction. A stick 400 (refer to FIG. 3) may be inserted into the insertion space 214. One side wall of the first container 210 may face the column 140. The column 140 may cover the side wall of the first container 210. The first container 210 may be disposed on the mount 130.

The second container 220 may be coupled to the lower side of the first container 210. The second container 220 may provide space for mounting a wick 261 (refer to FIG. 2) and a heater 262 (refer to FIG. 2) therein. The second container 220 may be inserted into the space 134 provided by the mount 130. The space 134 in the mount 130 may be referred to as a cartridge accommodation space 134. The mount 130 may surround the second container 220. The second container 220 may be coupled to the mount 130.

The cap 300 may be detachably coupled to the body 100. The cap 300 may cover the cartridge 200. The cap 300 may cover at least a portion of the body 100. The cap 300 may protect the cartridge 200 and/or at least a portion of the body 100 from the outside. A user may separate the cap 300 from the body 100 in order to replace the cartridge 200.

The cap 300 may be coupled to the upper portion of the body 100. The cap 300 may be coupled to the upper side of the lower body 110. The cap 300 may cover the upper body 120. The cap 300 may cover the cartridge 200. A side wall 301 of the cap 300 may surround the side portion of the cartridge 200. The side wall 301 of the cap 300 may surround the side portion of the upper body 120. An upper wall 303 of the cap 300 may cover the upper portion of the cartridge 200. The upper wall 303 of the cap 300 may cover the upper portion of the column 140.

The cap 300 may have an insertion hole 304 formed therein. The upper wall 303 of the cap 300 may be open to form the insertion hole 304. The insertion hole 304 may be formed at a position corresponding to the insertion space 214. The insertion hole 304 may communicate with one end or the upper end of the insertion space 214.

The cap 300 may have a cap inlet 304a formed therein. One side of the cap 300 may be open to form the cap inlet 304a. For example, the upper wall 303 of the cap 300 may be open to form the cap inlet 304a. For example, the side wall 301 of the cap 300 may be open to form the cap inlet 304a. The cap inlet 304a may communicate with the outside. Air may be introduced into the aerosol-generating device through the cap inlet 304a.

Referring to FIGS. 1 and 2, the cartridge 200 may be coupled to the body 100. The cartridge 200 may provide the first chamber C1 for storing liquid therein. The cartridge 200 may provide the insertion space 214, which is formed separately from the first chamber C1. The cartridge 200 may have formed therein an opening. One end of the insertion space 214 may be open to form the opening in the cartridge 200. The opening may expose the insertion space 214 to the outside.

The first container 210 may include an outer wall 211, which surrounds an inner space formed therein. The first container 210 may include an inner wall 212, which partitions the space surrounded by the outer wall 211 into the first chamber C1 on one side and the elongated insertion space 214 on another side. The insertion space 214 may have a shape that is elongated in the vertical direction. The inner wall 212 of the first container 210 may be formed inside the first container 210). A stick 400 (refer to FIG. 3) may be inserted into the insertion space 214.

The second container 220 may be coupled to the first container 210. The second container 220 may include a second chamber C2 communicating with the insertion space 214. The second chamber C2 may be formed in the second container 220. The second chamber C2 may be connected to the opposite end or the lower end of the insertion space 214.

One side of the cartridge 200 may be open to form a cartridge inlet 224. The outer wall of the second container 220 may be open to form the cartridge inlet 224. The cartridge inlet 224 may communicate with the insertion space 214. The cartridge inlet 224 may communicate with the second chamber C2. The cartridge inlet 224 may be formed in a side wall 221 of the second container 210.

The wick 261 may be disposed in the second chamber C2. The wick 261 may be connected to the first chamber C1. The wick 261 may receive liquid from the first chamber C1. The heater 262 may heat the wick 261. The heater 262 may be disposed in the second chamber C2. The heater 262 may be wound around the wick 261 multiple times. The heater 262 may be electrically connected to a battery 190 and/or a control device. The heater 262 may be a resistive coil. When the heater 262 generates heat and thus the wick 261 is heated, the liquid supplied to the wick 261 is atomized, and accordingly, an aerosol may be generated in the second chamber C2.

Accordingly, the first chamber C1 in the first container 210, in which the liquid is stored, may be disposed so as to surround the stick 400 (refer to FIG. 3) and/or the insertion space 214, into which the stick 400 is inserted, with the result that the efficiency of use of space for storing the liquid may be improved.

In addition, the distance from the stick 400 to the wick 261, which is connected to the first chamber C1, and the heater 262 may be reduced, thus making it possible to increase the efficiency of transfer of heat from the aerosol.

A printed circuit board (PCB) assembly 150 may be mounted in the column 140. At least one of a light source 153 or a sensor 154 may be mounted on a PCB 151 of the PCB assembly 150 (refer to FIG. 16). The PCB assembly 150 may be mounted so as to face the side portion of the cartridge 200. The light source 153 of the PCB assembly 150 may provide light to the cartridge 200. The sensor 154 of the PCB assembly 150 may sense information about the inside and the outside of the cartridge 200. The sensor 154 mounted on the PCB assembly 150 may be referred to as a first sensor 154.

A sensor 180 may be mounted on one side of the upper portion of the lower body 110. The sensor 180 may be disposed above a partition wall 112 of the lower body 110. The sensor 180 may sense the flow of air that is introduced into the cartridge 200. The sensor 180 may be an airflow sensor or a pressure sensor. The sensor 180 may be referred to as a second sensor 180.

The sensor 180 may be inserted into the mount 130. The sensor 180 may be disposed so as to face the side portion of the mount. The sensor 180 may be disposed adjacent to the cartridge inlet 224. The sensor 180 may be disposed so as to face the cartridge inlet 224.

The lower body 110 may accommodate the battery 190 therein. The lower body 110 may accommodate various control devices therein. The battery 190 may supply power to various components of the aerosol-generating device. The battery 190 may be charged through a charging port 119, which is formed in one side or the lower portion of the lower body 110.

The partition wall 112 of the lower body 110 may cover the upper portion of the battery 190. The partition wall 112 of the lower body 110 may be disposed below the mount 130 and/or the column 140. A body frame 114 of the lower body 110 may support the side portion of the battery 190. The body frame 114 may separate the space in which the battery 190 is accommodated from the space in which the control devices are accommodated.

Referring to FIGS. 2 and 3, the stick 400 may have an elongated shape. The stick 400 may contain a medium therein. The stick 400 may be inserted into the insertion space 214.

A cover 310 may open and close the insertion space 214. The cover 310 may open and close an opening that exposes the insertion space 214 to the outside. The cover 310 may be mounted adjacent to the opening in the insertion space 214. The cover 310 may be mounted adjacent to one end or the upper end of the insertion space 214. For example, the cover 310 may be mounted to the upper end of the first container 210 at a position adjacent to the insertion space 214. For example, the cover 310 may be mounted to the cap 300 at a position adjacent to the insertion space 214.

The cover 310 may be pivotably mounted. The cover 310 may be pivoted to open and close the insertion space 214. The cover 310 may be pivoted toward the inside of the insertion space 214 to open the insertion space 214. The direction in which the cover 310 is pivoted to open the insertion space 214 may be referred to as a first direction. The cover 310 may be pivoted toward the outside of the insertion space 214 to close the insertion space 214. The direction in which the cover 310 is pivoted to close the insertion space 214 may be referred to as a second direction.

When an end of the stick 400 is brought into contact with the cover 310 and pushes the cover 310, the cover 310 may be pivoted in the first direction to open the insertion space 214. The stick 400 may push the cover 310, and may be inserted into the insertion space 214. When the stick 400 is separated from the insertion space 214, the cover 310 may be pivoted in the second direction to close the insertion space 214.

A spring 312 (refer to FIG. 9) may provide elastic force to the cover 310 in the second direction. One end of the spring 312 may support the cover 310, and the other end of the spring 312 may support the upper end of the first container 210 or the cap 300. The spring 312 may be wound around a pivot shaft of the cover 310.

The cover 310 may be mounted near the insertion hole 304 in the cap 300. The cover 310 may be pivotably mounted to the cap 300. The cover 310 may be pivoted to open and close the insertion hole 304. The cover 310 may be pivoted in the first direction to open the insertion hole 304. The cover 310 may be pivoted in the second direction to close the insertion hole 304.

The stick 400 may be inserted into the insertion space 214 through the insertion hole 304 in the cap 300. When the end of the stick 400 is brought into contact with the cover 310 and pushes the cover 310, the cover 310 may be pivoted in the first direction to open the insertion space 214 and the insertion hole 304. The stick 400 may push the cover 310, and may be inserted into the insertion space 214 through the insertion hole 304. When the stick 400 is separated from the insertion space 214, the cover 310 may be pivoted in the second direction to close the insertion space 214 and the insertion hole 304.

When the stick 400 is inserted into the insertion space 214, one end of the stick 400 may be exposed to the outside of the cap 300, and the other end of the stick 400 may be disposed above the second chamber C2 at a position adjacent to the second chamber C2. The user may hold the exposed end of the stick 400 in the mouth, and may inhale air.

Air may be introduced into the aerosol-generating device through the cap inlet 304a. The air introduced through the cap inlet 304a may flow into the cartridge inlet 224. The air may flow into the cartridge 200 through the cartridge inlet 224. The air that has passed through the cartridge inlet 224 may be introduced into the second chamber C2, and may then flow toward the insertion space 214. The air may pass through the stick 400 together with the aerosol generated in the second chamber C2.

As described above, when the stick 400 is inserted into the insertion space 214, the insertion space 214 may be opened by the pivoting movement of the cover 310.

In addition, simultaneously with separation of the stick 400 from the insertion space 214, the insertion space 214 may be automatically closed by the pivoting movement of the cover 310.

In addition, the inside of the insertion space 214 may be protected from external foreign substances.

Referring to FIGS. 4 to 6, the cartridge 200 may be detachably coupled to the upper body 120. The upper body 120 may be disposed on the lower body 110. The upper body 120 may include at least one of the mount 130 or the column 140.

The mount 130 may provide a space 134 having an open top. The inner side surface 131 and the bottom 133 of the mount 130 may surround at least a portion of the space 134. The inner side wall 141 of the column 140 may surround one side of the space 134. The second container 220 may be inserted into the space 134 provided by the mount 130. The mount 130 may surround the second container 220 inserted into the space 134.

The cartridge 200 may be coupled to the mount 130 in a snap-fit manner. The second container 220 may be coupled to the mount 130 in a snap-fit manner. The second container 220) may be detachably engaged with the mount 130. When the second container 220 is inserted into the space 134 in the mount 130, a depressed portion 221a formed in the second container 220) and a protruding portion 131a formed on the mount 130 may be engaged with each other.

The depressed portion 221a may be formed so as to be recessed into the side wall 221 of the second container 220. The depressed portion 221a may be formed in a plural number, and the plurality of depressed portions 221a may be respectively formed in one side and the opposite side of the side wall 221 of the container 220. The protruding portion 131a may be formed so as to protrude from the inner side surface 131 of the mount 130. The protruding portion 131a may be provided in a plural number, and the plurality of protruding portions 131a may be respectively formed on one side and the opposite side of the inner side surface 131 of the mount 130. The protruding portions 131a may be formed at positions corresponding to the depressed portions 221a.

When the second container 220 is coupled to the mount 130, the first container 210 may be disposed on the mount 130. The first container 210 may have a shape that protrudes further in a lateral direction than the second container 220. The second container 220 may be inserted into the space 134 surrounded by the mount 130, and the first container 210 may cover the upper portion of the mount 130).

The mount 130 may support the lower portion of the cartridge 200. The mount 130 may support the side portion and the bottom of the second container 220. The mount 130 may support the lower edge of the first container 210.

The column 140 may extend upwards from one side of the mount 130. The column 140) may surround one side of the space 134 in the mount 130. The inner side wall 141 of the column 140 may be integrally formed with and extend from the inner side surface 131 of the mount 130. The outer side wall 142 of the column 140 may be integrally formed with and extend from the outer side surface 132 of the mount 130.

The column 140 may extend to a height corresponding to the height of the cartridge 200. The upper wall 143 of the column 140 may be formed to a height corresponding to the upper end of the cartridge 200. The column 140 may be formed parallel to the cartridge 200.

The insertion space 214 in the cartridge 200 may be formed adjacent to one side wall of the cartridge 200. The insertion space 214 may be formed adjacent to the column 140. The column 140 may cover the side wall of the cartridge 200, in which the insertion space 214 is formed. The side wall of the cartridge 200 may slide along the inner side wall 141 of the column 140, and may be inserted into the mount 130. The column 140 may support the side wall of the cartridge 200.

A window 170, which protects the PCB assembly 150 (refer to FIG. 3), may be disposed so as to cover the inner side wall 141 of the column 140. The window 170 may be disposed between the cartridge 200 and the column 140. The window 170 may extend in the vertical direction along the column 140. The window 170 may cover one side wall of the cartridge 200, in which the insertion space 214 is formed. The window 170 may support the side wall of the cartridge 200.

Accordingly, the cartridge 200 may be detachably coupled to the body 100.

In addition, the cartridge 200 may be coupled to the body 100, and may thus be stably supported thereby.

An upper edge 113 of the lower body 110 may protrude further outwards than the upper body 120. The upper edge 113 of the lower body 110 may extend along the circumference of the upper body 120. The upper edge 113 of the lower body 110 may be disposed below the upper body 120. When the cap 300 is coupled to the body 100, the lower end of the side wall 301 of the cap 300 may be brought into contact with the upper edge 113 of the lower body 110. The upper edge 113 of the lower body 110 may prevent the cap 300 from moving to a position below the upper body 120.

Referring to FIGS. 7 and 8, the cartridge 200 may have a cover recess 215 formed therein. The cover recess 215 may be adjacent to the opening in the insertion space 214. The cover recess 215 may be recessed from the insertion space 214 in the direction in which the circumference of the insertion space 214 expands. The cover recess 215 may be recessed outwards from the insertion space 214. The cover recess 215 may be recessed from the insertion space 214 in a radially outward direction. The cover recess 215 may be recessed from the insertion space 214 toward the first chamber C1. The cover recess 215 may provide space in which to place the cover 310.

The cover recess 215 may be formed in the first container 210 at a position near one end or the upper end of the insertion space 214. The cover recess 215 may be formed in a manner such that the circumference of the end portion of the insertion space 214 is recessed outwards. The cover 310 may be received in the cover recess 215 (refer to FIGS. 10 and 11). When the cover 310 opens the opening in the insertion space 214, the cover 310 may be received in the cover recess 215. When the cover 310 opens the opening in the insertion space 214, the cover 310 may pivot in the first direction to be received in the cover recess 215.

The cover recess 215 may be formed in a manner such that one end portion or the upper end portion of the inner wall 212 of the first container 210 is recessed outwards from the insertion space 214. The cover recess 215 may be formed in a manner such that the inner wall 212 of the first container 210) is recessed from the insertion space 214 toward the first chamber C1. The inner wall 212 of the first container 210 may define the cover recess 215. The inner wall 212 of the first container 210 may surround at least a portion of the cover recess 215. The inner wall 212 of the first container 210 may be contiguous with the bottom of the cover recess 215. The inner wall 212 of the first container 210 may cover a part of the side portion of the cover recess 215.

The cartridge 200 may include a first guide 216, which is formed at a position adjacent to the upper portion of the insertion space 214 so as to be inclined in the downward direction of the insertion space 214. The first guide 216 may be formed at the upper end portion of the inner wall 212 of the first container 210. The first guide 216 may be referred to as a first stick guide 216.

The first guide 216 may be contiguous with the bottom of the cover recess 215. The first guide 216 may be formed on the inner wall 212 of the first container 210 at a position that is contiguous with the bottom of the cover recess 215. The first guide 216 may be formed between the bottom of the cover recess 215 and the insertion space 214. The first guide 216 may be disposed below the cover recess 215. The first guide 216 may be formed so as to be inclined from the bottom of the cover recess 215 toward the lower side of the insertion space 214.

The first guide 216 may extend in the circumferential direction along at least a portion of the insertion space 214. The first guide 216 may extend in the circumferential direction along the inner wall 212 of the first container 210. The first guide 216 may come into contact with an end portion of the stick 400 (refer to FIG. 3), and may guide insertion of the stick 400 into the insertion space 214.

Referring to FIG. 8, the cartridge 200 may include at least one of a first container 210, a second container 220, a sealing member 250, a wick 261, or a heater 262. The second container 220 may include at least one of a lower case 230 or a frame 240.

The first container 210 may provide the first chamber C1 and the insertion space 214. The inner wall 212 of the first container 210 may partition the space surrounded by the outer wall 211 of the first container 210 into the first chamber C1 on one side and the insertion space 214 on another side.

The outer wall 211 and the inner wall 212 of the first container 210 may surround the side portion of the first chamber C1. The outer wall 211 and the inner wall 212 of the first container 210 may be connected to each other so as to have an extended shape that surrounds the circumference of the first chamber C1. The upper wall 213 of the first container 210 may cover the upper portion of the first chamber C1. The upper wall 213 of the first container 210 may be connected to the outer wall 211 and the inner wall 212 of the first container 210.

The outer wall 211 and the inner wall 212 of the first container 210 may surround the side portion of the insertion space 214. The insertion space 214 may have a shape that is elongated in the vertical direction. The insertion space 214 may have a shape corresponding to the circumference of the stick 400 (refer to FIG. 3). The insertion space 214 may have a substantially cylindrical shape. The outer wall 211 and the inner wall 212 of the first container 210 may be connected to each other, and may thus have a shape that extends in the circumferential direction so as to surround the circumference of the insertion space 214. The insertion space 214 may have open upper and lower end portions.

The second container 220 may provide the second chamber C2. The second chamber C2 may be disposed below the insertion space 214. The second chamber C2 may communicate with the insertion space 214.

The second container 220 may include at least one of a lower case 230 or a frame 240. The lower case 230 may form the external appearance of the second container 220. The lower case 230 may be coupled to the outer wall 211 or the circumference of the first container 210. The lower case 230 may provide an accommodation space therein. The lower case 230 may support the frame 240. The side wall of the lower case 230 may be open to form the cartridge inlet 224. The cartridge inlet 224 may be formed at a position higher than the bottom of the lower case 230.

Accordingly, it is possible to prevent the liquid in the second chamber C2 from leaking out of the cartridge 200 through the cartridge inlet 224.

The lower case 230 may include at least one of an accommodation portion 231 or an extension portion 232. The accommodation portion 231 may provide an accommodation space therein. The accommodation portion 231 may surround the accommodation space. The accommodation portion 231 may accommodate at least a portion of the frame 240 therein. The side wall of the accommodation portion 231 may be the side wall 221 of the second container 220 (refer to FIG. 4). The side wall of the accommodation portion 231 may be open to form the cartridge inlet 224. The extension portion 232 may extend outwards from the upper end of one side of the accommodation portion 231. The extension portion 232 may support a portion of the frame 240. The accommodation portion 231 may be referred to as a case portion 231. The accommodation portion 231 may be referred to as a case part 231.

The frame 240 may be disposed in the lower case 230. The frame 240 may define the second chamber C2. The frame 240 may surround at least a portion of the second chamber C2. The lower case 230 may surround the remaining portion of the second chamber C2. The frame 240) may form the bottom of the first chamber C1.

The frame 240 may include at least one of a first frame portion 241 or a second frame portion 242. The first frame portion 241 may form the bottom of the first chamber C1. The first chamber C1 may be surrounded by the outer wall 211, the inner wall 212, the upper wall 213, and the first frame portion 241 of the first container 210.

The second frame portion 242 may surround at least a portion of the second chamber C2. The second frame portion 242 may define the second chamber C2. The side wall of the second frame portion 242 may surround at least a part of the side portion of the second chamber C2. The bottom of the second frame portion 242 may form the bottom of the second chamber C2. A chamber inlet 2424 may be formed in the side wall of the second frame portion 242. The chamber inlet 2424 may communicate with the second chamber C2. The second frame portion 242 may be disposed adjacent to the lower side of the inner wall 212 of the first container 210. The chamber inlet 2424 may be formed at a position higher than the bottom of the second chamber C2.

The first frame portion 241 and the second frame portion 242 may be connected to each other. The first frame portion 241 may extend from the second frame portion 242 so as to cover the bottom of the first chamber C1.

The accommodation portion 231 may accommodate the second frame portion 242 therein. The accommodation portion 231 may support the bottom of the second frame portion 242. The accommodation portion 231 may define the second chamber C2 together with the second frame portion 242. The extension portion 232 may support the first frame portion 241. The second frame portion 242 may be disposed in the accommodation portion 231, and the first frame portion 241 may be disposed on the extension portion 232.

A connection passage 2314 may be formed in the accommodation portion 231. The frame 240) may define the connection passage 2314 in the lower case 230. The connection passage 2314 may be formed between the cartridge inlet 224 and the chamber inlet 2424 to interconnect the cartridge inlet 224 and the chamber inlet 2424. The first frame portion 241 may cover the upper portion of the connection passage 2314. The second frame portion 242 may cover the side portion of the connection passage 2314.

A blocking wall 2317 may be formed in the connection passage 2314. The blocking wall 2317 may be formed between the cartridge inlet 224 and the chamber inlet 2424. The blocking wall 2317 may have an elongated shape. The blocking wall 2317 may extend upwards from the bottom of the lower case 230 or the bottom of the frame 240. The blocking wall 2317 may extend to a position higher than the cartridge inlet 224. The blocking wall 2317 may extend to a position higher than the chamber inlet 2424.

Accordingly, it is possible to prevent the liquid in the second chamber C2 from leaking out of the cartridge 200 through the cartridge inlet 224.

A sealing member 250) may be disposed between the first chamber C1 and the second container 220. The sealing member 250) may surround and be in close contact with the edge of the first chamber C1. The sealing member 250 may be made of an elastic material. For example, the sealing member 250 may be made of a material such as rubber or silicon. The sealing member 250) may prevent the liquid stored in the first chamber C1 from leaking from the first chamber C1 into gaps between components.

The sealing member 250) may include at least one of a first sealing portion 251 or a second sealing portion 252. The first sealing portion 251 may extend along the outer wall 211 of the first container 210. The first sealing portion 251 may surround the edge of the outer wall 211 of the first container 210. The first sealing portion 251 may be disposed between and be in close contact with the outer wall 211 of the first container 210 and the frame 240. The first sealing portion 251 may be disposed between and be in close contact with the outer wall 211 of the first container 210 and the first frame portion 241.

Accordingly, it is possible to prevent the liquid stored in the first chamber C1 from leaking through the gap between the outer wall 211 of the first container 210) and the frame 240.

The second sealing portion 252 may extend from the first sealing portion 251 along the inner wall 212 of the first container 210. The second sealing portion 252 may surround and be in close contact with the edge of the inner wall 212 of the first container 210. The second sealing portion 252 may be disposed between and be in close contact with the inner wall of the first container 210 and the frame 240. The second sealing portion 252 may be disposed between and be in close contact with the inner wall of the first container 210 and the second frame portion 242. The second sealing portion 252 may be inserted into the frame 240. The second sealing portion 252 may be inserted into the second frame portion 242. The lower end of the inner wall 212 of the first container 210 may press the second sealing portion 252 toward the frame 240.

Accordingly, it is possible to prevent the liquid stored in the first chamber C1 from leaking into the gap between the inner wall 212 of the first container 210 and the frame 240).

The mount 130 may include a sensor accommodation portion 137. The sensor accommodation portion 137 may provide space that is formed at the lower portion of one side wall of the mount 130. The second sensor 180 may be accommodated in the sensor accommodation portion 137. The lower case 230 may cover the sensor accommodation portion 137. The lower case 230) may surround one side of the sensor accommodation portion 137. The lower case 230 may cover one side of the sensor accommodation portion 137. One side wall of the accommodation portion 231 of the lower case 230 may face the side portion of the sensor accommodation portion 137. The extension portion 232 of the lower case 230 may cover the upper portion of the sensor accommodation portion 137.

A gap through which air flows may be formed between the sensor accommodation portion 137 and the lower case 230. Air may pass through the gap between the sensor accommodation portion 137 and the lower case 230, and may be introduced into the cartridge inlet 224. The second sensor 180 may sense the flow of air into the cartridge inlet 224 through the gap between the sensor accommodation portion 137 and the lower case 230.

Referring to FIGS. 8 and 9, the cartridge 200 may include a stick stopper 217, which protrudes inwards from the circumference of the insertion space 214 at a position adjacent to the opposite end or the lower end of the insertion space 214. The stick stopper 217 may protrude in the radially inward direction. The stick stopper 217 may be formed on the outer wall 211 and/or the inner wall 212 of the first container 210.

The stick stopper 217 may be provided in a plural number. Three stick stoppers 217 may be provided. A plurality of stick stoppers 217 may be arranged along the circumference of the insertion space 214. The stick stoppers 217 may be arranged in the circumferential direction.

The stick stoppers 217 may be spaced apart from each other. The stick stoppers 217 may be formed in the shape of a rib or a ring that extends in the circumferential direction along the circumference of the insertion space 214. The stick 400 may be seated over the stick stoppers 217. The stick stoppers 217 may have a shape that gradually widens in the upward direction.

Accordingly, when the stick 400 is inserted into the insertion space 214, the end of the stick 400 may be brought into contact with the stick stoppers 217, with the result that the stick 400 may be prevented from moving to the second chamber C2 beyond the insertion space 214.

In addition, it is possible to minimize a reduction in the amount of air flowing from the second chamber C2 to the insertion space 214.

In addition, the stick stoppers 217 may not impede the aerosol generated in the second chamber C2 from extracting a certain component from the medium in the stick 400.

Referring to FIGS. 10 and 11, the pivot shaft or the shaft 311 of the cover 310 may be disposed above the insertion space 214. The pivot shaft or the shaft 311 of the cover 310 may be disposed between the insertion space 214 and the insertion hole 304. The cover 310 may be pivoted toward the inside of the insertion space 214 to open the insertion space 214 and/or the insertion hole 304. The direction in which the cover 310 is pivoted toward the inside of the insertion space 214 may be defined as a first direction.

When the cover 310 is pivoted in the first direction to open the insertion space 214, the cover 310 may be received in the cover recess 215. When the cover 310 opens the insertion space 214, the cover 310 may be received in the cover recess 215, and may overlap the inner wall 212 of the first container 210, which is disposed below the cover recess 215. When the cover 310 opens the insertion space 214, the cover 310 may be disposed parallel to the inner wall 212 of the first container 210, which is located below the cover recess 215.

The first guide 216 may be formed so as to be inclined from the bottom of the cover recess 215 toward the lower side of the insertion space 214. The first guide 216 may be formed so as to be inclined such that the insertion space 214 is gradually narrowed toward the lower side thereof. When the cover 310 opens the insertion space 214, the first guide 216 may be disposed adjacent to one end of the cover 310 at a position below the cover 310. When the cover 310 opens the insertion space 214, the first guide 216 may protrude toward the insertion space 214 further than the end of the cover 310.

The cover 310 may be pivoted toward the outside of the insertion space 214 to close the insertion space 214 and/or the insertion hole 304. The direction in which the cover 310 is pivoted toward the outside of the insertion space 214 may be defined as a second direction. One end of the spring 312 may support the cover 310, and the other end of the spring 312 may support the cap 300. The spring 312 may provide elastic force to the cover 310 in the direction in which the cover 310 closes the insertion space 214. The cover 310 may be pivoted in the second direction by the spring 312.

The second guide 306 may be formed so as to be inclined such that the inner space is gradually narrowed toward the lower side thereof. The second guide 306 may be disposed adjacent to the pivoting radius of the cover 310. The second guide 306 may be disposed outside the pivoting radius of the cover 310. The second guide 306 may extend so as to be inclined along the pivoting radius of the cover 310.

One end of the second guide 306 may be adjacent to the insertion hole 304. The end of the second guide 306 may be disposed outside the insertion hole 304. The end of the second guide 306 may be disposed below the insertion hole wall 305. The insertion hole wall 305 may protrude further inwards than the end of the second guide 306. When the cover 310 is pivoted in the second direction to close the insertion space 214, the cover 310 may be brought into contact with the insertion hole wall 305, and thus movement thereof may be restricted.

The other end of the second guide 306 may be adjacent to the insertion space 214. The other end of the second guide 306 may be adjacent to the outer wall 211 of the first container 210, which forms the circumference of the insertion space 214. The other end of the second guide 306 may be disposed above the outer wall 211 of the first container 210, which defines the insertion space 214. The second guide 306 may have a shape that extends so as to be inclined from one end thereof to the other end thereof.

Referring to FIGS. 12 to 15, the stick 400 may push the cover 310 in the inward direction of the insertion space 214 or in the first direction. When the stick 400 pushes the cover 310 and is inserted into the insertion space 214, the cover 310 may open the insertion space 214 and/or the insertion hole 304.

Referring to FIGS. 13 and 14, when the end of the stick 400 passes through the insertion hole 304, the end of the stick 400 may be brought into contact with the insertion hole wall 305. When the end of the stick 400 is brought into contact with the insertion hole wall 305, the insertion hole wall 305 may guide the stick 400 to the correct position in the insertion hole 304. After passing through the insertion hole 304, the end of the stick 400 may push the cover 310 so that the cover 310 is pivoted in the first direction.

Referring to FIGS. 14 and 15, when the stick 400 completely passes through the insertion hole 304, the cover 310 may be received in the cover recess 215. The cover 310 may overlap the inner wall 212 of the first container 210, thereby forming one side wall of the insertion space 214 together with the inner wall 212 of the first container 210.

Referring to FIGS. 21 and 22, the stick 400 may slide along the surface of the cover 310, and may be inserted into the insertion space 214. The second guide 306 may be disposed at a position opposite the pivot shaft of the cover 310 with respect to the insertion hole 304. The second guide 306 may be disposed at a position opposite the cover recess 215. When the stick 400 is inserted into the insertion space 214, the end of the stick 400 may be brought into contact with the second guide 306. When the end of the stick 400 is brought into contact with the second guide 306, the second guide 306 may guide the stick 400 to the correct position in the insertion space 214.

The first guide 216 may be disposed at a position opposite the second guide 306. The first guide 216 may be disposed below the second guide 216. The first guide 216 may be disposed below the cover recess 215. The first guide 216 may be disposed below the cover 310. The first guide 216 may extend in the circumferential direction along the inner wall 212 of the first container 210. When the stick 400 is inserted into the insertion space 214, the end of the stick 400 may be brought into contact with the first guide 216. After being guided to the correct position by contact with the second guide 306, the end of the stick 400 may be brought into contact with the first guide 216. When the end of the stick 400 is brought into contact with the first guide 216, the first guide 216 may guide the stick 400 to the correct position in the insertion space 214.

The end of the stick 400 inserted into the insertion space 214 may be brought into contact with the stick stopper 217. The stick stopper 217, with which the end of the stick 400 comes into contact, may prevent the stick 400 from moving to a region below the insertion space 214 or to the second chamber C2.

Accordingly, when the user pushes the cover 310 using the stick 400, the stick 400 may be guided to the correct position so as to smoothly pass through the insertion hole 304 and to push the cover 310.

In addition, when the stick 400 pushes the cover 310 and thus the cover 310 is disposed in the insertion space 214, the cover 310 is received in the cover recess 215, so the stick 400 may be brought into close contact with the wall defining the insertion space 214.

In addition, since the stick 400 is in close contact with the wall defining the insertion space 214, when the user inhales air through the stick 400, it is possible to prevent unnecessary flow of air between the insertion space 214 and the stick 400 and to reduce waste of inhalation force, thereby preventing deterioration in air flow efficiency.

In addition, even though the cover 310 applies external force to the end of the stick 400 in the second direction when the user pushes the cover 310 using the stick 400, the stick 400 may be guided so as to be correctly inserted into the insertion space 214.

In addition, it is possible to prevent the stick 400 from moving to the inside of the second chamber C2.

Referring to FIG. 16, the upper body 120 may be coupled to the upper portion of the lower body 110. The mount 130 may cover the upper portion of the lower body 110. The lower portion of the mount 130 may be surrounded by the upper portion of the side wall 111 of the lower body 110. The mount 130 may be coupled to the upper portion of the lower body 110. The mount 130 may be coupled to the lower body 110 in a snap-fit manner. The mount 130 may be engaged with the lower body 110 so as not to be separated therefrom.

The third sensor 180 may be disposed on one side of the upper portion of the lower body 110. A sensor support portion 185 may have a shape that extends upwards from the upper portion of the lower body 110. The sensor support portion 185 may support the third sensor 180. The third sensor 180 may be coupled to the sensor support portion 185. The third sensor 180 may be coupled to the sensor support portion 185 so as to be oriented in the lateral direction. The sensor accommodation portion 137 of the mount 130 may accommodate and cover the third sensor 180 and the sensor support portion 185.

Referring to FIGS. 17 to 19, a fastening hole 135 may be formed in the lower portion of the mount 130. The fastening hole 135 may be formed at a side part of the lower portion of the mount 130. The fastening hole 135 may be formed in a plural number, and the plurality of fastening holes 135 may be arranged along the circumference of the lower portion of the mount 130. A body latch 115 provided at the upper portion of the lower body 110 may be inserted into the fastening hole 135, whereby the mount 130 and the lower body 110 may be engaged with each other (refer to FIGS. 21 and 22).

A rib groove 136 may be formed in the outer side surface 132 of the mount 130. The rib groove 136 may have a shape that is recessed inwards from the outer side surface 132 of the mount 130. The rib groove 136 may have a shape that extends along the circumference of the outer side surface 132 of the mount 130. A body rib 116, which extends along the inner circumference of the upper portion of the lower body 110, may be inserted into the rib groove 136, whereby the mount 130 and the lower body 110 may be engaged with each other. The body rib 116 may be made of an elastic material. For example, the body rib 116 may be made of a material such as rubber or silicon. The body rib 116 may be in close contact with the rib groove 136. Accordingly, the position of the mount 130 may be reliably fixed to the lower body 110, and the upper body 120 may be prevented from shaking relative to the lower body 110 (refer to FIGS. 21 and 22).

A first fixing portion 138 may be formed at the lower portion of the mount 130. The first fixing portion 138 may be formed so as to be recessed upwards or to protrude downwards from the lower portion of the mount 130. The first fixing portion 138 may be formed at the circumference of the lower portion of the mount 130. The first fixing portion 138 may be formed in a plural number, and the plurality of first fixing portions 138 may be arranged along the circumference of the lower portion of the mount 130. A second fixing portion 118, which is provided at the upper portion of the lower body 110, may be coupled to the first fixing portion 138. Accordingly, the position of the mount 130 may be reliably fixed to the lower body 110, and the upper body 120 may be prevented from shaking relative to the lower body 110 (refer to FIGS. 21 and 22).

The upper body 120 may include the column 140, which extends upwards. The column 140 may extend upwards from one side of the mount 130. The side walls 141 and 142 of the column 140 may be connected to the side walls 131 and 132 of the mount 130. The column 140 may cover a portion of the space 134 provided by the mount 130. The inner wall 141 of the column 140 may have a shape that is concavely recessed outwards. The column 140 may face the side portion of the cartridge 200 (refer to FIG. 6). The column 140 may cover one side portion of the cartridge 200. The column 140 may be open toward one side portion of the cartridge 200.

The column 140 may accommodate the PCB assembly 150. The PCB assembly 150 may provide light to the cartridge 200, or may sense information about the cartridge 200. For example, the information about the cartridge 200 may include at least one of information about a change in the remaining amount of liquid stored in the first chamber C1 in the cartridge 200, information about the type of liquid stored in the first chamber C1 in the cartridge 200, information about whether the stick 400 is inserted into the insertion space 214 in the cartridge 200, information about the type of stick 400 inserted into the insertion space 214 in the cartridge 200, information about the extent of use or the availability of the stick 400 inserted into the insertion space 214 in the cartridge 200, information about whether the cartridge 200 having the stick 400 inserted into the insertion space 214 is coupled to the body 100, or information about the type of cartridge 200 coupled thereto. The information about the cartridge 200 is not limited to the aforementioned information. The column 140 may accommodate a light source 153 configured to emit light. The column 140 may accommodate a first sensor 154 and a second sensor 155 configured to sense information about the cartridge 200.

The column 140 may provide a mounting space 144 therein. The mounting space 144 may have a shape that extends vertically along the column 140. The inner side wall 141 of the column 140 may surround the mounting space 144. The mounting space 144 may be open toward the space 134 in the mount 130. The mounting space 144 may be open toward one side portion of the cartridge 200.

The PCB assembly 150 may be mounted in the mounting space 144. A plate 160 may cover the PCB assembly 150, and may be disposed in the mounting space 144. The window 170 may cover the PCB assembly 150 and the mounting space 144. The PCB assembly 150, the plate 160, and the window 170 may be sequentially stacked. The mounting space 144 may be referred to as an assembly accommodation space 144.

The PCB assembly 150 may include at least one of a printed circuit board (PCB) 151, a light source 153, a first sensor 154, or a second sensor 155. The light source 153 may be mounted on the PCB 151. At least one light source 153 may be provided. The first sensor 154 and the second sensor 155 may be mounted on the PCB. The light source 153, the first sensor 154 and the second sensor 155 may be mounted at different positions on a single PCB. The first sensor 154 and the second sensor 155 may be mounted in a region avoiding the at least one light source 153.

The PCB assembly 150 may be disposed inside the column 140 so as to face the cartridge 200. The PCB assembly 150 may face the first container 210, which is provided with the first chamber C1 and the insertion space 214. The PCB assembly 150 may be elongated vertically along the column 140. A connector 152 for electrical connection may be formed at one end of the PCB assembly 150.

The PCB 151 may be elongated vertically along the column 140. The PCB 151 may be a flexible printed circuit board (FPCB). The connector 152 may be formed at one end of the PCB 151. A plurality of light sources 153 may be arranged on the PCB 151. The first sensor 154 may be located at the center of the PCB 151. The first sensor 154 may be located between the light sources 153, and at least one light source 153 may be disposed on each side of the first sensor 154. The plurality of light sources 153 may be arranged vertically along the PCB 151. The plurality of light sources 153 may be arranged in the longitudinal direction of the column 140. The first sensor 154 and the second sensor 155 may be disposed so as to face the insertion space 214. The light sources 153 may be disposed so as to face the outside of the insertion space 214. The light sources 153 may emit light toward the outside of the insertion space 214 so that the light is provided to the first chamber C1. The light sources 153 may be Light Emitting Diodes.

Accordingly, the light sources 153 may provide uniform light to the first chamber C1.

In addition, it is possible to prevent the paths of light provided by the light sources 153 from being blocked by the stick 400 inserted into the insertion space 214.

The first sensor 154 may be elongated in the vertical direction along the PCB 151. The first sensor 154 may be elongated along the first container 210 or the insertion space 214. The second sensor 155 may be disposed adjacent to the center of the upper end of the PCB 151. When the second sensor 155 is provided in a plural number, the plurality of second sensors 155 may be disposed adjacent to the center of the upper end and the center of the lower end of the PCB 151.

The first sensor 154 and the second sensor 155 may face the insertion space 214. The first sensor 154 may sense information about the cartridge 200. For example, the first sensor 154 and the second sensor 155 may sense at least one of information about a change in the remaining amount of liquid stored in the first chamber C1 in the cartridge 200, information about the type of liquid stored in the first chamber C1 in the cartridge 200, information about whether the stick 400 is inserted into the insertion space 214 in the cartridge 200, information about the type of stick 400 inserted into the insertion space 214 in the cartridge 200, information about the extent of use or the availability of the stick 400 inserted into the insertion space 214 in the cartridge 200, information about whether the cartridge 200 having the stick 400 inserted into the insertion space 214 is coupled to the body 100, or information about the type of cartridge 200 coupled thereto. The information about the cartridge 200 is not limited to the aforementioned information.

The first sensor 154 may sense a change in the electromagnetic characteristics of the cartridge 200 to sense information about the cartridge 200. The first sensor 154 may sense a change in electromagnetic characteristics caused by a neighboring object. For example, the first sensor 154 may be a capacitance sensor. For example, the first sensor 154 may be a magnetic proximity sensor. The type of first sensor 154 is not limited thereto. For example, when the stick 400 is inserted into the insertion space 214 in the cartridge 200 or when there is a change in the volume of the liquid stored in the first chamber C1, the electromagnetic characteristics sensed by the first sensor 154 may change, and the first sensor 154 may measure the change to sense information about the cartridge 200.

The first sensor 154 may include a conductor. The conductor may be formed to have a length corresponding to the insertion space 214 in the direction in which the insertion space 214 of the cartridge 200 extends. For example, the conductor may be formed to have a maximum length adjacent to the upper and lower sides of the PCB 151 in the longitudinal direction of the column 140, respectively.

The first sensor 154 may generate and output a signal. The first sensor 154 may generate a signal while current flows through the conductor. The first sensor 154 may generate a signal corresponding to an electromagnetic characteristic of the surroundings, for example, a capacitance around the conductor.

The second sensor 155 may sense a change in characteristics caused by the cartridge 200, thereby sensing information about the cartridge 200. The second sensor 155 may sense a change in characteristics caused by a neighboring object. For example, the second sensor 155 may be a proximity sensor. However, the type of second sensor 155 is not limited thereto. For example, when the stick 400 is inserted into the insertion space 214 in the cartridge 200, or when the liquid stored in the first chamber C1 changes in volume, there occurs a change in the characteristics that are sensed by the second sensor 155, and the second sensor 155 measures the change, thereby sensing information about the cartridge 200.

The second sensor 155 may include a light-emitting element and a light-receiving element. The light-emitting element may be referred to as a sensor light source.

The sensor light source may generate and radiate light. For example, the sensor light source may radiate infrared radiation having a wavelength of 780 nm to 1 mm. The sensor light source may be implemented as a light-emitting diode (LED), an organic light-emitting diode (OLED), a laser diode (LD), or the like. In the case in which the second sensor 155 includes a plurality of sensor light sources, the plurality of sensor light sources may be arranged in a regular pattern.

The second sensor 155 may radiate the light generated by the sensor light source in a predetermined direction. For example, the second sensor 155 may include a first light condenser for condensing the light generated by the sensor light source toward the insertion space 214. Here, the first light condenser may be implemented as an imaging lens, a diffractive optical element (DOE), or the like.

The light-receiving element may be implemented as a photodiode, which responds to light. The photodiode may output an electrical signal corresponding to the light incident thereon. The second sensor 155 may include a second light condenser for condensing light radiated from the sensor light source and reflected from an object (hereinafter referred to as "reflected light"). For example, the reflected light condensed by the second light condenser may be transmitted to the photodiode. In this case, the second light condenser may include a lens for receiving the reflected light incident thereon from a predetermined direction.

The second sensor 155 may further include an optical filter configured to restrictively transmit light in a specific wavelength range. For example, in the case in which the sensor light source radiates infrared radiation having a wavelength of 780 nm to 1 mm, the optical filter may be implemented as an infrared band pass filter, which restrictively transmits infrared radiation.

The window 170 may be coupled to the column 140. The window 170 may be formed of a transparent material. The window 170 may allow light to pass therethrough. The window 170 may be coupled to the column 140 to cover the PCB assembly 150 (refer to FIG. 26). The window 170 may have a shape that extends vertically along the column 140. The window 170 may be disposed between the column 140 and the cartridge 200. The window 170 may be disposed adjacent to the inner side wall 141 of the column 140. The window 170 may cover one side portion of the cartridge 200. The window 170 may face the side portion of the cartridge 200. The window 170 may be formed to be thin so that the PCB assembly 150 is adjacent to the cartridge 200.

One surface 171a of the window 170 may be in contact with the side portion of the cartridge 200 to support the cartridge 200 (refer to FIGS. 4 to 6). The opposite surface 171b of the window 170 may be in close contact with the PCB assembly 150 (refer to FIG. 20). The surface 171a of the window 170 may be referred to as the front surface of the window 170. The opposite surface 171b of the window 170 may be referred to as the rear surface of the window 170.

The surface 171a of the window 170 may have a shape corresponding to that of the outer wall 211 of the first container 210, which forms the circumference of the insertion space 214. The insertion space 214 may be adjacent to the column 140 and the PCB assembly 150 (refer to FIG. 10). The insertion space 214 may be located between the first chamber C1 and the column 140. The outer wall 211 of the first container 210, which surrounds the circumference of the insertion space 214, may have a round shape that extends along the circumference of the insertion space 214. The surface 171a of the window 170 may have a round shape that surrounds the outer side of the insertion space 214. The surface 171a of the window 170 may have a round shape that surrounds the outer wall 211 of the first container 210, which forms the circumference of the insertion space 214. The surface 171a of the window 170 may have a shape that is concave in the direction opposite the cartridge 200. The surface 171a of the window 170 may support one side wall of the cartridge 200.

At least one recess 174, in which the light source 153 is accommodated, may be formed in the opposite surface 171b of the window 170. The recess 174 may be referred to as a light source recess 174 or a window recess 174. The light source recess 174 may be recessed toward the surface 171a from the opposite surface 171b of the window 170. Each of the plurality of light source recesses 174 may accommodate and cover a respective one of the plurality of light sources 153. Each of the plurality of light source recesses 174 may be formed at a position corresponding to the position of a respective one of the plurality of light sources 153. The plurality of light source recesses 174 may be arranged vertically. The first sensor 154 may be located between the plurality of light source recesses 174, and at least one light source recess 174 may be disposed on each side of the first sensor 154.

The opposite surface 171b of the window 170 may have at least one recess 175 formed therein to receive the second sensor 155 therein. The recess 175 may be referred to as a sensor recess 175. The sensor recess 175 may be formed so as to be recessed from the opposite surface 171b of the window 170 toward the one surface of the window 170. In the case in which a plurality of second sensors 155 is mounted, each of the plurality of sensor recesses 175 may receive and cover a respective one of the plurality of second sensors 155. Each of the plurality of sensor recesses 175 may be formed at a position corresponding to a respective one of the plurality of second sensors 155. The plurality of sensor recesses 175 may be arranged vertically.

The opposite surface 171b of the window 170 may include a planar portion 172, which is formed to be flat. The planar portion 172 may be in close contact with the PCB assembly 150. The planar portion 172 may be inserted into the mounting space 144 in the column 140 (refer to FIG. 17). The light source recess 174 and the sensor recess 175 may be formed by depressing the planar portion 172.

The PCB assembly 150 may have a plurality of through-holes 151a formed therein. The through-holes 151a may be formed in a manner such that one side of the PCB 151 is open. The through-holes 151a may be formed in the upper portion of the PCB 151. The through-holes 151a may be located above the light source 153 and/or the second sensor 155. The through-holes 151a may be located on both sides of the PCB 151.

The window 170 may include a plurality of penetrating protrusions 172a. The penetrating protrusions 172a may protrude from the opposite surface 171b of the window 170. The penetrating protrusions 172a may be formed at positions corresponding to the through-holes 151a. The penetrating protrusions 172a may protrude toward the through-holes 151a. The penetrating protrusions 172a may pass through the through-holes 151a. A plurality of penetrating protrusions 172a may be provided. Each of the plurality of penetrating protrusions 172a may pass through a respective one of the plurality of through-holes 151a. The penetrating protrusions 172a may pass through the through-holes 151a, so the PCB assembly 150 and the window 170 may be disposed at the correct positions.

The window 170 may include a latching protrusion 173. The latching protrusion 173 may be formed on the opposite surface 171b of the window 170. The latching protrusion 173 may protrude from each side of the planar portion 172. The latching protrusion 173 may be provided in a plural number, and the plurality of latching protrusions 173 may be arranged in the vertical direction. Each of the plurality of latching protrusions 173 may have a shape that is elongated vertically so as to correspond to a side flange portion 1451.

The column 140 may include a flange 145. The flange 145 may be disposed inside the inner side wall 141 of the column 140. The flange 145 may protrude inwards from the inner side wall 141 of the column 140. The flange 145 may be integrally formed with the column 140. The flange 145 may protrude toward the inside of the column 140 to form an edge. The flange 145 may extend along the circumference of the assembly accommodation space 144. The flange 145 may have an open center, through which the assembly accommodation space 144 and the cartridge accommodation space 134 may be connected to each other.

The flange 145 may include at least one of a side flange portion 1451, a lower flange portion 1452, or an upper flange portion 1453. The flange 145 may be formed in a manner such that the side flange portion 1451, the lower flange portion 1452, and the upper flange portion 1453 are connected to each other. The side flange portion 1451 may have a shape that is elongated in the longitudinal direction of the column 140. The side flange portion 1451 may be provided in a pair, and the pair of side flange portions 1451 may be spaced apart from each other and may be formed on both sides of the column 140. The lower flange portion 1452 and the upper flange portion 1453 may be disposed between the pair of side flange portions 1451, and may be connected thereto. The side flange portions 1451, the lower flange portion 1452, and the upper flange portion 1453 may be connected to each other to form the periphery of the flange 145. The region surrounded by the side flange portions 1451, the lower flange portion 1452, and the upper flange portion 1453 may be open, so the assembly accommodation space 144 and the cartridge accommodation space 134 may communicate with each other.

The opposite surface 171b of the window 170 may be attached to the flange 145. The edge of the opposite surface of the window 170 may be attached to the flange 145. The opposite surface 171b of the window 170 may be attached to the flange 145 using an adhesive member. The adhesive member may be, for example, a sheet of tape or glue. The adhesive member is not limited thereto. The latching protrusions 173 may be engaged with the flange 145, so the window 170 may be coupled to the flange 145. The latching protrusions 173 may be engaged with the side flange portions 1451. The flange 145 may have a shape corresponding to the shape of the opposite surface 171*b* of the window 170, which is adjacent to the edge of the window 170. The lower flange portion 1452 and the upper flange portion 1453 may have a concave shape.

Accordingly, the PCB assembly 150 may be protected from the outside, and may be prevented from becoming separated.

In addition, light emitted from the PCB assembly 150 may be provided to the cartridge 200.

In addition, the window 170, the cartridge 200, and the PCB assembly 150 may be reliably coupled or fixed to each other.

The plate 160 may cover the region in the PCB assembly 150 that avoids the at least one light source 153. The plate 160 may be attached to the PCB assembly 150, and may cover the first sensor 154. The plate 160 may cover the region in the PCB assembly 150 that avoids the at least one second sensor 155. The plate 160 may allow an electromagnetic wave to pass therethrough. However, the plate 160 may not allow visible light to pass therethrough, or may be translucent.

Printed circuits, which are connected to the light sources 153, may be printed on the region in the PCB 151 that is adjacent to the light sources 153. The plate 160 may cover the printed circuits printed on the PCB 151 in the vicinity of the light sources 153. A printed circuit, which is connected to the second sensor 155, may be printed on the region in the PCB 151 that is adjacent to the second sensor 155. The plate 160 may cover the printed circuit printed on the PCB 151 in the vicinity of the second sensor 155. The plate 160 may have a shape that extends vertically along the first sensor 154 and extends further from the vertically extending portion thereof toward the printed circuits.

The plate 160 may expose the light sources 153, rather than covering the same. The light sources 153 may be disposed on two opposite sides, with the first sensor 154 interposed therebetween, and may be arranged in the vertical direction. The plate 160 may expose the second sensor 155, rather than covering the same. Portions of the plate 160 that correspond to the positions of the light sources 153 and the second sensor 155 may be open. When the plate 160 is attached to the PCB assembly 150, the light sources 153 and the second sensor 155 may be exposed through the open portions of the plate 160.

Accordingly, the plate 160 may not block the light emitted from the light sources 153 and/or the second sensor 155, and the first sensor 154, the second sensor 155, and/or the printed circuits printed on the PCB 151 may not be exposed to the outside, and may be protected from the outside.

In addition, the first sensor 154 may sense a change in the electromagnetic characteristics of the surroundings in the state of being covered by the plate 160.

Referring to FIG. 20, the PCB assembly 150 may be disposed inside the column 140, and may be elongated along the column 140. The PCB 151 may be elongated along the column 140. The connector 152, which is formed at one end of the PCB assembly 150, may be exposed downwards from the upper body 120. The connector 152 may be exposed downwards from the column 140. The connector 152 may be exposed downwards from the mount 130. The lower end of the column 140 may be open to form a gap 146. The connector 152 may be exposed downwards through the gap 146. The gap 146 may communicate with the mounting space 144 (FIG. 17).

The mount 130 may include the sensor accommodation portion 137. The sensor accommodation portion 137 may be formed in one side wall of the mount 130. The sensor accommodation portion 137 may provide a space 137*b* formed in the side wall of the mount 130 so as to be open downwards to accommodate the third sensor 180 inserted thereinto. The space 137*b* provided by the sensor accommodation portion 137 may be referred to as a sensor accommodation space 137*b*. The inner side surface of the sensor accommodation portion 137 may form a portion of the inner side surface 131 of the mount 130. The outer side surface of the sensor accommodation portion 137 may form a portion of the outer side surface 132 of the mount 130. The sensor accommodation portion 137 may be formed at a position opposite the column 140 with respect to the cartridge accommodation space 134. The column 140 may extend upwards from one side of the mount 130, and the sensor accommodation portion 137 may be formed at the opposite side of the mount 130.

The inner side surface 131 of the sensor accommodation portion 137 may be open to form a sensing hole 137*a*. The sensing hole 137*a* may be formed between the sensor accommodation space 137*b* and the cartridge accommodation space 134 to interconnect the sensor accommodation space 137*b* and the cartridge accommodation space 134. The sensing hole 137*a* may be adjacent to the cartridge inlet 224 (refer to FIG. 8). The sensing hole 137*a* may face the cartridge inlet 224.

The sensing hole 137*a* may be open in the lateral direction. The side portion of the second container 220) may be open to form the cartridge inlet 224, and the sensing hole 137*a*, which is open in the lateral direction, may face the cartridge inlet 224 (refer to FIG. 8).

Referring to FIGS. 21 and 22, the partition wall 112 of the lower body 110 may cover the upper side of the battery 190. The partition wall 112 may be disposed in the upper portion of the lower body 110 in a direction intersecting the side wall 111 of the lower body 110. The partition wall 112 may cover the upper sides of internal components of the lower body 110. The partition wall 112 may separate the space in which internal components of the lower body 110 are mounted from the space in which the upper body 120 is coupled. The partition wall 112 may be disposed below the upper body 120. The side wall 111 of the lower body 110 may extend upwards beyond the partition wall 112, and may surround the circumference of the partition wall 112. The inner circumferential surface of the side wall 111 of the lower body 110, which extends above the partition wall 112, may surround the circumference of the lower portion of the mount 130.

The third sensor 180 may be mounted on one side of the upper portion of the lower body 110. The third sensor 180 may be disposed on the partition wall 112. The third sensor 180 may be disposed at a position corresponding to the sensor accommodation portion 137 of the mount 130. The sensor support portion 185 may extend upwards from one side of the partition wall 112 to support the third sensor 180. The third sensor 180 may be disposed so as to face the lateral direction.

The upper body 120 may be coupled to the upper side of the lower body 110. The body latch 115 may be formed at the upper portion of the lower body 110. The body latch 115 may be formed at one end of the partition wall 112. The body latch 115 may have a protruding shape. The body latch 115 may be inserted into the fastening hole 135 in the mount 130, so the mount 130 and the lower body 110 may be coupled to each other.

The body rib 116 may have a shape that protrudes from the inner circumferential surface of the side wall 111 of the lower body 110. The body rib 116 may have a shape that extends along the inner circumferential surface of the side wall 111 of the lower body 110. The body rib 116 may be made of an elastic material. For example, the body rib 116 may be made of a material such as rubber or silicon. The body rib 116 may be disposed above the partition wall 112. The body rib 116 may be inserted into and be in close contact with the rib groove 136 in the mount 130.

The second fixing portion 118 may be disposed in the upper portion of the lower body 110. The second fixing portion 118 may be formed at a position corresponding to the first fixing portion 138. The second fixing portion 118 may be formed near the partition wall 112. The second fixing portion 118 may have a shape that protrudes upwards or is recessed downwards. The second fixing portion 118 may be provided in a plural number. The second fixing portion 118 may be coupled to the first fixing portion 138 of the mount 130.

Accordingly, the upper body 120 may be coupled to the lower body 110.

In addition, the position of the mount 130 may be reliably fixed to the lower body 110, and the upper body 120 may be prevented from shaking relative to the lower body 110.

The bottom 133 of the mount 130 may be open to form a connection terminal hole 133a. The connection terminal hole 133a may have a slit shape. The connection terminal hole 133a may be formed in a pair (refer to FIG. 20). A first connection terminal 191 may be formed so as to protrude upwards from the partition wall 112. The first connection terminal 191 may be provided in a pair. The first connection terminal 191 and the connection terminal hole 133a may be formed at positions corresponding to each other. When the upper body 120 is coupled to the lower body 110, the first connection terminal 191 may pass through the connection terminal hole 133a, and may be exposed to the cartridge accommodation space 134. When the second cartridge 200 is coupled to the upper body 120, the heater 262 (refer to FIG. 8) may come into contact with the first connection terminal 191, and may be electrically connected to at least one of devices such as the battery 190 and the control device 193. The devices that are electrically connected to the heater are not limited thereto.

The PCB assembly 150 may be electrically connected to a device provided in the lower body 110 via the connector 152, which is exposed downwards from the upper body 120. One side of the partition wall 112 may be open to form a connector insertion hole 117. The connector insertion hole 117 may be formed at a position corresponding to the column 140. The connector insertion hole 117 may be open upwards. A connection terminal 192 may be located below the connector insertion hole 117 inside the lower body 110. When the upper body 120 is coupled to the lower body 110, the connector 152 may be inserted into the connector insertion hole 117, and may come into contact with the second connection terminal 192. When the connector 152 comes into contact with the second connection terminal 192, the PCB assembly 150 may be electrically connected to at least one of devices such as the battery 190 and the control device 193 via the connector 152. The devices that are electrically connected to the PCB assembly are not limited thereto.

When the upper body 120 is coupled to the lower body 110, the third sensor 180 may be inserted into the space 137b provided by the sensor accommodation portion 137. The sensor accommodation portion 137 may surround the third sensor 180. The sensor accommodation portion 137 may surround the third sensor 180. When the mount 130 is coupled to the lower body 110, the third sensor 180 may be inserted upwards from the lower side of the sensor accommodation space 137b. The sensing hole 137a formed by opening the sensor accommodation portion 137 may be opened toward the cartridge 200. The sensing hole 137a, which is formed at the sensor accommodation portion 137, may be open toward the cartridge 200. The third sensor 180 may face the sensing hole 137a inside the sensor accommodation portion 137. The third sensor 180 may be disposed so as to face the cartridge inlet 224 (refer to FIG. 8) inside the sensor accommodation portion 137. The third sensor 180 may sense the flow of air around the sensing hole 137a.

Referring to FIGS. 23 to 25, the cartridge 200 may include at least one of the first container 210, the second container 220, the wick 261, or the heater 262. The cartridge 200 may include the sealing member 250.

The first container 210 may be formed to have a hollow shape. The outer wall 211 of the first container 210 may surround the inner space. The first container 210 may provide the first chamber C1 storing liquid therein. One side or the lower side of the first chamber C1 may be open. The first container 210 may include an insertion space 214 into which the stick 400 is capable of being inserted. The first chamber C1 and the stick 400 may be provided separately from each other inside the first container 210. The insertion space 214 may have two open opposite ends, and may be elongated. The insertion space 214 may be elongated vertically, and the upper and lower ends thereof may be open. The circumference of the insertion space 214 may extend in the circumferential direction. The insertion space 214 may have a cylindrical shape.

The inner wall 212 of the first container 210 may be located inside the first container 210, and may partition the inner space in the first container 210. The inner wall 212 of the first container 210 may partition the space surrounded by the outer wall 211 of the first container 210 into the first chamber C1 on one side and the insertion space 214 on the other side. The inner wall 212 of the first container 210 may extend in the circumferential direction to surround at least a portion of the circumference of the insertion space 214.

Accordingly, the efficiency of use of a liquid storage space may be improved, and the user may be provided with improved convenience during an inhalation operation.

The second container 220 may be coupled to the first container 210. The second container 220 may be coupled to one side or the lower side of the first container 210. The second container 220 may block the open side of the first chamber C1. The second container 220 may provide therein the second chamber C2 communicating with the insertion space 214. The wick 261 may be disposed in the second container 220.

The cartridge inlet 224 may communicate with the second chamber C2 and the outside of the cartridge 200. The cartridge inlet 224 may allow the second chamber C2 to communicate with the outside of the cartridge 200. The cartridge inlet 224 may be formed at the outer wall of the second container 220. The cartridge inlet 224 may be formed in the side wall 221 of the second container 220. The cartridge inlet 224 may be open in the lateral direction. The cartridge inlet 224 may be formed at a position higher than the bottom 222 of the second container 220.

Accordingly, it is possible to prevent droplets in a connection passage 2314 from leaking out of the cartridge 200 through the cartridge inlet 224.

The second container 220 may include at least one of the lower case 230 or the frame 240. The lower case 230 may form the external appearance of the second container 220. The lower case 230 may be disposed below the first container 210. The lower case 230 may be coupled to the first container 210. The lower case 230 may be coupled to the outer wall 211 of the first container 210. The circumference of the lower case 230 may be coupled to the circumference of the first container 210. The cartridge inlet 224 may be formed at the outer wall of the lower case 230. The cartridge inlet 224 may be formed in the side wall 2311 of the lower case 230. The cartridge inlet 224 may be formed at a position higher than the bottom 2312 of the lower case 230. The lower case 230 may provide therein an accommodation space 2310. The lower case 230 may accommodate at least a portion of the frame 240 in the accommodation space 2310. The lower case 230 may support the frame 240.

The lower case 230 may include the accommodation portion 231. The accommodation portion 231 may provide therein an accommodation space 2310. The accommodation space 2310 may be formed at the accommodation portion 231 upwards. The accommodation portion 231 may surround the side portion and the lower portion of the accommodation space 2310. The side wall 2311 of the accommodation portion 231 may surround the side portion of the accommodation space 2310. The bottom 2312 of the accommodation portion 231 may cover the lower portion of the accommodation space 2310. The second chamber C2 may be formed at a position at which the accommodation space 2310 is formed. The accommodation portion 231 may surround a portion of the second chamber C2.

The cartridge inlet 224 may be formed at one side of the accommodation portion 231. The cartridge inlet 224 may be formed at the outer wall of the accommodation portion 231. The cartridge inlet 224 may be formed in one side wall 2311 of the accommodation portion 231. The cartridge inlet 224 may be adjacent to the lower side of the extension portion 232. The cartridge inlet 224 may be formed at a position higher than the bottom 2312 of the accommodation portion 231.

The accommodation portion 231 may provide therein a connection passage 2314. The connection passage 2314 may communicate with the cartridge inlet 224. The connection passage 2314 may be formed between the accommodation portion 231 and the frame 240. The connection passage 2314 may be surrounded by the accommodation portion 231 and the frame 240). The connection passage 2314 may be located between the cartridge inlet 224 and the chamber inlet 2424. The connection passage 2314 may interconnect the cartridge inlet 224 and the chamber inlet 2424.

The blocking wall 2317 may be formed in the connection passage 2314. The blocking wall 2317 may be formed so as to protrude upwards from the bottom of the connection passage 2314. The blocking wall 2317 may be formed so as to protrude upwards from the bottom 2312 of the accommodation portion 231 or the bottom of the frame 240. The connection passage 2314 may surround the blocking wall 2317. The blocking wall 2317 may be disposed between the cartridge inlet 224 and the chamber inlet 2424. The blocking wall 2317 may be disposed between the side wall 2311 of the accommodation portion 231 and the side wall 2421 of the second frame portion 242. The blocking wall 2317 may be formed parallel to the side wall 2311 of the accommodation portion 231. The blocking wall 2317 may face the side wall

2311 of the accommodation portion 231. The blocking wall 2317 may be formed parallel to the side wall 2421 of the second frame portion 242. The blocking wall 2317 may face the side wall 2421 of the second frame portion 242. The blocking wall 2317 may extend to a position higher than the cartridge inlet 224 and/or the chamber inlet 2424. The blocking wall 2317 may extend to a position lower than the extension portion 232 and/or a bottom portion 2411. The blocking wall 2317 may be elongated in a direction intersecting the direction in which the cartridge inlet 224 and/or the chamber inlet 2424 are open. The cartridge inlet 224 may face the blocking wall 2317. The chamber inlet 2424 may face the blocking wall 2317.

Accordingly, it is possible to prevent droplets generated in the second chamber C2 from leaking out of the cartridge 200 through the cartridge inlet 224.

The lower case 230 may include the extension portion 232 extending outwards from the accommodation portion 231. The extension portion 232 may extend outwards from the upper end of one side of the accommodation portion 231. The extension portion 232 may extend outwards from the side wall 2311 of the accommodation portion 231 in which the cartridge inlet 224 is formed. The extension portion 232 may be located below the first chamber C1. The extension portion 232 may support the first frame portion 241.

The lower case 230 may include a peripheral portion 2322, which is coupled to the circumference of the first container 210. The peripheral portion 2322 may extend from the upper end of the lower case 230 along the circumference of the lower case 230. The peripheral portion 2322 may extend along the circumference of each of the receiving portion 231 and the extension portion 232. The peripheral portion 2322 may have the shape of a continuous band. The peripheral portion 2322 may have a shape that protrudes upwards from the circumference of the lower case 230. The peripheral portion 2322 may be coupled to the lower end of the outer wall 211 of the first container 210. The lower end of the outer wall 211 of the first container 210 may be recessed upwards so that the peripheral portion 2322 is inserted thereinto. The peripheral portion 2322 and the outer wall 211 of the first container 210 may be attached to each other using an adhesive member. The adhesive member may be, for example, a sheet of tape or glue. The adhesive member is not limited thereto.

The frame 240 may be disposed between the lower case 230 and the first container 210. At least a portion of the frame 240 may be accommodated in the accommodation space 2310. The frame 240) may be coupled to the lower case 230 in the accommodation space 2310. The frame 240) may block the open side or the lower side of the first chamber C1. The frame 240 may form the bottom of the first chamber C1. The frame 240 may partition the inside of the lower case 230) to provide the second chamber C2. The frame 240 may surround at least a portion of the second chamber C2. The second chamber C2 may be surrounded by the frame 240) and the outer wall of the accommodation portion 231. The second chamber C2 may be formed below the insertion space 214. The second chamber C2 may communicate with the lower end of the insertion space 214. The chamber inlet 2424 may be formed at one side of the frame 240. The chamber inlet 2424 may communicate with the second chamber C2.

The frame 240 may include the first frame portion 241, which forms the bottom of the first chamber C1. The first frame portion 241 may block the open side of the first chamber C1. The frame 240) may include the second frame portion 242, which partitions the inside of the lower case 230 to provide the second chamber C2. The second frame portion 242 may be accommodated in the lower case 230. The second frame portion 242 may be connected to the first frame portion 241. The second frame portion 242 may surround at least a portion of the second chamber C2.

The second frame portion 242 may be accommodated in the accommodation space 2310. The side wall 2421 of the second frame portion 242 may surround at least a portion of the side portion of the second chamber C2. The bottom 2422 of the second frame portion 242 may form the bottom of the second chamber C2. The accommodation portion 231 may support the second frame portion 242. The bottom 2312 of the accommodation portion 231 may support the bottom 2422 of the second frame portion 242. The chamber inlet 2424 may be formed at the side wall 2421 of the second frame portion 242. The chamber inlet 2424 may be open in the lateral direction. The chamber inlet 2424 may be formed at a position higher than the bottom of the second chamber C2 or the bottom 2422 of the second frame portion 242.

Accordingly, it is possible to prevent droplets generated in the second chamber C2 from leaking out of the second chamber C2 through the chamber inlet 2424.

The first frame portion 241 may have a shape that extends outwards from one side of the second frame portion 242. The first frame portion 241 may extend in the direction in which the extension portion 232 extends from the upper portion of the accommodation space 2310. The first frame portion 241 may cover a portion of the upper side of the lower case 230. The lower case 230) may support a surface of the first frame portion 241.

The bottom portion 2411 of the first frame portion 241 may form the bottom of the first chamber C1. The bottom portion 2411 of the first frame portion 241 may extend outwards from the upper end of the side wall 2421 of the second frame portion 242. The bottom portion 2411 of the first frame portion 241 may extend in the direction in which the extension portion 232 is formed. The bottom portion 2411 of the first frame portion 241 may cover the extension portion 232 and the upper side of the connection passage 2314. The bottom portion 2411 of the first frame portion 241 may be supported by the extension portion 232.

The side wall 2412 of the first frame portion 241 may extend from one side of the circumference of the bottom 2422 of the second frame portion 242 along the circumference of the bottom portion 2411 of the first frame portion 241. The side wall 2412 of the first frame portion 241 may have the shape of a band that extends along the edge of the bottom portion 2411 of the first frame portion 241. The side wall 2412 of the first frame portion 241 may protrude upwards from the edge of the bottom portion 2411. The portion of the side wall 2412 of the first frame portion 241 that is adjacent to the second frame portion 242 may be accommodated in the accommodation space 2310. The side wall 2311 of the accommodation portion 231 may support the portion of the side wall 2412 of the first frame portion 241 that is adjacent to the second frame portion 242.

The side wall 2311 and the bottom 2312 of the accommodation portion 231 may surround one side of the connection passage 2314. The bottom portion 2411 of the first frame portion 241 and the side wall 2421 of the second frame portion 242 may surround the opposite side of the connection passage 2314. A round surface 2418 may extend to form a round shape between the first frame portion 241 and the second frame portion 242. The round surface 2418 may face one side of the connection passage 2314. The round surface 2418 may extend to form a round shape from the first frame portion 241 toward the chamber inlet 2424.

The round surface 2418 may extend to form a round shape from the bottom portion 2411 of the first frame portion 241 toward the side wall 2421 of the second frame portion 242. The round surface 2418 may be located above the connection passage 2314. The round surface 2418 may be spaced upwards apart from the blocking wall 2317. A portion of the connection passage 2314 may be located between the round surface 2418 and the blocking wall 2317.

A hook 2415 may be formed at the first frame portion 241. The hook 2415 may be formed adjacent to the circumference of the first frame portion 241. The hook 2415 may protrude upwards from the bottom portion 2411 of the first frame portion 241, and may be bent outwards. The hook 2415 may be located adjacent to or in contact with the side wall 2412 of the first frame portion 241. The end of the hook 2415 may be bent outwards, and may be disposed above the side wall 2412 of the first frame portion 241. The hook 2415 may be provided in a plural number. The plurality of hooks 2415 may be arranged along the circumference of the first frame portion 241. Three hooks 2415 may be provided. The sealing member 250 may be engaged with the hook 2415.

The wick 261 may be disposed in the second chamber C2. The wick 261 may be connected to the first chamber C1. The wick 261 may receive the liquid stored in the first chamber C1 from the first chamber C1. The heater 262 may be disposed in the second chamber C2. The heater 262 may heat the wick 261. The heater 262 may be wound around the wick 261. The heater 262 may generate an aerosol in the second chamber C2 by heating the wick 261 containing the liquid. The wick 261 may be fixed to the second frame portion 242. A wick insertion recess 2426 may be formed in a manner such that the side wall 2421 of the second frame portion 242 is recessed downwards. A pair of wick insertion recesses 2426 may be formed in two opposite side portions of the side wall. Each of the two ends of the wick 261 may be inserted into and fixed to a respective one of the pair of wick insertion recesses 2426.

Air may be introduced into the cartridge 200 through the cartridge inlet 224. The air introduced through the cartridge inlet 224 may sequentially pass through the connection passage 2314, the chamber inlet 2424, the second chamber C2, and the insertion space 214. The air passing through the connection passage 2314 may flow along the round surface 2418 between the blocking wall 2317 and the round surface 2418, and may flow into the chamber inlet 2424. The air passing through the second chamber C2 may flow together with the aerosol generated in the second chamber C2.

Accordingly, it is possible to reduce air flow loss in the connection passage 2314.

In addition, the aerosol may be provided to the insertion space 214 and/or the stick 400 inserted into the insertion space 214.

The sealing member 250 may be disposed between the first container 210 and the second container 220. The sealing member 250 may be disposed between the first chamber C1, having an open side, and the second container 220, blocking the open side of the first chamber C1. The sealing member 250) may be disposed between or inserted into the gap between the first chamber C1 and the frame 240. The sealing member 250 may surround the lower edge of the first chamber C1. The sealing member 250 may be in close contact with the first container 210 and the frame 240. A portion of the sealing member 250) may be in close contact with the second container 220. The sealing member 250) may have the shape of a continuous band.

Accordingly, it is possible to prevent the liquid stored in the first chamber C1 from leaking into the gap formed in the coupling portion between the members defining the first chamber C1.

The sealing member 250) may include at least one of the first sealing portion 251 or the second sealing portion 252. The first sealing portion 251 may be disposed between or inserted into the gap between the outer wall 211 of the first container 210 and the first frame portion 241. The first sealing portion 251 may extend along the outer wall 211 of the first container 210. The first sealing portion 251 may be in close contact with the outer wall 211 of the first container 210 and the side wall 2411 of the first frame portion 241. The first sealing portion 251 may be engaged with the hooks 2415 formed at the first frame portion 241. The plurality of hooks 2415 may be arranged along the circumference of the first sealing portion 251. At least part of the first sealing portion 251 may be inserted into the gap between and be in close contact with the ends of the hooks 2415 and the side wall 2412 of the first frame portion 241.

The second sealing portion 252 may be connected to the first sealing portion 251. The second sealing portion 252 may be disposed between the inner wall 212 of the first container 210 and the second frame portion 242. The second sealing portion 252 may be disposed between the first chamber C1 and the second chamber C2. The second sealing portion 252 may extend from the first sealing portion 251 along the inner wall 212 of the first container 210. The second sealing portion 252 may be in close contact with the inner wall 212 of the first container 210 and the upper end of the second frame portion 242. The inner wall 212 of the first container 210 may press the upper portion of the second sealing portion 252 toward the second frame portion 242. A part of the second sealing portion 252 may be inserted into the second frame portion 242.

Referring to FIG. 25, the side wall 2421 of the second frame portion 242 may surround the side portion of the second chamber C2. The side wall 2421 of the second frame portion 242 may be adjacent to the lower end of the inner wall 212 of the first container 210).

The lower support surface 2522 and the side support surface 2523 may surround and be in close contact with the lower edge of the inner wall 212 of the first container 210. The lower support surface 2522 may support the lower end surface of the inner wall 212 of the first container 210. The lower support surface 2522 may extend along the circumference of the inner wall 212 of the first container 210.

The side support surface 2523 may extend along the circumference of the inner wall 212 of the first container 210. The side support surface 2523 may support the side surface that is adjacent to the lower end surface of the inner wall 212 of the first container 210.

The support portion 2428 may be disposed below the inner wall 212 of the first container 210. The support portion 2428 may be located along a line extrapolated from the inner wall 212 of the first container 210.

The first container 210 may be coupled to the second container 220. The outer wall 211 of the first container 210 may be coupled to the circumference of the lower case 230. The lower end of the outer wall 211 of the first container 210 may be recessed upwards so that the peripheral portion 2322 is inserted thereinto. The outer wall 211 of the first container 210 may be attached to the peripheral portion 2322.

When the first container 210 is coupled to the lower case 230, the first sealing portion 251 may be in close contact with the first frame portion 241 and the outer wall 211 of the first container 210.

When the first container 210 is coupled to the lower case 230, the inner wall 212 of the first container 210 may press the second sealing portion 252 toward the second frame portion 242. When the inner wall 212 of the first container 210 presses the second sealing portion 252, the second sealing portion 252 may come into close contact with the inner wall 212 of the first container 210 and the second frame portion 242. The second sealing portion 252 may transmit the force received from the inner wall 212 of the first container 210 to the first sealing portion 251 and the second frame portion 242.

Accordingly, the number of parts that are coupled using adhesive members may be reduced, and the number of parts for coupling components may be reduced. As a result, the structure for coupling components in the cartridge 200 may be simplified, and manufacturing efficiency may be improved.

In addition, the sealing member 250 may be stably coupled or fixed without using a separate adhesive member, and may be in close contact with neighboring components, thereby hermetically sealing the same.

Referring to FIG. 26, the aforementioned stick 400 may include a medium portion 410. The stick 400 may include a cooling portion 420. The stick 400 may include a filter portion 430. The cooling portion 420 may be disposed between the medium portion 410 and the filter portion 430. The stick 400 may include a wrapper 440. The wrapper 440 may wrap the medium portion 410. The wrapper 440 may wrap the cooling portion 420. The wrapper 440 may wrap the filter portion 430. The stick 400 may have a cylindrical shape.

The medium portion 410 may include a medium 411. The medium portion 410 may include a first medium cover 413. The medium portion 410 may include a second medium cover 415. The medium 411 may be disposed between the first medium cover 413 and the second medium cover 415. The first medium cover 413 may be disposed at one end of the stick 400. The medium portion 410 may have a length of 24 mm.

The medium 411 may contain a multicomponent substance. The substance contained in the medium may be a multicomponent flavoring substance. The medium 411 may be composed of a plurality of granules. Each of the plurality of granules may have a size of 0.4 mm to 1.12 mm. The granules may account for approximately 70% of the volume of the medium 411. The length L2 of the medium 411 may be 10 mm. The first medium cover 413 may be made of an acetate material. The second medium cover 415 may be made of an acetate material. The first medium cover 413 may be made of a paper material. The second medium cover 415 may be made of a paper material. At least one of the first medium cover 413 or the second medium cover 415 may be made of a paper material, and may be crumpled so as to be wrinkled, and a plurality of gaps may be formed between the wrinkles so that air flows therethrough. Each of the gaps may be smaller than each of the granules of the medium 411. The length L1 of the first medium cover 413 may be shorter than the length L2 of the medium 411. The length L3 of the second medium cover 415 may be shorter than the length L2 of the medium 411. The length L1 of the first medium cover 413 may be 7 mm. The length L2 of the second medium cover 415 may be 7 mm.

Accordingly, each of the granules of the medium 411 may be prevented from being separated from the medium portion 410 and the stick 400.

The cooling portion 420 may have a cylindrical shape. The cooling portion 420 may have a hollow shape. The cooling portion 420 may be disposed between the medium portion 410 and the filter portion 430. The cooling portion 420 may be disposed between the second medium cover 415 and the filter portion 430. The cooling portion 420 may be formed in the shape of a tube that surrounds a cooling path 424 formed therein. The cooling portion 420 may be thicker than the wrapper 440. The cooling portion 420 may be made of a paper material thicker than that of the wrapper 440. The length L4 of the cooling portion 420 may be equal or similar to the length L2 of the medium 411. The length L4 of each of the cooling portion 420 and the cooling path 424 may be 10 mm. When the stick 400 is inserted into the aerosol-generating device (refer to FIG. 3), at least part of the cooling portion 420 may be exposed to the outside of the aerosol-generating device.

Accordingly, the cooling portion 420 may support the medium portion 410 and the filter portion 430, and may secure the rigidity of the stick 400. In addition, the cooling portion 420 may support the wrapper 440 between the medium portion 410 and the filter portion 430, and may provide a portion to which the wrapper 440 is adhered. In addition, the heated air and aerosol may be cooled while passing through the cooling path 424 in the cooling portion 420.

The filter portion 430 may be composed of a filter made of an acetate material. The filter portion 430 may be disposed at the other end of the stick 400. When the stick 400 is inserted into the aerosol-generating device (refer to FIG. 3), the filter portion 430 may be exposed to the outside of the aerosol-generating device. The user may inhale air in the state of holding the filter portion 430 in the mouth. The length L5 of the filter portion 430) may be 14 mm.

The wrapper 440 may wrap or surround the medium portion 410, the cooling portion 420, and the filter portion 430. The wrapper 440 may form the external appearance of the stick 400. The wrapper 440 may be made of a paper material. An adhesive portion 441 may be formed along one edge of the wrapper 440. The wrapper 440 may surround the medium portion 410, the cooling portion 420, and the filter portion 430, and the adhesive portion 441 formed along one edge of the wrapper 440 and the other edge thereof may be adhered to each other. The wrapper 440) may surround the medium portion 410, the cooling portion 420, and the filter portion 430, but may not cover one end or the other end of the stick 400.

Accordingly, the wrapper 440 may fix the medium portion 410, the cooling portion 420, and the filter portion 430, and may prevent these components from being separated from the stick 400.

A first thin film 443 may be disposed at a position corresponding to the first medium cover 413. The first thin film 443 may be disposed between the wrapper 440 and the first medium cover 413, or may be disposed outside the wrapper 440. The first thin film 443 may surround the first medium cover 413. The first thin film 443 may be made of a metal material. The first thin film 443 may be made of an aluminum material. The first thin film 443 may be in close contact with the wrapper 440, or may be coated thereon.

A second thin film 445 may be disposed at a position corresponding to the second medium cover 415. The second thin film 445 may be disposed between the wrapper 440 and the second medium cover 415, or may be disposed outside the wrapper 440. The second thin film 445 may be made of a metal material. The second thin film 445 may be made of an aluminum material. The second thin film 445 may be in close contact with the wrapper 440, or may be coated thereon.

When a capacitance sensor for recognizing the stick is inserted in the aerosol-generating device, the capacitance sensor may sense whether the stick 400 is inserted into the aerosol-generating device.

FIG. 27 is a block diagram of an aerosol-generating device according to an embodiment of the present disclosure.

Referring to FIG. 27, an aerosol-generating device 1000 may include a communication interface 1100, an input/output interface 1200, an aerosol-generating module 1300, a memory 1400, a sensor module 1500, a battery 1600, and/or a controller 1700.

In one embodiment, the aerosol-generating device 1000 may be composed only of a body 100. In this case, components included in the aerosol-generating device 1000 may be located in the body 100. In another embodiment, the aerosol-generating device 1000 may be composed of a cartridge 200, which contains an aerosol-generating substance, and a body 100. In this case, the components included in the aerosol-generating device 1000 may be located in at least one of the body 100 or the cartridge 200.

The communication interface 1100 may include at least one communication module for communication with an external device and/or a network. For example, the communication interface 1100 may include a communication module for wired communication, such as a Universal Serial Bus (USB). For example, the communication interface 1100 may include a communication module for wireless communication, such as Wireless Fidelity (Wi-Fi), Bluetooth, Bluetooth Low Energy (BLE), ZigBee, or Near-Field Communication (NFC).

The input/output interface 1200 may include an input device for receiving a command from a user and/or an output device for outputting information to the user. For example, the input device may include a touch panel, a physical button, a microphone, or the like. For example, the output device may include a display device for outputting visual information, such as a display or a light-emitting diode (LED), an audio device for outputting auditory information, such as a speaker or a buzzer, a motor for outputting tactile information such as haptic effect, or the like.

The input/output interface 1200 may transmit data corresponding to a command input by the user through the input device to another component (or other components) of the aerosol-generating device 1000, and may output information corresponding to data received from another component (or other components) of the aerosol-generating device 1000 through the output device.

The aerosol-generating module 1300 may generate an aerosol from an aerosol-generating substance. Here, the aerosol-generating substance may be a substance in a liquid state, a solid state, or a gel state, which is capable of generating an aerosol, or a combination of two or more aerosol-generating substances.

According to an embodiment, the liquid aerosol-generating substance may be a liquid including a tobacco-containing material having a volatile tobacco flavor component. According to another embodiment, the liquid aerosol-generating substance may be a liquid including a non-tobacco material. For example, the liquid aerosol-generating substance may include water, solvents, nicotine, plant extracts, flavorings, flavoring agents, vitamin mixtures, etc.

The solid aerosol-generating substance may include a solid material based on a tobacco raw material such as a reconstituted tobacco sheet, shredded tobacco, or granulated tobacco. In addition, the solid aerosol-generating substance may include a solid material having a taste control agent and a flavoring material. For example, the taste control agent may include calcium carbonate, sodium bicarbonate, calcium oxide, etc. For example, the flavoring material may include a natural material such as herbal granules, or may include a material such as silica, zeolite, or dextrin, which includes an aroma ingredient.

In addition, the aerosol-generating substance may further include an aerosol-forming agent such as glycerin or propylene glycol.

The aerosol-generating module 1300 may include at least one heater.

The aerosol-generating module 1300 may include an electro-resistive heater (for example, the heater 262, refer to FIG. 2). For example, the electro-resistive heater may include at least one electrically conductive track, and may be heated by current flowing through the electrically conductive track. In this case, the aerosol-generating substance may be heated by the heated electro-resistive heater.

The electrically conductive track may include an electro-resistive material. In one example, the electrically conductive track may be formed of a metal material. In another example, the electrically conductive track may be formed of a ceramic material, carbon, a metal alloy, or a composite of a ceramic material and metal.

The electro-resistive heater may include an electrically conductive track that is formed in any of various shapes. For example, the electrically conductive track may be formed in any one of a tubular shape, a plate shape, a needle shape, a rod shape, and a coil shape.

The aerosol-generating module 1300 may include a heater that uses an induction-heating method. For example, the induction heater may include an electrically conductive coil, and may generate an alternating magnetic field, which periodically changes in direction, by adjusting the current flowing through the electrically conductive coil. In this case, when the alternating magnetic field is applied to a magnetic body, energy loss may occur in the magnetic body due to eddy current loss and hysteresis loss, and the lost energy may be released as thermal energy. Accordingly, the aerosol-generating substance located adjacent to the magnetic body may be heated. Here, an object that generates heat due to the magnetic field may be referred to as a susceptor.

Meanwhile, the aerosol-generating module 1300 may generate ultrasonic vibrations to thereby generate an aerosol from the aerosol-generating substance.

The aerosol-generating module 1300 may be referred to as a cartomizer, an atomizer, or a vaporizer.

The memory 1400 may store therein a program for processing and controlling each signal in the controller 1700, and may store therein processed data and data to be processed.

For example, the memory 1400 may store therein applications designed for the purpose of performing various tasks that can be processed by the controller 1700, and may selectively provide some of the stored applications in response to the request from the controller 1700.

For example, the memory 1400 may store therein data on the operation time of the aerosol-generating device 1000, the maximum number of puffs, the current number of puffs, at least one temperature profile, and the user's inhalation pattern. Here, "puff" means inhalation by the user, and "inhalation" means the user's act of taking air or other substances into the user's oral cavity, nasal cavity, or lungs through the user's mouth or nose.

The memory 1400 may include at least one of volatile memory (e.g. dynamic random access memory (DRAM), static random access memory (SRAM), or synchronous dynamic random access memory (SDRAM)), nonvolatile memory (e.g. flash memory), a hard disk drive (HDD), or a solid-state drive (SSD).

The sensor module 1500 may include at least one sensor.

For example, the sensor module 1500 may include a sensor for sensing a puff (hereinafter referred to as a "puff sensor"), for example, the second sensor 180 (refer to FIG. 2). In this case, the puff sensor may be implemented as a proximity sensor such as an IR sensor, a pressure sensor, a gyro sensor, an acceleration sensor, a magnetic field sensor, or the like.

For example, the sensor module 1500 may include a sensor for sensing the temperature of the heater included in the aerosol-generating module 1300 and the temperature of the aerosol-generating substance (hereinafter referred to as a "temperature sensor").

In this case, the heater included in the aerosol-generating module 1300 may also serve as the temperature sensor. For example, the electro-resistive material of the heater may be a material having a temperature coefficient of resistance. The sensor module 1500 may measure the resistance of the heater, which varies according to the temperature, to thereby sense the temperature of the heater.

For example, when a stick is capable of being inserted into the body 100 of the aerosol-generating device 1000 and/or the cartridge 200, the sensor module 1500 may include a sensor for sensing insertion of the stick (hereinafter referred to as a "stick detection sensor").

For example, when the aerosol-generating device 1000 includes a cartridge 200, the sensor module 1500 may include a sensor for sensing mounting/demounting of the cartridge 200 to/from the body 100 and the position of the cartridge 200 (hereinafter referred to as a "cartridge detection sensor").

In this case, the stick detection sensor and/or the cartridge detection sensor may be implemented as an inductance-based sensor, a capacitance sensor, a resistance sensor, or a Hall sensor using a Hall effect.

The following description will be made on the assumption that the stick detection sensor is the first sensor 154 (refer to FIG. 17) and/or the second sensor 155 (refer to FIG. 17). In addition, the following description will be made on the assumption that the first sensor 154 is a capacitance sensor and that the second sensor 155 is an optical proximity sensor. In addition, the following description will be made on the assumption that the cartridge detection sensor includes the first connection terminal 191 (refer to FIG. 21).

For example, the sensor module 1500 may include a voltage sensor for sensing a voltage applied to a component (e.g. the battery 1600) provided in the aerosol-generating device 1000 and/or a current sensor for sensing a current.

The battery 1600 may supply power used for the operation of the aerosol-generating device 1000 under the control of the controller 1700. The battery 1600 may supply power to other components provided in the aerosol-generating device 1000, for example, the communication module included in the communication interface 1100, the output device included in the input/output interface 1200, and the heater included in the aerosol-generating module 1300. For example, the battery 1600 may be the battery 190 accommodated in the lower body 110.

The battery 1600 may be a rechargeable battery or a disposable battery. For example, the battery 1600 may be implemented as a lithium-ion battery, a lithium polymer (Li-polymer) battery, a lithium-ion phosphate battery, or the like. However, the present disclosure is not limited thereto.

For example, the battery 1600 may be implemented as a lithium cobalt oxide (LiCoO2) battery, a lithium titanate battery, or the like.

The aerosol-generating device 1000 may further include a battery protection circuit module (PCM), which is a circuit for protecting the battery 1600. The battery protection circuit module (PCM) may be disposed adjacent to the upper surface of the battery 1600. For example, in order to prevent overcharging and overdischarging of the battery 1600, the battery protection circuit module (PCM) may cut off the electrical path to the battery 1600 when a short circuit occurs in a circuit connected to the battery 1600, when overvoltage is applied to the battery 1600, or when excessive current flows through the battery 1600.

The aerosol-generating device 1000 may further include a charging terminal to which power supplied from the outside is input. For example, a charging terminal (e.g. the charging port 119, refer to FIG. 2) may be formed at one side of the body 100 of the aerosol-generating device 1000, and the aerosol-generating device 1000 may charge the battery 1600 using the power supplied through the charging terminal. In this case, the charging terminal may be implemented as a wired terminal for USB communication, a pogo pin, or the like.

The aerosol-generating device 1000 may wirelessly receive power supplied from the outside through the communication interface 1100. For example, the aerosol-generating device 1000 may wirelessly receive power using an antenna included in the communication module for wireless communication, and may charge the battery 1600 using the wirelessly supplied power.

The controller 1700 may control the overall operation of the aerosol-generating device 1000. For example, the controller 1700 may include the control device 193 accommodated in the lower body 110.

The controller 1700 may be connected to each of the components provided in the aerosol-generating device 1000, and may transmit and/or receive a signal to and/or from each of the components, thereby controlling the overall operation of each of the components.

The controller 1700 may include at least one processor, and may control the overall operation of the aerosol-generating device 1000 using the processor included therein. Here, the processor may be a general processor such as a central processing unit (CPU). Of course, the processor may be a dedicated device such as an application-specific integrated circuit (ASIC), or may be any of other hardware-based processors.

The controller 1700 may perform any one of a plurality of functions of the aerosol-generating device 1000. For example, the controller 1700 may perform any one of a plurality of functions of the aerosol-generating device 1000 (e.g. a preheating function, a heating function, a charging function, and a cleaning function) according to the state of each of the components provided in the aerosol-generating device 1000 and the user's command received through the input/output interface 1200.

The controller 1700 may control the operation of each of the components provided in the aerosol-generating device 1000 based on data stored in the memory 1400. For example, the controller 1700 may perform control such that a predetermined amount of power is supplied from the battery 1600 to the aerosol-generating module 1300 for a predetermined amount of time based on data stored in the memory 1400, such as the temperature profile and the user's inhalation pattern.

The controller 1700 may determine the occurrence or non-occurrence of a puff using the puff sensor included in the sensor module 1500. For example, the controller 1700 may check a temperature change, a flow change, a pressure change, and a voltage change in the aerosol-generating device 1000 based on the values sensed by the puff sensor, and may determine the occurrence or non-occurrence of a puff based on the result of the checking.

The controller 1700 may control the operation of each of the components provided in the aerosol-generating device 1000 according to the occurrence or non-occurrence of a puff and/or the number of puffs. For example, the controller 1700 may perform control such that the temperature of the heater is changed or maintained based on the temperature profile stored in the memory 1400.

The controller 1700 may perform control such that the supply of power to the heater is interrupted according to a predetermined condition. For example, the controller 1700 may perform control such that the supply of power to the heater is interrupted when the stick 400 is removed from the insertion space 214, when the cartridge 200 is separated from the body 100, when the number of puffs reaches the predetermined maximum number of puffs, when a puff is not sensed for a predetermined period of time or longer, or when the remaining capacity of the battery 1600 is less than a predetermined value.

The controller 1700 may calculate the remaining capacity with respect to the full charge capacity of the battery 1600. For example, the controller 1700 may calculate the remaining capacity of the battery 1600 based on the values sensed by the voltage sensor and/or the current sensor included in the sensor module 1500.

The controller 1700 may perform control such that power is supplied to the heater using at least one of a pulse width modulation (PWM) method or a proportional-integral-differential (PID) method.

For example, the controller 1700 may perform control such that a current pulse having a predetermined frequency and a predetermined duty ratio is supplied to the heater using the PWM method. In this case, the controller 1700 may control the amount of power supplied to the heater by adjusting the frequency and the duty ratio of the current pulse.

For example, the controller 1700 may determine a target temperature to be controlled based on the temperature profile. In this case, the controller 1700 may control the amount of power supplied to the heater using the PID method, which is a feedback control method using a difference value between the temperature of the heater and the target temperature, a value obtained by integrating the difference value with respect to time, and a value obtained by differentiating the difference value with respect to time.

Although the PWM method and the PID method are described as examples of methods of controlling the supply of power to the heater, the present disclosure is not limited thereto, and may employ any of various control methods, such as a proportional-integral (PI) method or a proportional-differential (PD) method.

FIGS. 28 and 29 are flowcharts showing an operation method of the aerosol-generating device according to an embodiment of the present disclosure, and FIGS. 30 and 31 are diagrams for explaining the operation of the aerosol-generating device according to an embodiment of the present disclosure.

Referring to FIG. 28, the aerosol-generating device 1000 may monitor a signal from the capacitance sensor 154 and/or a signal from the proximity sensor 155 in operation S2810. This will be described in detail with reference to FIG. 29.

Referring to FIG. 29, the aerosol-generating device 1000 may radiate light through the sensor light source included in the proximity sensor 155 in operation S2910. In this case, the light generated by the sensor light source may be radiated toward the insertion space 214.

The aerosol-generating device 1000 may monitor a signal from the photodiode included in the proximity sensor 155 in operation S2920. For example, the aerosol-generating device 1000 may monitor a signal from the photodiode from the time point at which the sensor light source radiates light.

In this case, the aerosol-generating device 1000 may check the level of the signal from the photodiode while monitoring the signal from the photodiode. Here, the level of the signal from the photodiode may be a value corresponding to the quantity of light incident on the photodiode.

The aerosol-generating device 1000 may determine whether an object is inserted into the insertion space 214 based on the signal from the photodiode in operation S2930. For example, the aerosol-generating device 1000 may determine whether an object is inserted into the insertion space 214 based on the time period from the time point at which the sensor light source radiates light to the time point at which the photodiode responds to reflected light.

In the state in which no object is inserted into the insertion space 214, the light radiated from the sensor light source toward the insertion space 214 may be reflected from the inner wall 212 of the first container 210, and may then be incident on the photodiode. Meanwhile, when an object is inserted into the insertion space 214, at least a portion of the light radiated from the sensor light source toward the insertion space 214 may be reflected from the object inserted into the insertion space 214, rather than being reflected from the inner wall 212 of the first container 210, and may then be incident on the photodiode. Accordingly, when the time period from the time point at which the sensor light source radiates light to the time point at which the photodiode responds to reflected light is shorter than a predetermined time period, the aerosol-generating device 1000 may determine that an object has been inserted into the insertion space 214.

Meanwhile, when the aerosol-generating device 1000 includes a plurality of proximity sensors 155, the aerosol-generating device 1000 may check the time periods from the time points at which the sensor light sources respectively included in the plurality of proximity sensors 155 radiate light to the time points at which the photodiodes respectively included in the plurality of proximity sensors 155 respond to reflected light. In this case, when all of the time periods checked for the plurality of proximity sensors 155 are shorter than a predetermined time period, the aerosol-generating device 1000 may determine that an object has been inserted into the insertion space 214.

Upon determining that an object has been inserted into the insertion space 214, the aerosol-generating device 1000 may monitor a signal from the capacitance sensor 154 in operation S2940.

For example, upon determining that an object has been inserted into the insertion space 214, the aerosol-generating device 1000 may supply power to the capacitance sensor 154, and may monitor a signal from the capacitance sensor 154.

In this case, the aerosol-generating device 1000 may check the level of the signal from the capacitance sensor while monitoring the signal from the capacitance sensor 154. Here, the level of the signal from the capacitance sensor

154 may be a value corresponding to the capacitance around a conductor provided in the capacitance sensor 154. In the state in which the stick 400 is not inserted into the insertion space 214, the level of the signal from the capacitance sensor 154 may fall within a predetermined level range. Meanwhile, when the stick 400 is inserted into the insertion space 214, the capacitance around the conductor provided in the capacitance sensor 154 may be changed by the stick 400, and the level of the signal from the capacitance sensor 154 may be outside of the predetermined level range.

The aerosol-generating device 1000 may determine whether the object inserted into the insertion space 214 is the stick 400 based on the signal from the capacitance sensor 154 in operation S2950. For example, when the level of the signal from the capacitance sensor 154 is outside of the predetermined level range, the aerosol-generating device 1000 may determine that the object inserted into the insertion space 214 is the stick 400. For example, when variation in the level of the signal from the capacitance sensor 154 is equal to or greater than a predetermined threshold, the aerosol-generating device 1000 may determine that the object inserted into the insertion space 214 is the stick 400.

Meanwhile, according to an embodiment of the present disclosure, the aerosol-generating device 1000 may determine whether the object inserted into the insertion space 214 is the stick 400 based on the level of the signal from the photodiode.

When the stick 400 is inserted into the insertion space 214, the stick 400 inserted into the insertion space 214 may be in close contact with the wall defining the insertion space 214. In this case, most of the light radiated from the sensor light source toward the insertion space 214 may be reflected from the stick 400 inserted into the insertion space 214, and may then be incident on the photodiode.

Meanwhile, when an object other than the stick 400 having a shape corresponding to the cross-sectional shape of the insertion space 214 is inserted into the insertion space 214, the object inserted into the insertion space 214 may be spaced apart from the wall defining the insertion space 214. In this case, a portion of the light radiated from the sensor light source toward the insertion space 214 may be reflected from the object inserted into the insertion space 214, and may then be incident on the photodiode, and the remaining portion thereof may be radiated toward the gap between the object inserted into the insertion space 214 and the wall defining the insertion space 214.

Since the level of the signal output from the photodiode corresponds to the quantity of light incident on the photodiode, the aerosol-generating device 1000 may determine whether the object inserted into the insertion space 214 is the stick 400 based on the level of the signal received from the photodiode for a predetermined time period from the time point at which the sensor light source radiates light.

The aerosol-generating device 1000 may check a level range within which the level of the signal received from the photodiode falls based on a look-up table, and may determine whether the object inserted into the insertion space 214 is the stick 400 based thereon. For example, when the level range encompassing the level of the signal received from the photodiode corresponds to a first level range, the aerosol-generating device 1000 may determine that the object inserted into the insertion space 214 is not the stick 400. For example, when the level range encompassing the level of the signal received from the photodiode corresponds to a second level range, which is greater than the first level range, the aerosol-generating device 1000 may determine that the object inserted into the insertion space 214 is the stick 400.

When the aerosol-generating device 1000 includes a plurality of second sensors 155, the aerosol-generating device 1000 may check level ranges within which the levels of the signals received from the photodiodes respectively included in the plurality of second sensors 155 fall, and may determine whether the object inserted into the insertion space 214 is the stick 400 based thereon. In this case, when all of the level ranges checked for the plurality of second sensors 155 fall within the second level range, the aerosol-generating device 1000 may determine that the object inserted into the insertion space 214 is the stick 400.

Meanwhile, according to an embodiment of the present disclosure, in the process of determining whether the object inserted into the insertion space 214 is the stick 400, when both the result of the determination based on the signal from the capacitance sensor 154 and the result of the determination based on the level of the signal from the photodiode indicate that the object is the stick 400, the aerosol-generating device 1000 may determine that the object inserted into the insertion space 214 is the stick 400.

Meanwhile, according to an embodiment of the present disclosure, the aerosol-generating device 1000 may first determine information about the insertion space 214 based on the signal from the capacitance sensor 154. In this case, upon determining that the stick 400 has been inserted into the insertion space 214 based on the signal from the capacitance sensor 154, the aerosol-generating device 1000 may radiate light through the sensor light source, and may determine information about the insertion space 214 based on the signal from the photodiode.

Referring again to FIG. 28, the aerosol-generating device 1000 may determine whether the stick 400 is inserted into the insertion space 214 in operation S2820.

Upon determining that the stick 400 has been inserted into the insertion space 214, the aerosol-generating device 1000 may determine whether the stick 400 inserted into the insertion space 214 is a used stick based on the level of the signal from the capacitance sensor 154 in operation S2830.

When the heater 262 heats the wick 261 in the state in which the stick 400 is inserted into the insertion space 214, an aerosol may be generated in the second chamber C2, and the generated aerosol may be inhaled into the user's mouth via the stick 400. After the stick 400 is used, components, such as moisture and glycerin, included in the aerosol may remain in the stick 400. For this reason, the level of the signal from the capacitance sensor 154 when a new stick, which has not been used before, is inserted into the insertion space 214 may differ from the level of the signal from the capacitance sensor 154 when a used stick is inserted into the insertion space 214 due to the components of the aerosol remaining in the stick 400. Accordingly, the aerosol-generating device 1000 may determine whether the stick 400 inserted into the insertion space 214 is a used stick based on a change in the level of the signal from the capacitance sensor 154.

For example, when variation in the level of the signal from the capacitance sensor 154 is equal to or greater than a first threshold but less than a second threshold, the aerosol-generating device 1000 may determine that the stick 400 inserted into the insertion space 214 is a new stick. When variation in the level of the signal from the capacitance sensor 154 is equal to or greater than the second threshold, the aerosol-generating device 1000 may determine that the stick 400 inserted into the insertion space 214 is a used stick.

For example, the aerosol-generating device 1000 may check a level range within which the level of the signal from the capacitance sensor 154 falls based on a look-up table, and may determine whether the stick 400 inserted into the insertion space 214 is a new stick based on the checked level range.

When the stick 400 inserted into the insertion space 214 is not a used stick, that is, when a new stick is inserted into the insertion space 214, the aerosol-generating device 1000 may perform control such that power is supplied to the heater 262 in operation S2840.

When the stick 400 is not inserted into the insertion space 214, or when the stick 400 inserted into the insertion space 214 is a used stick, the aerosol-generating device 1000 may interrupt the supply of power to the heater 262 in operation S2850.

Referring to FIG. 30, the level of the signal from the capacitance sensor 154 may be observed to be a first level Lv1 in the state in which the stick 400 is not inserted into the insertion space 214.

When the stick 400 inserted into the insertion space 214 is a new stick, which has not been used before, the level of the signal from the capacitance sensor 154 may change to a second level Lv2. In this case, variation 2910 in the level of the signal from the capacitance sensor 154 may be equal to or greater than the first threshold but less than the second threshold.

Meanwhile, when the stick 400 inserted into the insertion space 214 is a used stick, the level of the signal from the capacitance sensor 154 may change to a third level Lv3. In this case, variation 2920 in the level of the signal from the capacitance sensor 154 may be equal to or greater than the second threshold, which is greater than when a new stick is inserted.

That is, when the stick 400 inserted into the insertion space 214 is a used stick, variation in the level of the signal from the capacitance sensor 154 may be greater than when a new stick is inserted into the insertion space 214 due to components of the aerosol remaining in the stick 400, such as moisture and glycerin.

Referring to FIG. 31(*a*), the signal from the photodiode may be monitored from the time point at which the sensor light source radiates light, and the signal monitored in the case 2901 in which the stick 400 is inserted into the insertion space 214 and the signal monitored in the case 2902 in which no object is inserted into the insertion space 214 may be different from each other.

In the case 2901 in which the stick 400 is inserted into the insertion space 214, most of the light radiated from the sensor light source toward the insertion space 214 may be reflected from the stick 400 inserted into the insertion space 214, and may then be incident on the photodiode. Accordingly, the photodiode may respond to the light and may generate a signal when a time period t1 has elapsed from the time point at which the sensor light source radiates the light. Meanwhile, in the case 2902 in which no object is inserted into the insertion space 214, the light radiated from the sensor light source toward the insertion space 214 may be reflected from the inner wall 212 of the first container 210, and may then be incident on the photodiode. Accordingly, the photodiode may respond to the light and may generate a signal when a time period t2, which is longer than the time period t1, has elapsed. Meanwhile, referring to FIG. 31(*b*), the signal from the photodiode may be monitored from the time point at which the sensor light source radiates light, and the signal monitored in the case 2901 in which the stick 400 is inserted into the insertion space 214 and the signal monitored in the case 2912 in which an object other than the stick 400 is inserted into the insertion space 214 may be different from each other.

Similar to the case 2901 in which the stick 400 is inserted into the insertion space 214, in the case 2912 in which an object other than the stick 400 is inserted into the insertion space 214, the light radiated from the sensor light source toward the insertion space 214 may be reflected from the object inserted into the insertion space 214, and may then be incident on the photodiode. Accordingly, the photodiode may respond to the light and may generate a signal when the time period t1 has elapsed from the time point at which the sensor light source radiates the light. However, in the case 2912 in which an object other than the stick 400 is inserted into the insertion space 214, only a portion of the light radiated from the sensor light source toward the insertion space 214 may be reflected from the object, and accordingly, the level of the signal from the photodiode that is checked after the lapse of the time period t1 may be less than in the case 2901 in which the stick 400 is inserted into the insertion space 214. In this case, as the area of the object from which the light is reflected decreases, the level of the signal from the photodiode that is checked after the lapse of the time period t1 may also decrease.

Meanwhile, in the case 2912 in which an object other than the stick 400 is inserted into the insertion space 214, a portion of the light radiated from the sensor light source toward the insertion space 214 may be radiated toward the gap between the object inserted into the insertion space 214 and the wall defining the insertion space 214, may be reflected from the wall defining the insertion space 214, and may then be incident on the photodiode. Accordingly, in the case 2912 in which an object other than the stick 400 is inserted into the insertion space 214, the photodiode may respond to the light and may further generate a signal even when a time period t3, which is longer than the time period t1, has elapsed. In this case, the level of the signal from the photodiode that is checked after the lapse of the time period t3 may be less than the level of the signal from the photodiode that is checked after the lapse of the time period t1 in the case 2901 in which the stick 400 is inserted into the insertion space 214.

FIG. 32 is a flowchart showing an operation method of the aerosol-generating device according to another embodiment of the present disclosure. A detailed description of the same content as that described with reference to FIG. 28 will be omitted.

Referring to FIG. 32, the aerosol-generating device 1000 may sense coupling of the cartridge 200 to the body 100 through the cartridge detection sensor included in the sensor module 1500 in operation S3201. For example, the aerosol-generating device 1000 may sense coupling of the cartridge 200 to the body 100 based on whether the first connection terminal 191, which protrudes outside the body 100, is in contact with the heater 262 of the cartridge 200.

The aerosol-generating device 1000 may monitor the signal from the capacitance sensor 154 and/or the signal from the proximity sensor 155 in operation S3202. When sensing coupling of the cartridge 200 to the body 100, the aerosol-generating device 1000 may supply power from the battery 190 to the capacitance sensor 154 and/or the proximity sensor 155, and may monitor the signal from the capacitance sensor 154 and/or the signal from the proximity sensor 155 while power is supplied to the capacitance sensor 154 and/or the proximity sensor 155.

The aerosol-generating device 1000 may determine whether the stick 400 is inserted into the insertion space 214 based on the signal from the capacitance sensor 154 and/or the signal from the proximity sensor 155 in operation S3203. When the stick 400 is not inserted into the insertion space 214, the aerosol-generating device 1000 may continue to monitor the signal from the capacitance sensor 154 and/or the signal from the proximity sensor 155.

Upon determining that the stick 400 has been inserted into the insertion space 214, the aerosol-generating device 1000 may determine whether the stick 400 inserted into the insertion space 214 is a used stick based on the level of the signal from the capacitance sensor 154 in operation S3204.

When the stick 400 inserted into the insertion space 214 is not a used stick, that is, when a new stick is inserted into the insertion space 214, the aerosol-generating device 1000 may supply power to the heater 262 in operation S3205. For example, the aerosol-generating device 1000 may supply power to the heater 262 based on the temperature profile stored in the memory 1500.

The aerosol-generating device 1000 may determine whether use of the heater 262 is ended in operation S3206. For example, the aerosol-generating device 1000 may monitor the number of puffs from the time point at which the first puff was sensed through the puff sensor of the sensor module 1500. When the number of puffs reaches the maximum number of puffs, the aerosol-generating device 1000 may determine that use of the heater 262 has ended. For example, when the remaining capacity of the battery 190 is less than a predetermined value, the aerosol-generating device 1000 may determine that use of the heater 262 has ended.

When use of the heater 262 has not ended, the aerosol-generating device 1000 may determine whether the stick 400 is removed from the insertion space 214 in operation S3207.

While the heater 262 is being used, the aerosol-generating device 1000 may radiate light through the sensor light source, and may determine whether the stick 400 is removed from the insertion space 214 based on the signal from the photodiode. For example, when the time period from the time point at which the sensor light source radiates light to the time point at which the photodiode responds to reflected light is equal to or longer than the predetermined time period, the aerosol-generating device 1000 may determine that the stick 400 has been removed from the insertion space 214.

While the heater 262 is being used, the aerosol-generating device 1000 may determine whether the stick 400 is removed from the insertion space 214 based on the level of the signal from the capacitance sensor 154. For example, when the level of the signal from the capacitance sensor 154 returns to a value within the predetermined level range after supply of power to the heater 262, the aerosol-generating device 1000 may determine that the stick 400 has been removed from the insertion space 214. For example, when variation in the level of the signal from the capacitance sensor 154 is equal to or greater than a predetermined threshold after supply of power to the heater 262, the aerosol-generating device 1000 may determine that the stick 400 has been removed from the insertion space 214.

Meanwhile, according to an embodiment of the present disclosure, while the heater 262 is being used, the aerosol-generating device 1000 may determine whether the stick 400 is removed from the insertion space 214 using any one of the capacitance sensor 154 and the proximity sensor 155. In addition, upon determining that the stick 400 has been removed from the insertion space 214, the aerosol-generating device 1000 may again determine whether the stick 400 is removed from the insertion space 214 using the remaining one of the capacitance sensor 154 and the proximity sensor 155. In this case, when both the result of the determination using the capacitance sensor 154 and the result of the determination using the proximity sensor 155 indicate that the stick 400 has been removed from the insertion space 214, the aerosol-generating device 1000 may determine that the stick 400 has been removed from the insertion space 214.

When use of the heater 262 has not ended, and when the stick 400 is not removed from the insertion space 214, the aerosol-generating device 1000 may continue to supply power to the heater 262.

Meanwhile, the aerosol-generating device 1000 may interrupt the supply of power to the heater 262 in operation S3208. For example, when the stick 400 inserted into the insertion space 214 is a used stick, or when use of the heater 262 has ended after supply of power to the heater 262, the aerosol-generating device 1000 may interrupt the supply of power to the heater 262.

The aerosol-generating device 1000 may output a message related to interruption of the supply of power to the heater 262 through the output device of the input/output interface 1200 in operation S3209. For example, the aerosol-generating device 1000 may output a message indicating that the object inserted into the insertion space 214 is not the stick 400. For example, the aerosol-generating device 1000 may output a message indicating that the stick 400 inserted into the insertion space 214 is a used stick. For example, the aerosol-generating device 1000 may output a message indicating that use of the heater 262 has ended.

In the state in which the supply of power to the heater 262 is interrupted, the aerosol-generating device 1000 may monitor whether the stick 400 is removed from the insertion space 214 in operation S3210.

When the stick 400 is removed from the insertion space 214, the aerosol-generating device 1000 may determine whether the body 100 and the cartridge 200 are separated from each other in operation S3211. For example, when the first connection terminal 191, which protrudes outside the body 100, is not in contact with the heater 262 of the cartridge 200, the aerosol-generating device 1000 may determine that the body 100 and the cartridge 200 have been separated from each other.

In the state in which the body 100 and the cartridge 200 are coupled to each other, the aerosol-generating device 1000 may continue to monitor the signal from the capacitance sensor 154 and/or the signal from the proximity sensor 155.

Meanwhile, the aerosol-generating device 1000 may deactivate all of the sensors 154 and 155 by interrupting the supply of power to the sensors 154 and 155 in operation S3212.

As described above, according to at least one of the embodiments of the present disclosure, gas flow efficiency may be improved, and accordingly, the efficiency of transfer of heat from the aerosol to the stick 400 may be improved.

According to at least one of the embodiments of the present disclosure, it is possible to determine at least one of whether the stick 400 is inserted into the cartridge 200 or whether the inserted stick 400 is a used stick.

According to at least one of the embodiments of the present disclosure, sensors 154 and 155 capable of more accurately determining information about the stick 400 may be provided.

Referring to FIGS. 1 to 32, an aerosol-generating device 1000 in accordance with one aspect of the present disclosure may include a cartridge 200 having therein an insertion space 214 formed to be elongated, a body 100 coupled to the cartridge 200, a plurality of sensors, and a controller 1700.

The plurality of sensors may include a capacitance sensor 154, disposed in the body 100 so as to be adjacent to the insertion space 214 in the cartridge 200 coupled to the body 100, and a proximity sensor 155, including a sensor light source configured to radiate light and a photodiode configured to respond to light incident thereon. The controller 1700 may determine whether a stick 400 is inserted into the insertion space 214 based on a signal received from at least one of the plurality of sensors. When the stick 400 is inserted into the insertion space 214, the controller 1700 may determine whether the stick 400 inserted into the insertion space 214 is a used stick based on the level of a signal received from the capacitance sensor 154.

In addition, in accordance with another aspect of the present disclosure, the cartridge 200 may include a first container 210 provided therein with a chamber C1 storing a liquid, a second container 220 coupled to the first container 210, a wick 261 mounted in the second container 220 and connected to the chamber C1, and a heater 262 configured to heat the wick 261. The first container 210 may include an inner wall 212, defining the insertion space 214, and an outer wall 211, and the chamber C1 may be formed between the inner wall 212 and the outer wall 211.

In addition, in accordance with another aspect of the present disclosure, the body 100 may include a lower body 110 facing the lower portion of the cartridge 200 and an upper body 120 disposed on the lower body 110 and facing the side portion of the cartridge 200. The insertion space 214 may be formed adjacent to a part of the side portion of the cartridge 200, which is in contact with the upper body 120, and the plurality of sensors may be disposed adjacent to a side surface of the upper body 120, which is in contact with the part of the side portion of the cartridge 200.

In addition, in accordance with another aspect of the present disclosure, the capacitance sensor 154 may include a conductor formed in the extension direction of the insertion space 214 so as to have a length corresponding to the insertion space 214. While current flows through the conductor, the capacitance sensor 154 may output a signal to the controller 1700.

In addition, in accordance with another aspect of the present disclosure, the controller 1700 may control the sensor light source to radiate light, may determine whether an object is inserted into the insertion space 214 based on a signal received from the photodiode, and, when an object is inserted into the insertion space 214, may determine whether the object inserted into the insertion space 214 is the stick 400 based on the level of a signal received from the capacitance sensor 154.

In addition, in accordance with another aspect of the present disclosure, when the time period from the time point at which the sensor light source radiates light to the time point at which the photodiode responds to the light is shorter than a predetermined time period, the controller 1700 may determine that an object has been inserted into the insertion space 214.

In addition, in accordance with another aspect of the present disclosure, when variation in the level of a signal received from the capacitance sensor 154 is equal to or greater than a predetermined threshold, the controller 1700 may determine that the stick 400 has been inserted into the insertion space 214.

In addition, in accordance with another aspect of the present disclosure, when variation in the level of the signal received from the capacitance sensor 154 is equal to or greater than a first threshold but less than a second threshold, the controller 1700 may determine that the stick 400 inserted into the insertion space 214 is a new stick. When variation in the level of the signal is equal to or greater than the second threshold, the controller 1700 may determine that the stick 400 inserted into the insertion space 214 is a used stick.

In addition, in accordance with another aspect of the present disclosure, the controller 1700 may check a level range encompassing the level of the signal received from the capacitance sensor 154 based on a look-up table, and may determine at least one of whether the stick 400 is inserted into the insertion space 214 or whether the stick 400 inserted into the insertion space 214 is a used stick based on the checked level range.

In addition, in accordance with another aspect of the present disclosure, when the stick 400 inserted into the insertion space 214 is not a used stick, the controller 1700 may perform control such that power is supplied to the heater 262. When the stick 400 inserted into the insertion space 214 is a used stick, the controller 1700 may perform control such that supply of power to the heater 262 is interrupted.

In addition, in accordance with another aspect of the present disclosure, while power is supplied to the heater 262, the controller 1700 may monitor whether the stick 400 is removed from the insertion space 214 based on a first signal received from a first sensor among the plurality of sensors. Upon determining that the stick 400 has been removed from the insertion space 214 based on the first signal, the controller 1700 may again determine whether the stick 400 is removed from the insertion space 214 based on a second signal received from a second sensor among the plurality of sensors. Upon determining that the stick 400 has been removed from the insertion space 214 based on the second signal, the controller 1700 may perform control such that supply of power to the heater 262 is interrupted.

In addition, in accordance with another aspect of the present disclosure, the body 100 may include a connection terminal 191 disposed so as to protrude outwards. When the cartridge 200 and the body 100 are coupled to each other, the heater 262 may be electrically connected to the connection terminal 191. The controller 1700 may determine whether the cartridge 200 and the body 100 are coupled to each other through the connection terminal 191, and may perform control such that power is supplied to at least one of the plurality of sensors when the cartridge 200 and the body 100 are coupled to each other.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An aerosol-generating device comprising:
   a cartridge having an elongated insertion space;
   a body coupled to the cartridge;
   a plurality of sensors; and
   a controller,
   wherein the plurality of sensors comprises:
   a capacitance sensor disposed in the body to be adjacent to the elongated insertion space in the cartridge; and
   a proximity sensor comprising a sensor light source configured to radiate light and a photodiode configured to respond to light incident thereon,
   wherein the controller is configured to:
   determine whether a stick is inserted into the elongated insertion space based on a signal received from at least one of the plurality of sensors, and
   based on a determination that the stick is inserted into the elongated insertion space, determine whether the stick inserted into the elongated insertion space is a used stick based on a level of a signal received from the capacitance sensor.

2. The aerosol-generating device according to claim 1, wherein the cartridge comprises:
   a first container provided with a chamber configured to store a liquid; and
   a second container coupled to the first container,
   a wick is mounted in the second container and coupled to the chamber,
   a heater configured to heat a wick,
   wherein the first container comprises an inner wall that defines the elongated insertion space and an outer wall, and
   wherein the chamber is formed between the inner wall and the outer wall.

3. The aerosol-generating device according to claim 1, wherein the body comprises:
   a lower body facing a lower portion of the cartridge; and
   an upper body disposed on the lower body and facing a side portion of the cartridge,
   wherein the elongated insertion space is formed adjacent to a part of the side portion of the cartridge such that the part of the side portion of the cartridge is in contact with the upper body, and
   wherein the plurality of sensors is disposed adjacent to a side surface of the upper body such that the side surface of the upper body is in contact with the part of the side portion of the cartridge.

4. The aerosol-generating device according to claim 1, wherein the capacitance sensor comprises a conductor formed in an elongated direction of the elongated insertion space to have a length corresponding to the elongated insertion space, and
   wherein, while current flows through the conductor, the capacitance sensor is configured to output a signal to the controller.

5. The aerosol-generating device according to claim 1, wherein the controller is further configured to:
   control the sensor light source to radiate light,
   determine whether an object is inserted into the elongated insertion space based on a signal received from the photodiode, and,
   based on the object being inserted into the elongated insertion space, determine whether the object inserted into the elongated insertion space is a stick based on a level of a signal received from the capacitance sensor.

6. The aerosol-generating device according to claim 5, wherein the object is determined to be inserted into the elongated insertion space based on a time it takes for the photodiode to respond to the radiated light after the sensor light source radiates light being less than a predetermined time period.

7. The aerosol-generating device according to claim 1, wherein the stick is determined to be inserted into the elongated insertion space based on a variation in a level of a signal received from the capacitance sensor being greater than or equal to a predetermined threshold.

8. The aerosol-generating device according to claim 1, wherein the controller is further configured to:

determine that the stick inserted into the elongated insertion space is a new stick based on a variation in a level of a signal received from the capacitance sensor being greater than or equal to a first threshold and less than a second threshold, and determine that the stick inserted into the elongated insertion space is a used stick based on the variation in the level of the signal from the capacitance sensor being greater than or equal to the second threshold.

9. The aerosol-generating device according to claim 1, wherein the controller is further configured to:

determine a level range encompassing a level of a signal received from the capacitance sensor based on a look-up table, and determine at least one of whether the stick is inserted into the elongated insertion space or whether the stick inserted into the elongated insertion space is a used stick based on the determined level range.

10. The aerosol-generating device according to claim 2, wherein the controller is further configured to:

based on a determination that the stick inserted into the elongated insertion space is not a used stick, perform control such that power is supplied to the heater, and based on a determination that the stick inserted into the elongated insertion space is used, perform control such that power is not supplied to the heater.

11. The aerosol-generating device according to claim 2, wherein the controller is further configured to:

determine that the stick is removed from the elongated insertion space while power is supplied to the heater based on a signal being received from a first sensor of the plurality of sensors, perform control such that power is not supplied to the heater based on the determination that the stick is removed.

12. The aerosol-generating device according to claim 11, wherein the controller is further configured to:

in response to the determination based on the first signal that the stick is removed from the elongated insertion space, perform a second determination of whether the stick is removed from the elongated insertion space based on a second signal being received from a second sensor among the plurality of sensors; and perform control such that power is not supplied to the heater based on the second determination that the stick is removed.

13. The aerosol-generating device according to claim 2, wherein the body comprises a connection terminal disposed to protrude outwards, wherein the heater is electrically connected to the connection terminal when the cartridge is coupled to the body, and wherein the controller is further configured to:

determine whether the cartridge and the body are coupled to each other through the connection terminal, and perform control such that power is supplied to at least one of the plurality of sensors based on the cartridge and the body being coupled to each other.

* * * * *